(12) United States Patent
Oh et al.

(10) Patent No.: US 12,477,371 B2
(45) Date of Patent: Nov. 18, 2025

(54) METHOD AND DEVICE FOR CONTROLLING MEASURING AND REPORTING OF ADJACENT CHANNEL INTERFERENCE IN WIRELESS COMMUNICATION SYSTEM

(71) Applicant: Samsung Electronics Co., Ltd., Suwon-si (KR)

(72) Inventors: Jinyoung Oh, Suwon-si (KR); Hoondong Noh, Suwon-si (KR); Younsun Kim, Suwon-si (KR); Taehyoung Kim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 18/015,578

(22) PCT Filed: Jun. 22, 2021

(86) PCT No.: PCT/KR2021/007812
§ 371 (c)(1),
(2) Date: Jan. 11, 2023

(87) PCT Pub. No.: WO2022/014889
PCT Pub. Date: Jan. 20, 2022

(65) Prior Publication Data
US 2024/0236736 A1 Jul. 11, 2024

(30) Foreign Application Priority Data
Jul. 14, 2020 (KR) .................. 10-2020-0086960

(51) Int. Cl.
*H04W 24/10* (2009.01)
*H04B 17/354* (2015.01)
(Continued)

(52) U.S. Cl.
CPC .......... *H04W 24/10* (2013.01); *H04B 17/354* (2015.01); *H04L 1/0067* (2013.01); *H04W 8/22* (2013.01)

(58) Field of Classification Search
CPC .. H04B 17/345; H04B 17/354; H04B 17/318; H04B 17/336; H04W 24/10; H04W 8/22; H04L 1/0067; H04L 5/0048; H04L 5/0057
See application file for complete search history.

(56) References Cited

U.S. PATENT DOCUMENTS

| 2012/0213189 A1 | 8/2012 | Choi et al. |
| 2014/0198765 A1 | 7/2014 | Krishnamurthy et al. |

(Continued)

FOREIGN PATENT DOCUMENTS

| CN | 108964808 A | 12/2018 |
| CN | 111386661 A | 7/2020 |

(Continued)

OTHER PUBLICATIONS

Indian Examination Report dated Oct. 29, 2024, issued in Indian Application No. 202317006935.

(Continued)

*Primary Examiner* — Natasha W Cosme
(74) *Attorney, Agent, or Firm* — Jefferson IP Law, LLP

(57) ABSTRACT

Disclosed are a method and a device for controlling the measuring and reporting of adjacent channel interference in a wireless communication system. The method comprises the steps of: transmitting, to a base station, a terminal capability report related to the measurement and report of sub-band-specific adjacent channel leakage (ACL) interference; receiving, from the base station, setting information that indicates a frequency resource and a time resource for the measuring and reporting of sub-band-specific ACL inter- (Continued)

ference; measuring sub-band-specific ACL interference on the basis of the setting information; and reporting, to the base station, the measured sub-band-specific ACL interference.

15 Claims, 32 Drawing Sheets

(51) Int. Cl.
  *H04L 1/00* (2006.01)
  *H04W 8/22* (2009.01)

(56) References Cited

U.S. PATENT DOCUMENTS

| | | |
|---|---|---|
| 2016/0323901 A1 | 11/2016 | Yum et al. |
| 2019/0386861 A1 | 12/2019 | Park et al. |
| 2020/0267584 A1 | 8/2020 | Kim et al. |
| 2021/0392674 A1* | 12/2021 | Abotabl ............... H04L 5/0094 |

FOREIGN PATENT DOCUMENTS

| | | |
|---|---|---|
| KR | 10-2012-0101334 A | 9/2012 |
| KR | 10-2021-0061203 A | 5/2021 |
| WO | 2017/043801 A1 | 3/2017 |

OTHER PUBLICATIONS

European Search Report dated Sep. 22, 2023, issued in European Application No. 21843157.5.
Nokia et al, 'UE CLI measurement configuration and reporting', R2-1909023, 3GPP TSG-RAN2#107, Prague, Czech Republic, Aug. 26-30, 2019, Aug. 15, 2019.
LG Electronics, 'Discussion on remaining issue of UE-to-UE CLI measurement and reporting at a UE', R1-1902083, 3GPP TSG RAN WG1 #96, Athens, Greece, Feb. 25-Mar. 1, 2019, Feb. 16, 2019.
Chinese Office Action dated Sep. 28, 2025, issued in a Chinese Patent Application No. 202180060809.1.

* cited by examiner

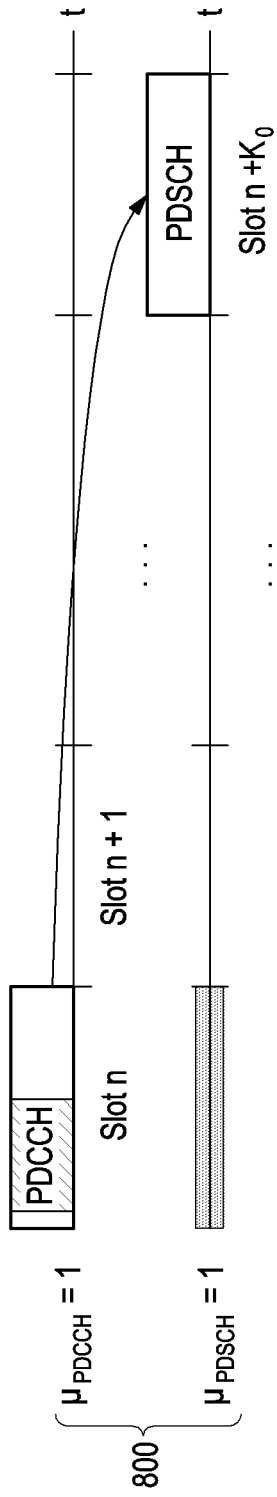
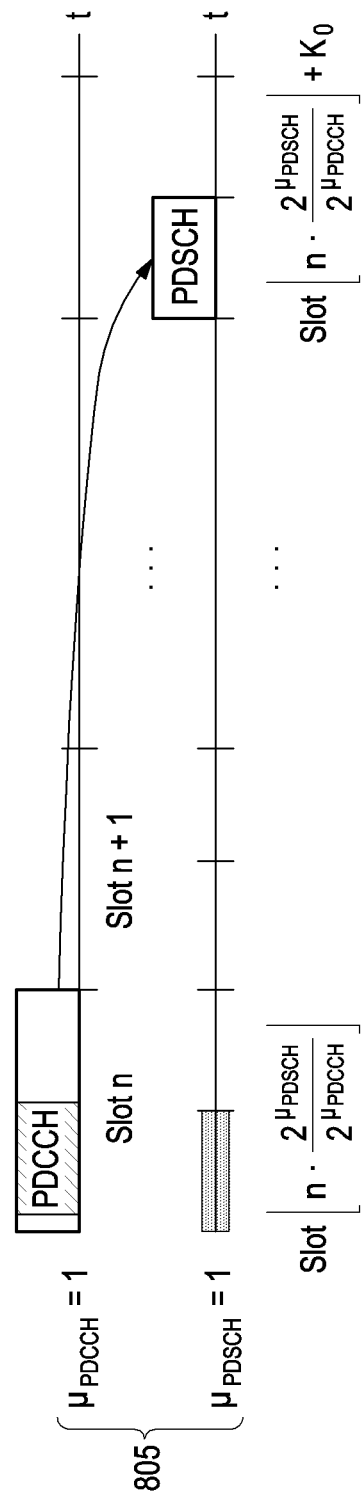

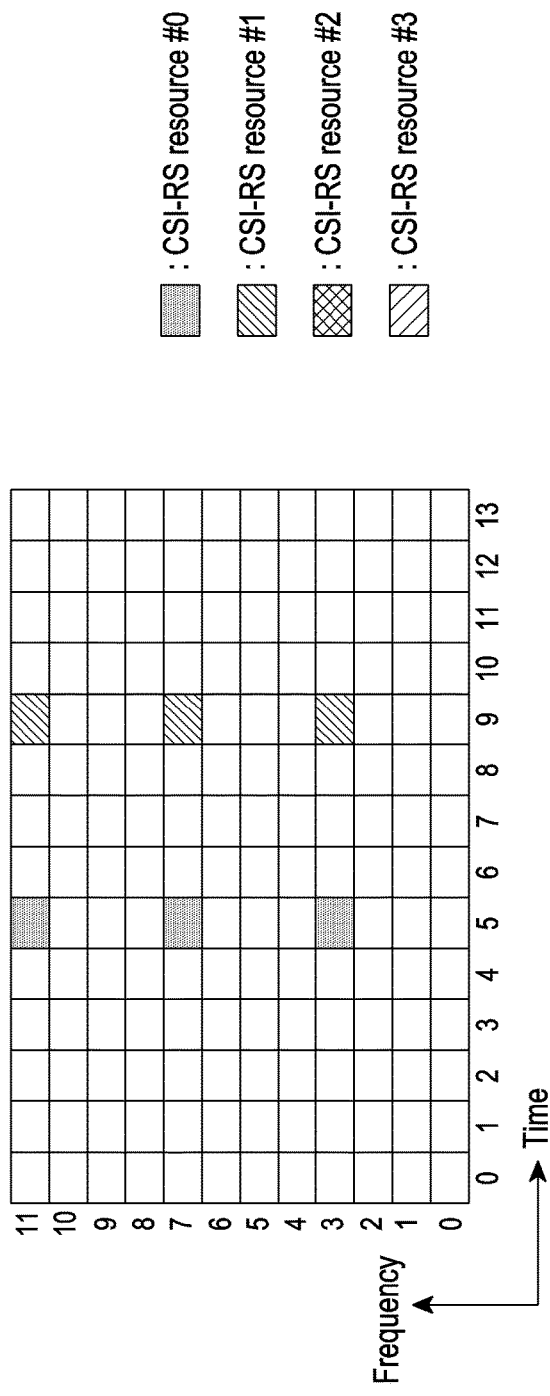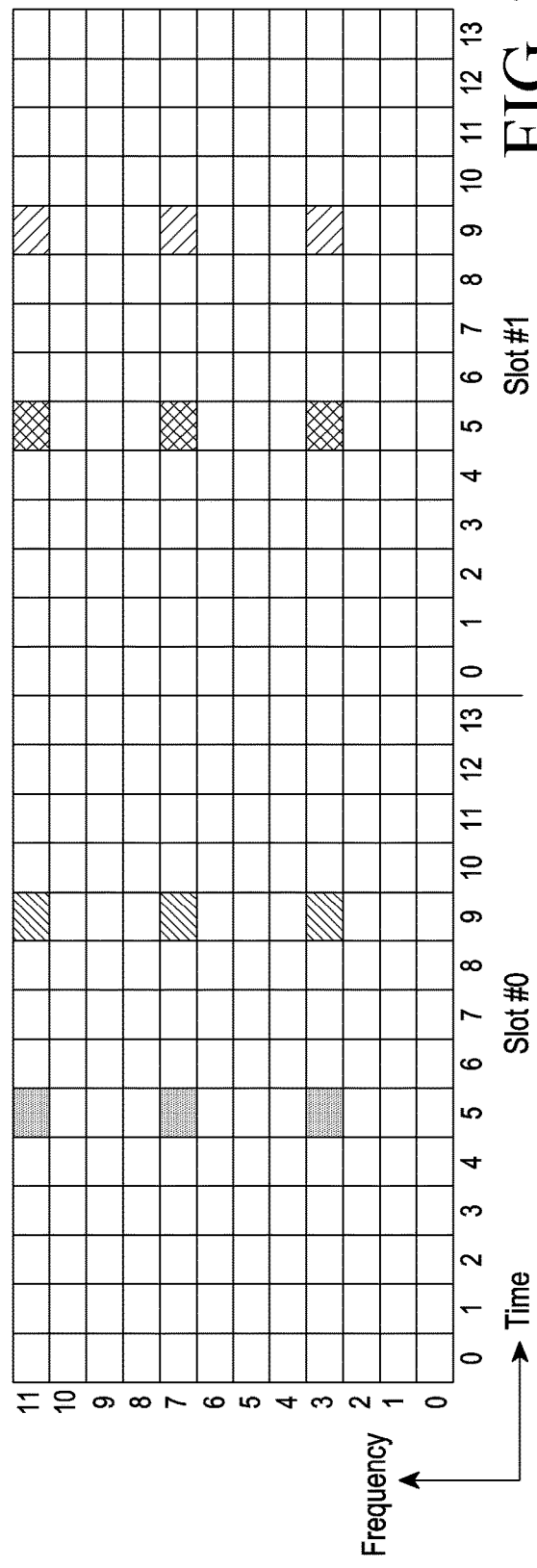
FIG. 20

METHOD AND DEVICE FOR CONTROLLING MEASURING AND REPORTING OF ADJACENT CHANNEL INTERFERENCE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2021/007812, filed on Jun. 22, 2021, which is based on and claims priority of a Korean patent application number 10-2020-0086960, filed on Jul. 14, 2020, in the Korean Intellectual Property Office, the disclosure of which is incorporated by reference herein in its entirety.

TECHNICAL FIELD

The disclosure relates to a method and device for controlling measurement and reporting of adjacent channel interference in a wireless communication system.

BACKGROUND ART

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, as wireless communication systems evolve to provide various services, a need arises for a method for smoothly providing such services. In particular, a need exists for technology for effectively measuring and reporting interference between frequency bands allocated to be adjacent in a wireless communication system that flexibly allocates uplink resources and downlink resources in the time domain and frequency domain for additional coverage extension.

DETAILED DESCRIPTION OF THE INVENTION

Technical Problem

A technical object of the disclosure is to provide a method and device for measuring and reporting interference when simultaneously operating uplink and downlink for various services in a wireless communication system.

Technical Solution

According to an embodiment of the disclosure, a method by a user equipment (UE) configured to perform measurement and reporting of adjacent channel interference in a wireless communication system may comprise transmitting, to a base station, a UE capability report related to measurement and reporting of subband-specific adjacent channel leakage (ACL) interference, receiving, from the base station, configuration information indicating frequency resources and time resources for measurement and reporting of the subband-specific ACL interference, measuring the subband-specific ACL interference based on the configuration information, and reporting the measured subband-specific ACL interference to the base station.

According to an embodiment of the disclosure, a method by a base station configured to control measurement and reporting of adjacent channel interference in a wireless communication system may comprise receiving, from a UE, a UE capability report related to measurement and reporting of subband-specific adjacent channel leakage (ACL) interference, transmitting, to the UE, configuration information indicating frequency resources and time resources for measurement and reporting of the subband-specific ACL interference, and receiving, from the UE, a measurement report of the subband-specific ACL interference based on the configuration information.

According to an embodiment of the disclosure, a device of a UE configured to perform measurement and reporting of adjacent channel interference in a wireless communication system may comprise a transceiver configured to transmit, to a base station, a UE capability report related to measurement and reporting of subband-specific adjacent channel leakage (ACL) interference and receive, from the base station, configuration information indicating frequency resources and time resources for measurement and reporting of the subband-specific ACL interference and a processor configured to measure the subband-specific ACL interference based on the configuration information and control the transceiver to report the measured subband-specific ACL interference to the base station.

According to an embodiment of the disclosure, a device of a base station configured to control measurement and reporting of adjacent channel interference in a wireless communication system may comprise a transceiver configured to receive, from a UE, a UE capability report related to measurement and reporting of subband-specific adjacent channel leakage (ACL) interference, transmit, to the UE, configuration information indicating frequency resources and time resources for measurement and reporting of the subband-specific ACL interference, and receive, from the UE, a measurement report of the subband-specific ACL interference based on the configuration information and a processor configured to transmit inter-base station shared information generated based on the configuration information and/or the measurement report to another base station.

Advantageous Effects

The disclosed embodiments may provide a method and device for measuring and reporting an interference signal for efficient uplink or downlink transmission/reception in a wireless communication system.

BRIEF DESCRIPTION OF THE DRAWINGS

FIGS. 8A and 8B are views illustrating an example of time domain resource allocation according to a subcarrier spacing in a wireless communication system;

FIG. 20 is a view illustrating an example of a 1-Port CSI-RS configuration according to an embodiment of the disclosure;

MODE FOR CARRYING OUT THE INVENTION

Figure 1:
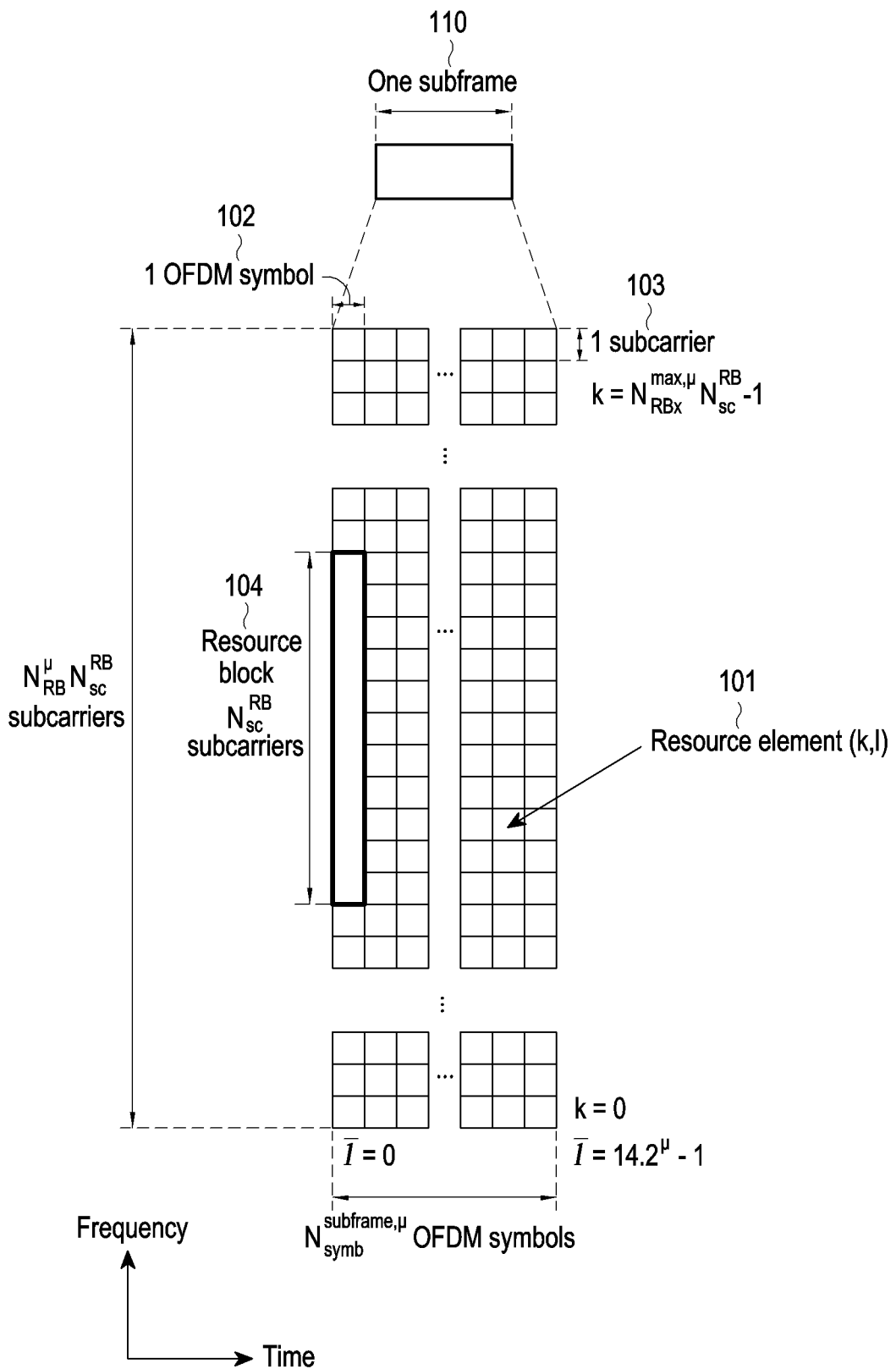
FIG. 1 is a view illustrating a basic structure of a time-frequency domain, which is a radio resource region of a wireless communication system.

Hereinafter, embodiments of the present invention are described in detail with reference to the accompanying drawings.

In describing the embodiments, the description of technologies that are known in the art and are not directly related to the disclosure is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, the base station (BS) is an entity that performs resource allocation to the UE and may be at least one of a gNode B (gNB) of 5G (or NR), eNode B (eNB) of LTE, Node B (NB) of 3GPP, radio access unit, base station controller, or network node. The user equipment (UE) may include a mobile station (MS), cellular phone, smartphone, computer, or multimedia system capable of performing communication functions. In the disclosure, downlink (DL) refers to a wireless transmission path of signal transmitted from the base station to the UE, and uplink (UL) refers to a wireless transmission path of signal transmitted from the UE to the base station. Although LTE or LTE-A systems may be described below as an example, the embodiments may be applied to other communication systems having a similar technical background or channel pattern. For example, 5G mobile communication technology (or new radio, NR) developed after LTE-A may be included therein, and 5G below may be a concept including legacy LTE, LTE-A and other similar services. Further, the embodiments may be modified in such a range as not to significantly depart from the scope of the present invention under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. Further, in the disclosure, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), or institute of electrical and electronics engineers (IEEE) 802.16e communication standards.

As a representative example of such broadband wireless communication system, the LTE system adopts orthogonal frequency division multiplexing (OFDM) for downlink and single carrier frequency division multiple access (SC-FDMA) for uplink. The uplink may refer to a radio link in which the UE transmits data or control signals to the base station (BS), and the downlink refers to a radio link through which the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to simultaneously support various requirements to freely reflect various requirements from users or service providers. Services considered for 5G communication systems include, e.g., enhanced mobile broadband (eMBB), massive machine type communication (MMTC), or ultra-reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), may need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

Attention is being drawn to bandwidth part (BWP) technology that divides a whole carrier frequency band into several frequency bands which may be supported for the base station for each UE when the base station supports a broad bandwidth of frequencies. In other words, if the base station supports the BWP and the BW capability of a specific UE is small, the BWP may support a small frequency band for the UE, and it is possible to reduce the energy consumption of the UE while reducing the frequency band by changing the BWP. There is also an effect capable of supporting various services for one UE without latency through changing BWPs while supporting a different frame structure in each of several BWPs. BWP technology may be applied to control channels or data channels one-to-one corresponding between a predetermined UE and base station. Further, even for the control channel and data channel for transmitting common signals that are transmitted to multiple UEs in the system by the base station, e.g., synchronization signal, physical broadcast channel (PBCH), and system information, they may be transmitted only in the configured BWP, saving the base station energy.

mMTC is also considered to support application services, such as internet of things (IoT) in the 5G communication system. To efficiently provide Internet-of-things, mMTC requires at least one of support of access by massive UEs in the cell, UE coverage enhancement, enhanced battery time, or UE cost savings. IoT devices are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it requires much broader coverage as compared with other services that the 5G communication system provides. mMTC-supportive UEs, due to the need for being low cost and difficulty in frequently exchanging batteries, are required to have a very long battery life, e.g., 10 years to 15 years.

URLLC is a mission-critical, cellular-based wireless communication service. For example, there may be considered a service for use in at least one of remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of $10^5$ or less. Thus, for URLLC-supportive services, the 5G communication system is required to provide a shorter transmit time interval (TTI) than those for other services while securing reliable communication links by allocating a broad resource in the frequency band.

The three services of the 5G communication system (hereinafter interchangeable with the 5G system), i.e., eMBB, URLLC, and mMTC, may be multiplexed and transmitted in one system. In this case, the services may adopt different TX/RX schemes and TX/RX parameters to meet their different requirements.

The frame structure of the 5G system is described below in more detail with reference to the drawings.

FIG. 1 is a view illustrating a basic structure of a time-frequency domain, which is a radio resource region of a 5G system.

In FIG. 1, the horizontal axis refers to the time domain, and the vertical axis refers to the frequency domain. A basic unit of a resource in the time and frequency domain is a resource element (RE) 101, which may be defined as one orthogonal frequency division multiplexing (OFDM) symbol (or discrete Fourier transform spread OFDM (DFT-s-OFDM) symbol) 102 on the time axis, and as one subcarrier 103 in the frequency domain. In the frequency domain. $N_{SC}^{RB}$ (e.g., 12) consecutive REs may constitute one resource block (RB) 104. $N_{symb}^{subframe}$ consecutive OFDM symbols in the time domain may constitute one subframe 110.

Figure 2:
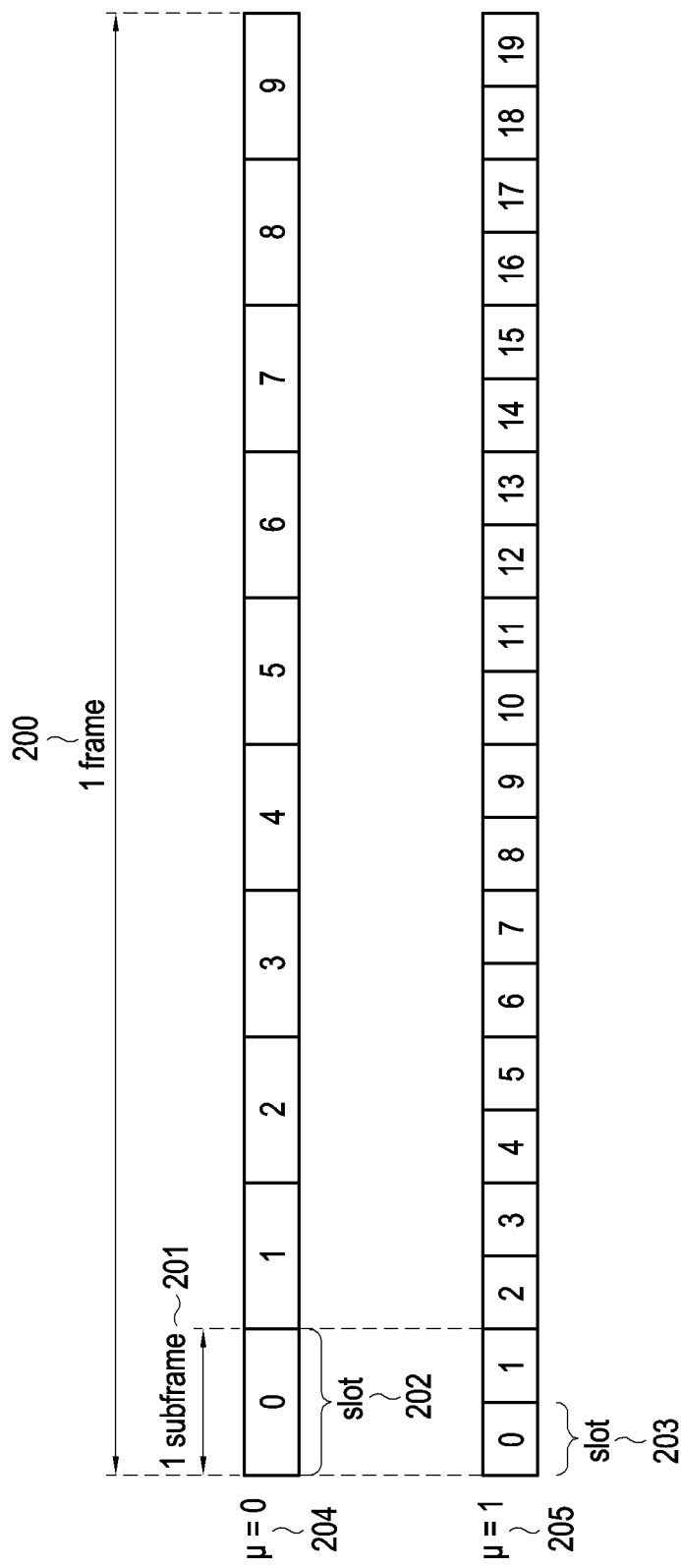
FIG. 2 is a view illustrating a slot structure considered in a wireless communication system.

FIG. 2 is a view illustrating a slot structure considered in the 5G system.

FIG. 2 illustrates an example structure including a frame 200, a subframe 201, and a slot 202. One frame 200 may be defined as 10 ms. One subframe 201 may be defined as 1 ms, and thus, one frame 200 may consist of a total of 10 subframes 201. Further, one slot 202 or 203 may be defined as 14 OFDM symbols. In other words, the number ($N_{symb}^{slot}$) of symbols per slot=14. One subframe 201 may be composed of one or more slots 202 and 203, and the number of slots 202 and 203 per subframe 201 may differ depending on (204 or 205), which is a set value for the subcarrier spacing.

In the example of FIG. 2, a slot structure of $\mu=0$ (204) and a slot structure of $\mu=1$ (205) are shown as the set subcarrier spacing values. When $\mu=0$ (204), one subframe 201 may consist of one slot 202, and when $\mu=1$ (205), one subframe 201 may consist of two slots (203). In other words, according to the set subcarrier spacing value $\mu$, the number $N_{slot}^{subframe,\mu}$ of slots per subframe may vary, and accordingly, the number $N_{slot}^{frame,\mu}$ of slots per frame may differ. In an embodiment, according to each subcarrier spacing $\mu$, $N_{slot}^{subframe,\mu}$ and $N_{slot}^{frame,\mu}$ may be defined in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, for initial access, the synchronization signal block (SSB) (or referred to as SS block or SS/PBCH block) may be transmitted, and the synchronization signal block may include a primary synchronization signal (PSS), a secondary synchronization signal (SSS), and a physical broadcast channel (PBCH). In the initial access phase in which the UE first accesses the system, the UE may obtain downlink time and frequency domain synchronization from a synchronization signal through a cell search and performs the cell ID. The synchronization signal may include a PSS and an SSS.

The UE may receive the PBCH, transmitting a master information block (MIB), from the base station, obtaining system information related to transmission and reception, such as system bandwidth or related control information, and basic parameter values. Based on the obtained information, the UE may perform decoding on a physical downlink control channel (PDCCH) and a physical downlink shared channel (PDSCH), obtaining the system information block (SIB). Thereafter, the UE exchanges identity with the base station through the random access phase and initially accesses the network via registration and authentication steps.

The synchronization signal is a signal serving as a reference for cell search and may be transmitted, with a subcarrier spacing appropriate for the channel environment (e.g., including phase noise) for each frequency band applied thereto. The 5G base station may transmit a plurality of synchronization signal blocks according to the number of analog beams to be operated. A PSS and an SSS may be mapped over 12 RBs and transmitted, and a PBCH may be mapped over 24 RBs and transmitted.

A configuration of a bandwidth part (BWP) in a 5G communication system is described below in detail with reference to the drawings.

Figure 3:
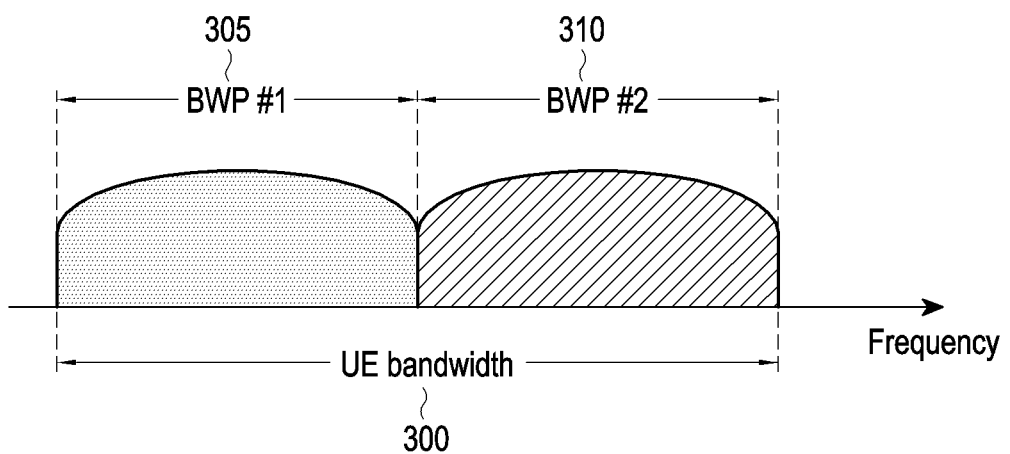
FIG. 3 is a view illustrating an example of a configuration for a bandwidth part in a wireless communication system.

FIG. 3 is a view illustrating an example of a configuration for a bandwidth part in a wireless communication system.

FIG. 3 illustrates an example in which a UE bandwidth 300 is divided into two bandwidth parts, e.g., bandwidth part #1 (BWP #1) 301 and bandwidth part #2 (BWP #2) 302. The base station may configure one or more bandwidth parts in the UE, and the information shown in Table 2 below may be configured for each bandwidth part.

TABLE 2

| BWP ::= | SEQUENCE{ |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

Here, bwp-Id means the bandwidth part identifier, locationAndBandwidth may indicate the location of the bandwidth part, subcarrierSpacing may indicate the subcarrier spacing, and cyclicPrefix may indicate the length of the cyclic prefix (CP).

The configuration of the bandwidth part is not limited thereto, other various BWP-related parameters than the above-described configuration information may be configured in the UE. The base station may transfer the configuration information to the UE through higher layer signaling, e.g., radio resource control (RRC) signaling. At least one bandwidth part among one or more configured bandwidth parts may be activated. Whether to activate the configured bandwidth part may be transferred from the base station to the UE semi-statically through RRC signaling or dynamically through downlink control information (DCI).

Before radio resource control (RRC) connected, the UE may be configured with an initial bandwidth part (BWP) for initial access by the base station via a master information block (MIB). Specifically, the UE may receive configuration information about the search space and control resource set (CORESET) which means the control region in which the PDCCH for receiving system information (e.g., remaining system information, RMSI or SIB1) necessary for initial access may be transmitted through the MIB in the initial access phase. The CORESET and search space configured by the MIB may be each regarded as having identity (ID) 0.

The base station may provide the UE with configuration information including at least one of frequency allocation information, time allocation information, or numerology for control region #0, via the MIB. Further, the base station may provide the UE with configuration information of occasion and monitoring period for control region #0, i.e., configuration information on search space #0, via the MIB. The UE may regard the frequency range set as control region #0 obtained from the MIB, as the initial BWP for initial access. In this case, the identity (ID) of the initial BWP may be regarded as 0.

The configuration for the bandwidth part supported in 5G described above may be used for various purposes.

In an embodiment, the configuration for the bandwidth part may support the UE having a smaller support bandwidth than the system bandwidth. For example, the base station may configure information (e.g., configuration information 2) indicating the frequency location of the bandwidth part in the UE, allowing the UE to transmit/receive data in a specific frequency location in the system bandwidth.

In an embodiment, for the purpose of supporting different numerologies, the base station may configure the UE with a plurality of bandwidth parts. For example, to support data transmission/reception using both a subcarrier spacing of 15 kHz and a subcarrier spacing of 30 kHz for some UE, the base station may configure the UE with two bandwidths, as subcarrier spacings of 15 kHz and 30 kHz. The different bandwidth parts may be frequency division multiplexed and, when data is transmitted/received at a specific subcarrier spacing, the bandwidth part configured as the corresponding subcarrier spacing may be activated.

According to an embodiment, for the purpose of reducing power consumption of the UE, the base station may configure the UE with bandwidth parts having different sizes of bandwidths. For example, when the UE supports a bandwidth exceeding a very large bandwidth, e.g., a bandwidth of 100 MHz, and transmits/receives data using the bandwidth, significant power consumption may occur. In particular, it is very inefficient in terms of power consumption to monitor an unnecessary downlink control channel using a large bandwidth of 100 MHz in a situation where there is no traffic. For the purpose of reducing power consumption of the UE, the base station may configure a bandwidth part of a relatively small bandwidth to the UE, e.g., a bandwidth part of 20 MHz, in the UE. In a no-traffic situation, the UE may perform monitoring in the 20 MHz bandwidth and, if data occurs, the UE may transmit/receive data in the 100 MHz bandwidth according to an instruction from the base station.

In an embodiment, in configuring the bandwidth part, UEs before RRC connected may receive configuration information of an initial bandwidth via an MIB in the initial access phase. Specifically, the UE may obtain a configuration of a control region (e.g., CORESET) for downlink control channel where the DCI for scheduling SIB may be transmitted, from the MIB on the physical broadcast channel (PBCH).

The bandwidth of the configured by the MIB may be regarded as the initial BWP, and the UE may receive the physical downlink shared channel (PDSCH), which transmits the SIB, via the initial BWP. The initial BWP may be utilized for other system information (OSI), paging, and random access as well as for receiving SIB.

In an embodiment, if the UE is configured with one or more BWPs, the base station may indicate, to the UE, a change in BWP using the BWP indicator in the DCI. As an example, when the currently activated bandwidth part of the UE is bandwidth part #1 301 in FIG. 3, the base station may indicate, to the UE, bandwidth part #2 302 with the bandwidth part indicator in the DCI, and the UE may change the bandwidth part to bandwidth part #2 302, indicated with the bandwidth part indicator in the DCI.

As described above, since DCI-based bandwidth part changing may be indicated by the DCI scheduling PDSCH or physical uplink shared channel (PUSCH), the UE, if receiving a bandwidth part change request (e.g., the bandwidth part indicator), is supposed to be able to successfully receive or transmit the PDSCH or PUSCH, scheduled by the DCI, in the changed bandwidth part. To that end, the standard specified requirements for transition time $T_{BWP}$ required upon changing bandwidth part, which may be defined as shown in Table 3 below.

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

Note 1
Depends on UE capability.
Note 2:
If the BWP switch involves changing of SCS, the BWP switch delay is determined by the larger one between the SCS before BWP switch and the SCS after BWP switch.

The requirement for delay of bandwidth part change may support type 1 or type 2 according to the capability of the UE. The UE may report a supportable bandwidth part delay time type to the base station.

Figure 4:
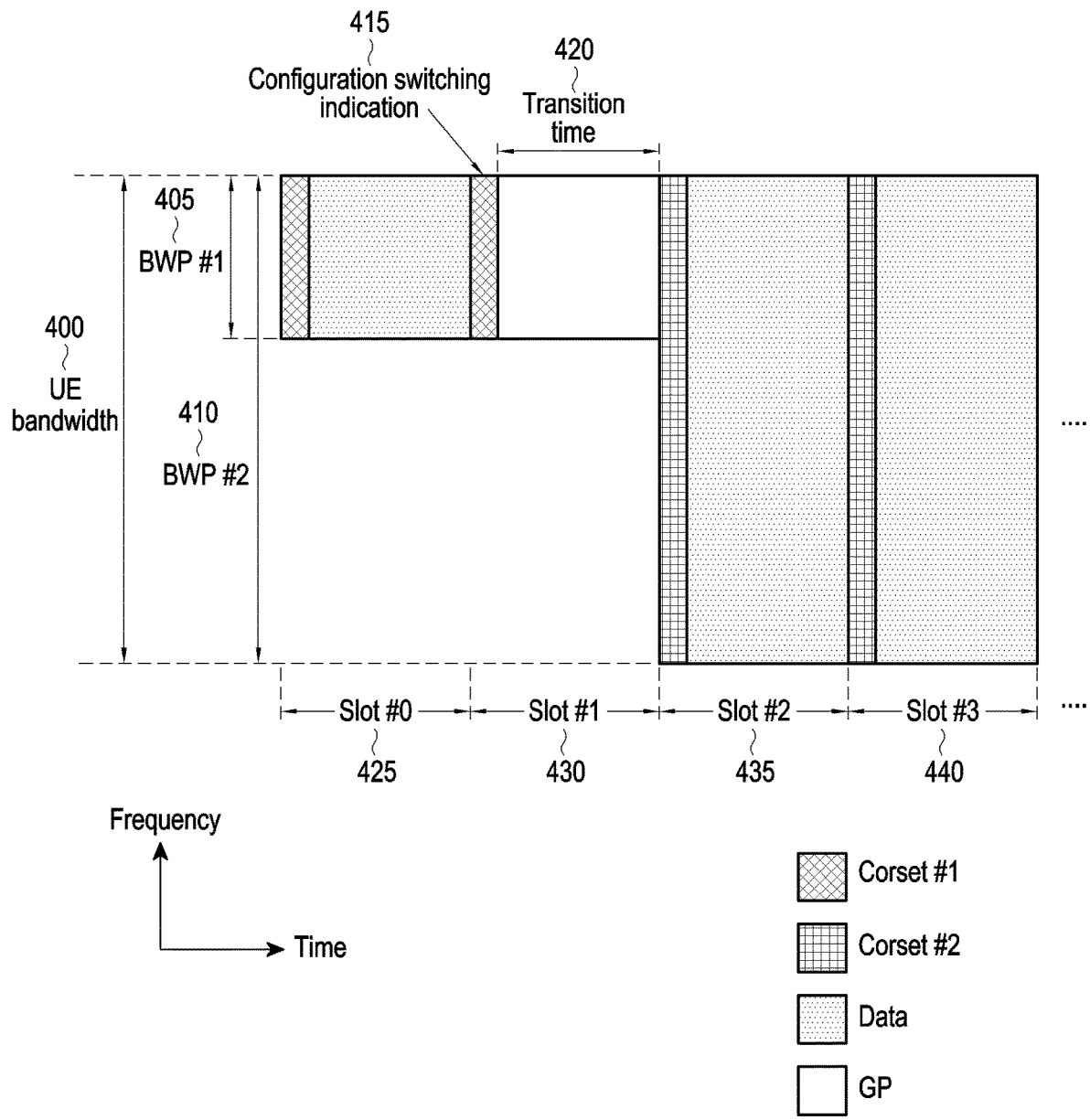
FIG. 4 is a view illustrating an example of a bandwidth part change procedure in a wireless communication system.

FIG. 4 is a view illustrating an example of a method for changing bandwidth parts in a wireless communication system.

Referring to FIG. 4, within the UE bandwidth 400, bandwidth part #1 405 or bandwidth part #2 410 may be configured for the UE. Bandwidth part #1 405 may occupy a portion of the UE bandwidth 400, and bandwidth part #2 410 may occupy the entire UE bandwidth 400. In slot n−1 (e.g., slot #0 425), the UE may perform communication within the configured bandwidth part #1 405.

The UE may receive a DCI including a bandwidth part change indicator 415 in slot n (e.g., slot #1 430). According to the requirements for the bandwidth part (BWP) transition time 420, the UE may complete the change into the new bandwidth part (e.g., bandwidth part #2 410) indicated by the bandwidth part change indicator 415, at a time not later than slot n+$T_{BWP}$ 435 and perform transmission/reception on the data channel scheduled by the DCI in bandwidth part #2 410.

Upon scheduling the data channel in bandwidth part #2 410, the base station may determine time domain resource allocation for the data channel considering the UE's bandwidth part transition time ($T_{BWP}$) 420. In other words, the base station may schedule the data channel in the slots (e.g., slots #2 and #3 435 and 440) after the bandwidth part transition time 420 in determining the time domain resource allocation for the data channel while scheduling the data channel in bandwidth part #2 410. Thus, the UE may not expect that the DCI indicating the bandwidth part change indicates a slot offset (K0 or K2) smaller than the bandwidth part transition time ($T_{BWP}$) 420.

In an embodiment, if the UE has received the DCI (e.g., DCI format 1_1 or 0_1) indicating the bandwidth part change, the UE may perform no transmission or reception during the time period from the third symbol of the slot in which the PDCCH including the DCI has been received to the start point of the slot indicated by the slot offset (K0 or K2) value indicated by the time domain resource allocation indicator field in the DCI. For example, if the UE receives the DCI indicating a bandwidth part change in slot n, and the slot offset value indicated by the DCI is K, the UE may perform no transmission or reception from the third symbol of slot n to a symbol before a previous symbol of slot n+K (i.e., the last symbol of slot n+K−1).

Next, a method for configuring transmission/reception-related parameters for each bandwidth part in 5G is described.

The UE may be configured with one or more bandwidth parts by the base station and may further be configured with parameters (including, e.g., data channel and/or control channel-related configuration information) to be used for transmission/reception for each configured bandwidth part. For example, when the UE is configured with bandwidth part #1 301 and bandwidth part #2 302 in FIG. 3, the UE may be configured with transmission reception parameter set #1 for bandwidth part #1 301 and transmission reception parameter set #2 for bandwidth part #2 302. When bandwidth part #1 301 is active, the UE may perform transmission/reception with the base station based on transmission reception parameter set #1 and, when bandwidth part #2 302 is active, the UE may perform transmission/reception with the base station based on transmission reception parameter set #2.

More specifically, the following parameters may be configured to the UE by the base station.

In an embodiment, for the uplink bandwidth part, the information in Table 4 below may be configured.

TABLE 4

```
BWP-Uplink ::= SEQUENCE {
    bwp-Id                  BWP-Id,
    bwp-Common              BWP-UplinkCommon OPTIONAL, -- Cond SetupOtherBWP
    bwp-Dedicated                BWP-UplinkDedicated OPTIONAL, -- Cond
SetupOtherBWP
    ...
}
BWP-UplinkCommon ::= SEQUENCE {
    genericParameters           BWP,
```

TABLE 4-continued

| | |
|---|---|
| rach-ConfigCommon -- Need M | SetupRelease { RACH-ConfigCommon } OPTIONAL, |
| pusch-ConfigCommon -- Need M | SetupRelease { PUSCH-ConfigCommon } OPTIONAL, |
| pucch-ConfigCommon -- Need M | SetupRelease { PUCCH-ConfigCommon } OPTIONAL, |
| ... } | |
| BWP-UplinkDedicated ::= SEQUENCE { | |
| pucch-Config Need M | SetupRelease { PUCCH-Config } OPTIONAL, -- |
| pusch-Config Need M | SetupRelease { PUSCH-Config } OPTIONAL, -- |
| configuredGrantConfig OPTIONAL, -- Need M | SetupRelease { ConfiguredGrantConfig } |
| srs-Config M | SetupRelease { SRS-Config } OPTIONAL, -- Need |
| beamFailureRecovery Config OPTIONAL, -- Cond SpCellOnly (beam failure recovery related parameter) ... } | SetupRelease { BeamFailureRecoveryConfig } |

Here, bwp-Id is the bandwidth part identifier, bwp-Common is cell-specific or common configuration information, bwp-Dedicated is UE-specific configuration information, genericParameters is the general parameter, rach-Config-Common is random access-related common configuration information, pusch-ConfigCommon is PUSCH-related common configuration information, pucch-ConfigCommon is PUSCH-related common configuration information, pucch-Config is PUCCH-related UE-specific configuration information, pusch-Config is PUSCH-related UE-specific configuration information, configuredGrantConfig is Configured grant-related configuration information, srs-Config is sounding reference signal (SRS)-related configuration information, and beamFailureRecoveryConfig is beam failure recovery related configuration information.

According to Table 4 described above, the UE may be configured, by the base station, with cell-specific (or common or cell-common) transmission-related parameters (e.g., parameters related to at least one of random access channel (RACH), physical uplink control channel (PUCCH), or physical uplink shared channel used for uplink data) (corresponding to BWP-UplinkCommon). Further, the UE may be configured, by the base station, with UE-specific (or dedicated) transmission-related parameters (e.g., parameters related to at least one of PUCCH, PUSCH, non-authorized-based uplink transmission (e.g., configured grant PUSCH), or sounding reference signal (SRS)) (corresponding to BWP-UplinkDedicated).

In an embodiment, for the downlink bandwidth part, the information in Table 5 below may be configured.

TABLE 5

| | |
|---|---|
| BWP-Downlink ::= SEQUENCE { | |
| bwp-Id | BWP-Id, |
| bwp-Common SetupOtherBWP | BWP-DownlinkCommon OPTIONAL, -- Cond |
| bwp-Dedicated SetupOtherBWP ... } | BWP-DownlinkDedicated OPTIONAL, -- Cond |
| BWP-DownlinkCommon ::= SEQUENCE { | |
| genericParameters | BWP, |
| pdcch-ConfigCommon -- Need M | SetupRelease { PDCCH-ConfigCommon } OPTIONAL, |
| pdsch-ConfigCommon -- Need M ... } | SetupRelease { PDSCH-ConfigCommon } OPTIONAL, |
| BWP-DownlinkDedicated ::= SEQUENCE { | |
| pdcch-Config Need M | SetupRelease { PDCCH-Config } OPTIONAL, -- |
| pdsch-Config Need M | SetupRelease { PDSCH-Config } OPTIONAL, -- |
| sps-Config | SetupRelease { SPS-Config } OPTIONAL, -- Need M |
| radioLinkMonitoringConfig OPTIONAL, -- Cond SpCellOnly ... } | SetupRelease { radioLinkMonitoringConfig} |

According to Table 5 described above, the UE may be configured, by the base station, with cell-specific (or common or cell-common) reception-related parameters (e.g., parameters related to PDCCH and/or PDSCH) (corresponding to BWP-DownlinkCommon). Further, the UE may be configured, by the base station, with UE-specific (or dedicated) reception-related parameters (e.g., parameters related to at least one of PDCCH, PDSCH, non-authorized downlink data transmission (e.g., semi-persistent scheduled PDSCH), or radio link monitoring (RLM)) (corresponding to BWP-UplinkDedicated).

Figure 5:
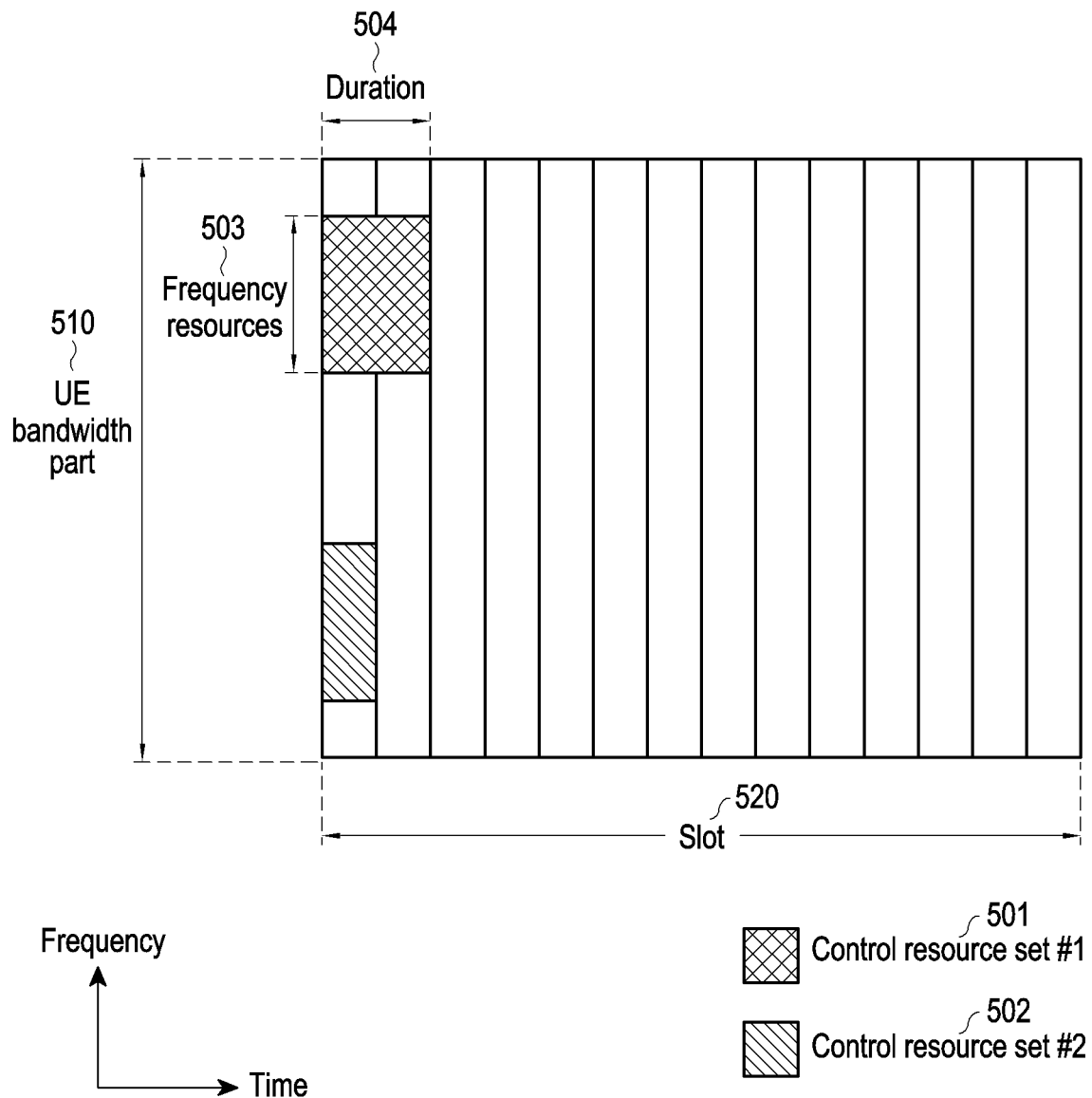
FIG. 5 is a view illustrating an example of a control resource set (CORESET) in which a downlink control channel is transmitted in a wireless communication system.

FIG. 5 is a view illustrating an example of a CORESET in which a downlink control channel is transmitted in a wireless communication system.

Referring to FIG. 5, a UE bandwidth part 510 is configured in the frequency domain, and two control resource sets, i.e., control resource set #1 501 and control resource set #2 502, are configured in one slot 520 in the time domain. The control resource sets 501 and 502 may be configured as a specific frequency resource 503 in the UE bandwidth part 510 in the frequency domain. Further, each control resource set 501 and 502 may be configured with one or more OFDM symbols in the time domain, and the number of OFDM symbols may be defined as the control resource set length (CORESET duration) 504. In the shown example, control resource set #1 501 may be configured as a control resource set length of two symbols, and control resource set #2 502 may be configured as a control resource set length of one symbol.

Each of the above-described control resource sets (e.g., control resource sets 501 or 502) may be configured to the UE by the base station through higher layer signaling, e.g., system information, MIB, or RRC signaling. Configuring the UE with the control resource set may mean providing at least one piece of information among the control resource set identity, frequency location of the control resource set, or symbol length of the control resource set.

In an embodiment, the higher layer signaling information elements provided to configure the control resource set may include information as shown in Table 6.

TABLE 6-continued

| | |
|---|---|
| shiftIndex INTEGER(0..maxNrofPhysicalResourceBlocks-1) | OPTIONAL |
| }, nonInterleaved | NULL |
| }, tci-StatesPDCCH SEQUENCE(SIZE (1..maxNrofTCI-StatesPDCCH)) OF TCI-StateId | OPTIONAL, |
| tci-PresentInDCI OPTIONAL, -- Need S } | ENUMERATED {enabled} |

In 5G, the set of control resource sets is N may be constituted of $N_{RB}^{CORESET}$ RBs in the frequency domain and be constituted of $N_{symb}^{CORFSET} \in \{1,2,3\}$ symbols in the time axis. One control channel element (CCE) may be composed of six resource element groups (REGs). One REG may be defined as 1 RB during 1 OFDM symbol. In one control resource set, REGs may be indexed in a time-first order, starting with REG index 0 from the first OFDM symbol of the control resource set, the lowest RB.

In 5G, an interleaved scheme and a non-interleaved scheme may be supported as transmission schemes for the PDCCH. The base station may configure the UE with whether to perform interleaving transmission or non-interleaving transmission for each control resource set, through higher layer signaling. Interleaving may be performed in each REG bundle unit. A REG bundle may be defined as a set of one or multiple REGs. The UE may determine a CCE-to-REG mapping scheme in the corresponding control resource set, e.g., in a manner shown in Table 7 below, based on whether to perform interleaving or non-interleaving transmission, configured by the base station.

TABLE 7

The CCE-to-REG mapping for a control-resource set can be interleaved or non-interleaved and is described by REG bundles:
- REG bundle i is defined as REGs {iL,iL + 1,...,iL + L-1} where L is the REG bundle size, $i = 0,1,...,N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles {f(6j/L),f(6j/L+1),...,f(6j/L+6/L-1)} where f (·) is an interleaver For non-interleaved CCE-to-REG mapping, L = 6 and f(x) = x.
For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by
$f(x) = (rC + c + n_{shift}) \bmod (N_{REG}^{CORESET}/L)$
$x = cR + r$
$r = 0,1, ...,R - 1$
$c = 0,1, ...,C - 1$
$C = N_{REG}^{CORESET}/(LR')$
where $R \in \{2,3,6\}$ .

TABLE 6

| | |
|---|---|
| ControlResourceSet ::= | SEQUENCE { |
| -- Corresponds to L1 parameter 'CORESET-ID' controlResourceSetId ControlResourceSetId, | |
| frequencyDomainResources | BIT STRING (SIZE (45)), |
| duration (1..maxCoReSetDuration), | INTEGER |
| cce-REG-MappingType interleaved SEQUENCE { reg-BundleSize | CHOICE { |
| ENUMERATED {n2, n3, n6},(REG bundle size) precoderGranularity | |
| ENUMERATED {sameAsREG-bundle, allContiguousRBs}, interleaverSize | |
| ENUMERATED {n2, n3, n6} | |

The basic unit, i.e., the REG, of the download control channel may contain REs to which the DCI is mapped and the region to which the DMRS, a reference signal for decoding the REs, is mapped. Three DMRS REs may be included in one REG. The number of CCEs necessary to transmit a PDCCH may be, e.g., 1, 2, 4, 8, or 16 depending on the aggregation level (AL), and different numbers of CCEs may be used to implement link adaptation of downlink control channel. For example, if AL=L, one downlink control channel may be transmitted via L CCEs. The UE needs to detect a signal while being unaware of information of downlink control channel and, for blind decoding, a search space is defined which indicates a set of CCEs. The search space is a set of candidate control channels constituted of CCEs that the UE needs to attempt to decode on the given aggregation level, and since several aggregation levels to bundle up 1, 2, 4, 8, or 16 CCEs may be configured, the UE has a plurality of search spaces. A search space set may be defined as a set of search spaces at all set aggregation levels.

<Search Space>

The search space may be a common search space or a UE-specific search space. UEs or all UEs in one group may inspect the common search space of the PDCCH to receive cell-common control information (e.g., dynamic scheduling or paging message for system information). For example, PDSCH scheduling allocation information on transmission of the SIB including cell service provider may be received by inspecting the common search space of the PDCCH. The common search space includes the PDCCH received by a certain group of UEs or all UEs and may thus be defined as a set of pre-agreed CCEs. Scheduling allocation information of the UE-specific PDSCH or PUSCH may be received by inspecting the UE-specific search space of PDCCH. The UE-specific search space may be UE-specifically defined with a function of various system parameters and the identity of the UE.

In 5G, the parameters for the search space for the PDCCH may be configured in the UE by the base station through higher layer signaling (e.g., SIB, MIB, or RRC signaling). For example, the base station may configure the UE with at least one of the number of PDCCH candidates at the aggregation level L, monitoring period for search space, monitoring occasion of symbol unit in slot for search space, search space type (common search space or UE-specific search space), combination of RNTI and DCI format to be monitored in the search space, and control resource set index to be monitored in the search space. For example, parameters for the search space for the PDCCH may include the following information.

TABLE 8

```
SearchSpace ::=                        SEQUENCE {
    searchSpaceId
    SearchSpaceId,
    controlResourceSetId
    ControlResourceSetId,
    monitoringSlotPeriodicityAndOffset  CHOICE {
        sl1                             NULL,
        sl2                             INTEGER (0..1),
        sl4                             INTEGER (0..3),
        sl5                             INTEGER (0..4),
        sl8                             INTEGER (0..7),
        sl10                            INTEGER (0..9),
        sl16                            INTEGER (0..15),
        sl20                            INTEGER (0..19)
        ...
    }
    duration                            INTEGER (2..2559)
    monitoringSymbolsWithinSlot         BIT STRING (SIZE (14))
        OPTIONAL,
    nrofCandidates                      SEQUENCE {
        aggregationLevel1
        ENUMERATED {n0, n1, n2, n3, n4, n5, n6, n8},
        aggregationLevel2
        ENUMERATED {n0, n1, n2, n3, n4, n5, n6, n8},
        aggregationLevel4
        ENUMERATED {n0, n1, n2, n3, n4,n5, n6, n8},
        aggregationLevel8
        ENUMERATED {n0, n1, n2, n3, n4, n5, n6, n8},
        aggregationLevel16
        ENUMERATED {n0, n1, n2, n3, n4, n5, n6, n8}
    },
    searchSpaceType                     CHOICE {
        common                          SEQUENCE {
            ...
        }
        ue-Specific                     SEQUENCE {
```

TABLE 8-continued

```
            dci-formats   ENUMERATED {formats0-0-And-1-0, formats0-1-And-1-1},
            ...
        }
```

According to the configuration information, the base station may configure one or more search space sets to the UE. As an example, the base station may configure search space set 1 and search space set 2 to the UE. Search space set 1 may be configured so that the UE monitors DCI format A, scrambled with X-RNTI, in the common search space, and search space set 2 may be configured so that the UE monitors DCI format B, scrambled with Y-RNTI, in the UE-specific search space.

According to the above-described configuration information, one or more search space sets may be present in the common search space or the UE-specific search space. For example, search space set #1 and search space set #2 may be configured as the common search space, and search space set #3 and search space set #4 may be configured as the UE-specific search space.

According to an embodiment, in the common search space, a combination of DCI format and RNTI as follows may be monitored. Of course, it is not limited to the examples described below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI According to an embodiment, in the UE-specific search space, a combination of DCI format and RNTI as follows may be monitored. Of course, it is not limited to the examples described below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

In an embodiment, the RNTIs may be defined and used as follows.

cell RNTI (C-RNTI): for scheduling UE-specific PDSCH

Temporary cell RNTI (TC-RNTI): for scheduling UE-specific PDSCH

Configured scheduling RNTI (CS-RNTI): for scheduling semi-statically configured UE-specific PDSCH Random access RNTI (RA-RNTI): for scheduling PDSCH in the random access phase Paging RNTI (P-RNTI): for scheduling PDSCH where paging is transmitted System information RNTI (SI-RNTI): for scheduling PDSCH where system information is transmitted Interruption RNTI (INT-RNTI): for indicating whether to puncture PDSCH Transmit power control for PUSCH RNTI (TPC-PUSCH-RNTI): for indicating power control command for PUSCH Transmit power control for PUCCH RNTI (TPC-PUCCH-RNTI): for indicating power control command for PUCCH Transmit power control for SRS RNTI (TPC-SRS-RNTI): for indicating power control command for SRS In an embodiment, the DCI formats may follow the definitions in Table 9 below.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In an embodiment, in 5G, the search space of the aggregation level L in the control resource set p and the search space set s may be expressed by Equation 1 below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{Equation 1}$$

L: aggregation level
$n_{CI}$: carrier index
$N_{CCE,p}$: number of control channel elements (CCEs) present in the control resource set p
$n_{s,f}^{\mu}$: slot index
$M_{p,s,max}^{(L)}$: number of PDCCH candidates of aggregation level L
$m_{snCI}=0, \ldots, M_{p,s,max}^{(L)}-1$: PDCCH candidate index of aggregation level L
$i=0, \ldots, L-1$ $$Y_{p,n_{s,f}^{\mu}} = \left( A_p \cdot Y_{p,n_{s,f}^{\mu}-1} \right) \mod D,$$

$Y_{p,-1}=n_{RNTI}\neq 0$, $A_0=39827$, $A_1=39829$, $A_2=39839$, $D=65537$
$-n_{RNTI}$: UE identifier
$Y\_(p,n_{s,f}^{\mu})$ may be 0 in the case of the common search space.
In the case of the UE-specific search space, $Y\_(p,n_{s,f}^{\mu})$ may have a value that changes depending on the UE's identity (C-RNTI or ID configured in the UE by the base station) and the time index.

<TCI State>

Described below in detail is a method for configuring a TCI state, which is a means for indicating or exchanging quasi co-location (QCL) information between a UE and a base station in a 5G wireless communication system.

The base station may configure and indicate a TCI state between two different RSs or channels via proper signaling, notifying the UE of the QCL relationship between the different RSs or channels. When different RSs or channels are QCLed, this may mean that, in estimating channel via reference antenna port A (hereinafter, referred to as reference RS #A) and RS antenna port B (target RS #B), which have a QCL relationship, the UE is allowed to apply all or some of large-scale channel parameters estimated from antenna port A to channel measurement from antenna port B.

QCL may associate different parameters depending on at least one context among 1) time tracking influenced by average delay and delay spread, 2) frequency tracking influenced by Doppler shift and Doppler spread, 3) radio resource management (RRM) influenced by average gain, or 4) beam management (BM) influenced by spatial parameter. Accordingly, NR may support four types of QCL relationships as shown in Table 10 below.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

Here, spatial RX parameter may include at least of as Angle of arrival (AoA), Power Angular Spectrum (PAS) of AoA, Angle of departure (AoD), PAS of AoD, transmit/receive channel correlation, transmit/receive beamforming, or spatial channel correlation.

The QCL relationship may be configured to the UE through the RRC parameter TCI-State and QCL-Info as shown in Table 11 below. Referring to Table 11, the base station may configure the UE with one or more TCI states, indicating up to two QCL relationships (qcl-Type1 and qcl-Type2) for the RS referencing the ID of the TCI state, i.e., the target RS. In an embodiment, the QCL-Info included in each TCI state may include the serving cell index and BWP index of the reference RS indicated by the QCL-Info, type and ID of the reference RS, and the QCL type as shown in Table 10 above.

TABLE 11

| TCI-State ::= | | SEQUENCE { | |
|---|---|---|---|
| tci-StateId | TCI-StateId, | | |
| qcl-Type1 | QCL-Info, | | |
| qcl-Type2 | QCL-Info | OPTIONAL, | -- Need R |
| ... | | | |
| } | | | |
| QCL-Info ::= | | SEQUENCE { | |
| cell | | | |
| ServCellIndex | OPTIONAL, | -- Need R | |
| bwp-Id BWP-Id | OPTIONAL, | -- Cond CSI-RS-Indicated | |
| referenceSignal | CHOICE { | | |
| csi-rs | NZP-CSI-RS-ResourceId, | | |
| ssb | SSB-Index | | |
| }, | | | |
| qcl-Type | | | ENUMERATED |
| {typeA, typeB, typeC, typeD} | | | |
| ... | | | |
| } | | | |

Here, tci-StateId denotes the TCI state ID, qcl-Type1 includes the QCL information of the first reference RS of the RS referencing the TCI state ID (i.e., target RS), and qcl-Type2 may include the QCL information of the second reference RS of the RS referencing the TCI state ID (i.e., target RS). For each QCL information, ServCellIndex may denote the serving cell index of the reference RS indicated by the QCL information, bwp-Id may denote the BWP index of the reference RS indicated by the QCL information, and ssb may denote the channel state information reference signal (CSI-RS) ID or SSB ID indicated by the QCL information.

<Time and Frequency Domain Resource Allocation>

Methods for allocating time and frequency resources for data transmission in NR are described below.

In NR, the following detailed frequency domain resource allocation (FD-RA) methods may be provided in addition to the frequency-domain resource candidate allocation through BWP indication.

Figure 6A:
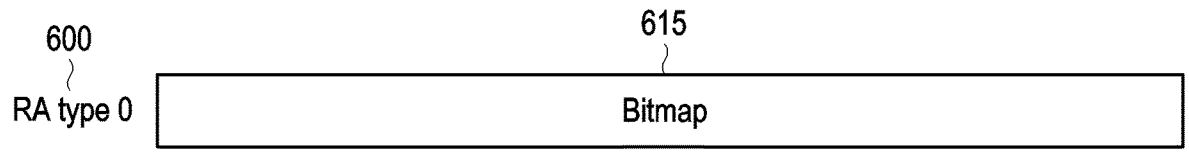
FIGS. 6A, 6B, and 6C are views illustrating an example of frequency domain resource allocation in a wireless communication system.
Figure 6B:
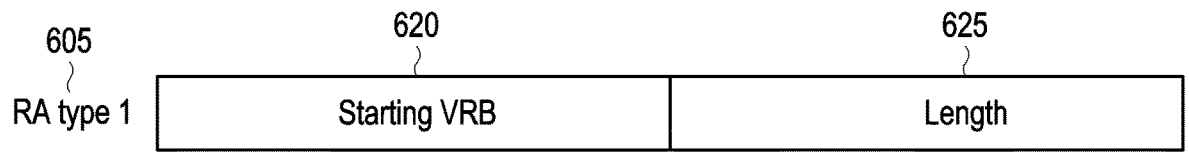
Figure 6C:
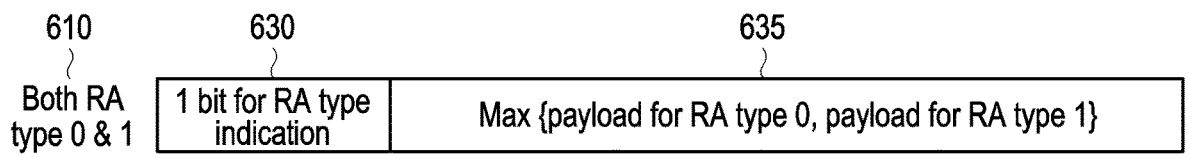

FIGS. 6A, 6B, and 6C are views illustrating an example of frequency domain resource allocation in a wireless communication system. Shown here are three types of frequency domain resource allocations of RA type 0 600 and RA type 1 605 which may be configured through higher layer signaling and RA type 0&1 610 for dynamic switching.

Referring to FIG. 6A, when the UE is configured to use only RA type 0 600 through higher layer signaling, some downlink control information (DCI) to allocate the PDSCH to the UE may include a bitmap 615 constituted of $N_{RBG}$ bits. The conditions for configuring the bitmap are described below again. In an embodiment, $N_{RBG}$ means the number of resource block groups (RBGs) determined as illustrated in Table 12 below according to the BWP size allocated by the BWP indicator and the higher layer parameter rbg-Size, and data may be transmitted in the RBG expressed as 1 by the bitmap.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Referring to FIG. 6B, when the UE is configured to use only RA type 1 605 through higher layer signaling, at least one DCI to allocate the PDSCH to the UE may have frequency domain resource allocation information constituted of $\lfloor \log_2(N_{RB}^{DL,BWP}(N_{RB}^{DL,BWP}+1)/2) \rfloor$ bits. Conditions for configuring the frequency domain resource allocation information are described below again. In an embodiment, the base station may set the length 625 of the frequency domain resource continuously allocated from the starting VRB 620 through the frequency domain resource allocation information.

Referring to FIG. 6C, when the UE is configured to use RA type 0&1 610 through higher layer signaling, the DCI to allocate the PDSCH to the UE may have frequency domain resource allocation information 635 having the bit size of the larger of information 620 and 625 for configuring RA type 1 and a bitmap 615 for configuring RA type 0. Conditions for configuring the frequency domain resource allocation information are described below again. In this case, one bit as the most significant bit (MSB) of the frequency domain resource allocation information in the DCI may be added, and the MSB being 0 may indicate that RA type 0 is used, and the MSB being 1 may indicate that RA type 1 is used.

Figure 7:
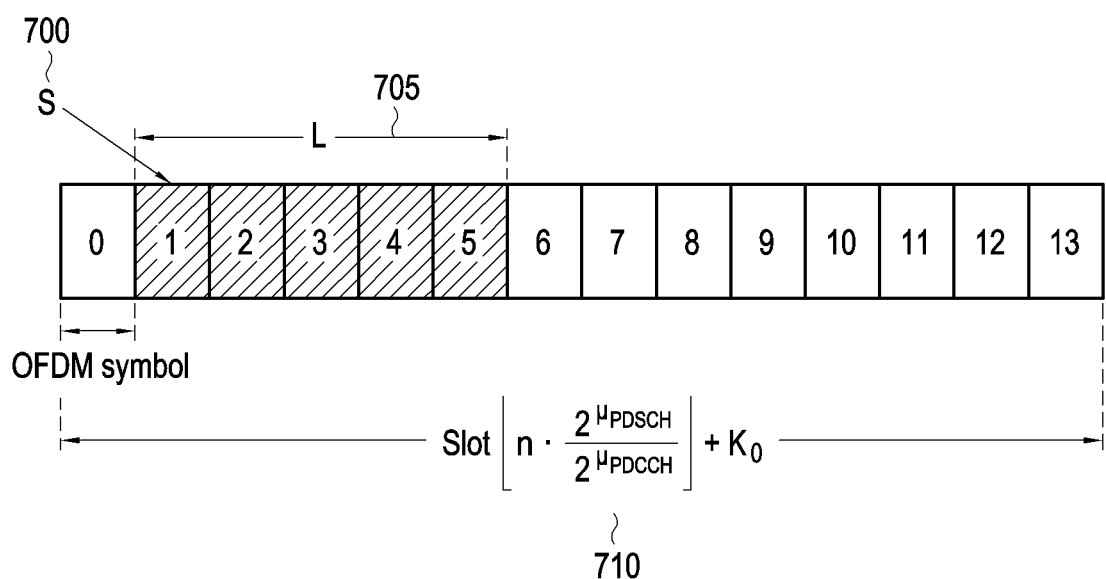
FIG. 7 is a view illustrating an example of time domain resource allocation in a wireless communication system.

FIG. 7 is a view illustrating an example of time domain resource allocation in a wireless communication system.

Referring to FIG. 7, the base station may indicate $\mu_{PDSCH}$ and $\mu_{PDCCH}$, respectively indicating the subcarrier spacings of the data channel and the control channel and $K_0$ indicating the scheduling offset, using higher layer signaling. Further, the base station may indicate the time domain resource of the PDSCH resource as the OFDM symbol start location 700 and length 705 in one slot dynamically indicated, using the DCI.

FIGS. 8A and 8B are views illustrating an example of time domain resource allocation according to a subcarrier spacing in a wireless communication system.

Referring to FIG. 8A, when the subcarrier spacings of the data channel and the control channel are the same (800) ($\mu_{PDSCH}=\mu_{PDCCH}$), the slot number for the data channel is identical to the slot number for the control channel, so that the base station and the UE may know that the scheduling offset occurs according to a predetermined slot offset $K_0$.

Referring to FIG. 8B, when the subcarrier spacings of the data channel and the control channel are different from each other (8-05) ($\mu_{PDSCH} \neq \mu_{PDCCH}$), the slot number for the data channel is different from the slot number for the control channel, so that the base station and the UE may know that the scheduling offset occurs according to a predetermined slot offset $K_0$ with respect to the subcarrier spacing of the PDCCH.

Although methods for offset interpretation for the cases where the subcarrier spacings are the same or different between the data channel and the control channel have been described above, the disclose is not limited thereto, but may also be similarly applied where the subcarrier spacings between different channels or reference signals are the same or different (e.g., when the subcarrier spacings are different between the CSI-RS and the control channel or when the subcarrier spacings are different between the SRS and the control channel).

NR may provide various types of DCI formats as illustrated in Table 13 below according to the purpose for efficient control channel reception by the UE.

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 to allocate, e.g., schedule, a PDSCH to one cell.

In an embodiment, DCI format 01 may include at least one of the following information when transmitted together with the CRC scrambled with cell radio network temporary identifier (C-RNTI) or configured scheduling RNTI (CS-RNTI) or new-RNTI.

identifier for DCI formats (1 bit): A DCI format indicator. This may always be set to 1.

frequency domain resource assignment ($N_{RBG}$ bits or $\lfloor \log_2(N_{RB}^{DL,BWP}(N_{RB}^{DL,BWP}+1)/2) \rfloor$ bits): indicates frequency domain resource allocation. When DCI format 1_0 is monitored in the UE specific search space, $N_{RB}^{DL,BWP}$ is the size of the active DL BWP, otherwise $N_{RB}^{DL,BWP}$ is the size of the initial DL BWP. $N_{RBG}$ is the number of the resource block group. The detailed method may refer to the frequency domain resource allocation described above.

time domain resource assignment (0-4 bits): may indicate time domain resource assignment as described above.

VRB-to-PRB mapping (1 bit): 0 may indicate non-interleaved, 1 may indicate interleaved VRP-to-PRB mapping.

modulation and coding scheme (5 bits): may indicate the modulation order and coding rate used for PDSCH transmission.

new data indicator (1 bit) field: may indicate whether PDSCH is initial transmission or retransmission depending on whether it is toggled.

redundancy version (2 bits): may indicate the redundancy version used for PDSCH transmission.

HARQ process number (4 bits): may indicate the HARQ processor number used for PDSCH transmission.

downlink assignment index (2 bits): A DAI indicator

TPC command for scheduled PUCCH (2 bits): A PUCCH power control indicator

PUCCH resource indicator (3 bits): may be a PUCCH resource indicator and indicate one of eight resources configured by higher layer signaling.

PDSCH-to-HARQ_feedback timing indicator (3 bits): may indicate one of eight feedback timing offsets configured by higher layer signaling.

In an embodiment, DCI format 11 may include at least one of the following information when transmitted along with the CRC scrambled by the cell radio network temporary identifier (C-RNTI) or configured scheduling RNTI (CS-RNTI) or new-RNTI.

identifier for DCI formats (1 bit): A DCI format indicator. This may always be set to 1.

carrier indicator (0 or 3 bits): may indicate the CC (or cell) where the PDSCH allocated by the corresponding DCI is transmitted.

bandwidth part indicator (0, 1 or 2 bits): may indicate the BWP through which the PDSCH allocated by the corresponding DCI is transmitted.

frequency domain resource assignment (including payload determined according to the frequency domain resource allocation): indicates the frequency domain resource allocation. $N_{RB}^{DL,BWP}$ is the size of the active DL BWP. The detailed method may refer to the frequency domain resource allocation described above.

time domain resource assignment (0-4 bits): may indicate time axis resource assignment as described above.

VRB-to-PRB mapping (0 or 1 bit): 0 may indicate non-interleaved, 1 may indicate interleaved VRP-to-PRB mapping. This is 0 bit when frequency domain resource allocation is set to RA type 0.

PRB bundling size indicator (0 or 1 bit): When the higher layer parameter prb-BundlingType is not set or is set to 'static', this is 0 bit, and when it is set to 'dynamic', this is 1 bit.

rate matching indicator (0 or 1 or 2 bits): may indicate the rate matching pattern.

ZP CSI-RS trigger (0 or 1 or 2 bits): An indicator that may trigger aperiodic ZP CSI-RS.

For transport block 1:

modulation and coding scheme (5 bits): may indicate the modulation order and coding rate used for PDSCH transmission.

new data indicator (1 bit) field: may indicate whether PDSCH is initial transmission or retransmission depending on whether it is toggled.

redundancy version (2 bits): may indicate the redundancy version used for PDSCH transmission.

For transport block 2:

modulation and coding scheme (5 bits): may indicate the modulation order and coding rate used for PDSCH transmission.

new data indicator (1 bit) field: may indicate whether PDSCH is initial transmission or retransmission depending on whether it is toggled.

redundancy version (2 bits): may indicate the redundancy version used for PDSCH transmission.

HARQ process number (4 bits): may indicate the HARQ processor number used for PDSCH transmission.

downlink assignment index (0 or 2 or 4 bits): A DAI indicator

TPC command for scheduled PUCCH (2 bits): A PUCCH power control indicator

PUCCH resource indicator (3 bits): may be a PUCCH resource indicator and indicate one of eight resources configured by higher layer signaling.

PDSCH-to-HARQ_feedback timing indicator (3 bits): may indicate one of eight feedback timing offsets configured by higher layer signaling.

antenna port (4 or 5 or 6 bits): may indicate DMRS port and CDM group without data.

transmission configuration indication (0 or 3 bits): TCI indicator.

SRS request (2 or 3 bits): SRS transmission request indicator

CBG transmission information (0 or 2 or 4 or 6 or 8 bits): An indicator indicating whether to transmit each code block group (CBG) in the allocated PDSCH. 0 may mean that no CBG is transmitted, and 1 may mean that CBG is transmitted.

CBG flushing out information (0 or 1 bit): An indicator indicating whether previous CBGs are contaminated—0 may mean that it may have been contaminated, and 1 may mean that it may be used when receiving retransmissions (combinable).

DMRS sequence initialization (0 or 1 bit): may be an indicator for selecting DMRS scrambling ID.

The number of DCIs with different sizes that the UE may receive per slot in one cell is up to 4. The number of DCIs with different sizes, scrambled with the C-RNTI, that the UE may receive per slot in one cell is up to 3.

In an embodiment, the antenna port indication may be indicated through at least one of Table 14 to Table 17 below.

TABLE 14

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
| --- | --- | --- |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 15

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 16

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 17

Antenna port(s) (1000 + DMRS port), dmrs-Type = 2, maxLength = 2

| One codeword: Codeword 0 enabled, Codeword 1 disabled | | | Two Codewords: Codeword 0 enabled, Codeword 1 enabled | | | |
| --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |

| Value | # CDM groups w/o data | DMRS port(s) | # front-load symbols | Value | # CDM groups w/o data | DMRS port(s) | # front-load symbols |
| --- | --- | --- | --- | --- | --- | --- | --- |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |

Table 14 is used when dmrs-type is 1 and maxLength is 1, and Table 15 is used when dmrs-type=1 and maxLength=2. When dmrs-type=2 and maxLength=1, Table 16 is used and, when drms-tpye is 2 and maxLength is 2, Table 17 is used to indicate the port of the DMRS as used.

The numbers 1, 2, and 3 indicated by the number of DMRS CDM group(s) without data may mean CDMR groups {0}, {0, 1}, and {0, 1, 2}, respectively. The DMRS port(s) is a sequence of indexes of ports to be used. The antenna port may be indicated as DMRS port+1000. The CDM group of the DMRS is connected to the method for generating the DMRS sequence and the antenna port as shown in Table 18 and Table 19. Table 18 shows parameters when dmrs-type=1 is used, and Table 19 shows parameters when dmrs-type=2 is used.

TABLE 18

Table 7.4.1.1.2-1: Parameters for PDSCH DM-RS configuration type 1.

| | CDM group | | $w_f(k')$ | | $w_t(l')$ | |
| --- | --- | --- | --- | --- | --- | --- |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 19

Table 7.4.1.1.2-2: Parameters for PDSCH DM-RS configuration type 2.

| | CDM group | | $w_f(k')$ | | $w_t(l')$ | |
| --- | --- | --- | --- | --- | --- | --- |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |

TABLE 19-continued

Table 7.4.1.1.2-2: Parameters for
PDSCH DM-RS configuration type 2.

| p | λ | Δ | $w_f(k')$ k'=0 | $w_f(k')$ k'=1 | $w_t(l')$ l'=0 | $w_t(l')$ l'=1 |
|---|---|---|---|---|---|---|
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The sequence of the DMRS according to each parameter may be determined by the following Equation 2.

$$a_{k,l}^{(p,\mu)} = \beta_{PDSCH}^{DMRS} w_f(k')w_t(l')r(2n+k')$$ Equation 2

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Figures 9A, 9B:
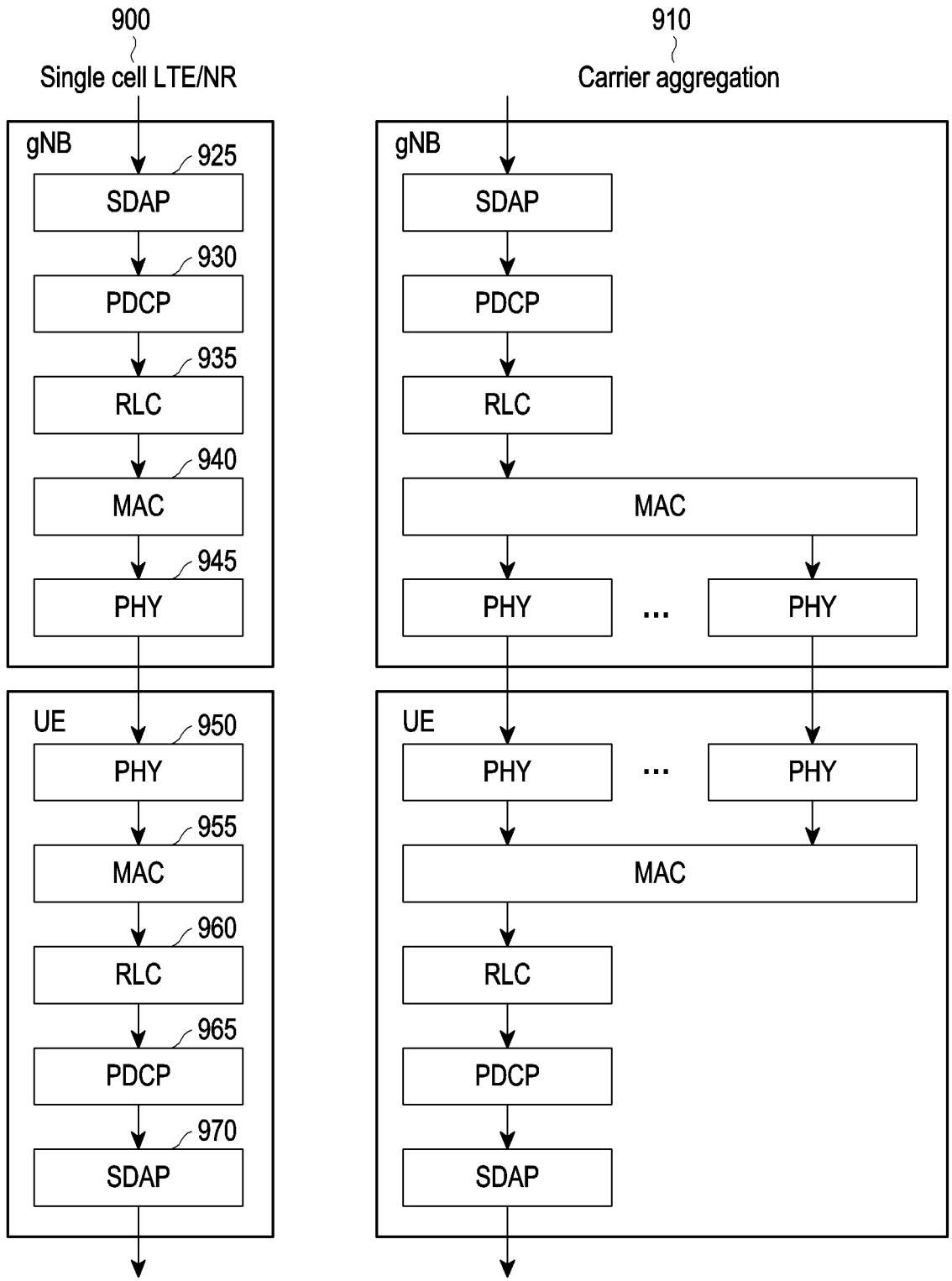
FIGS. 9A, 9B, and 9C are views illustrating a base station and UE radio protocol structure in a wireless communication system.
Figure 9C:
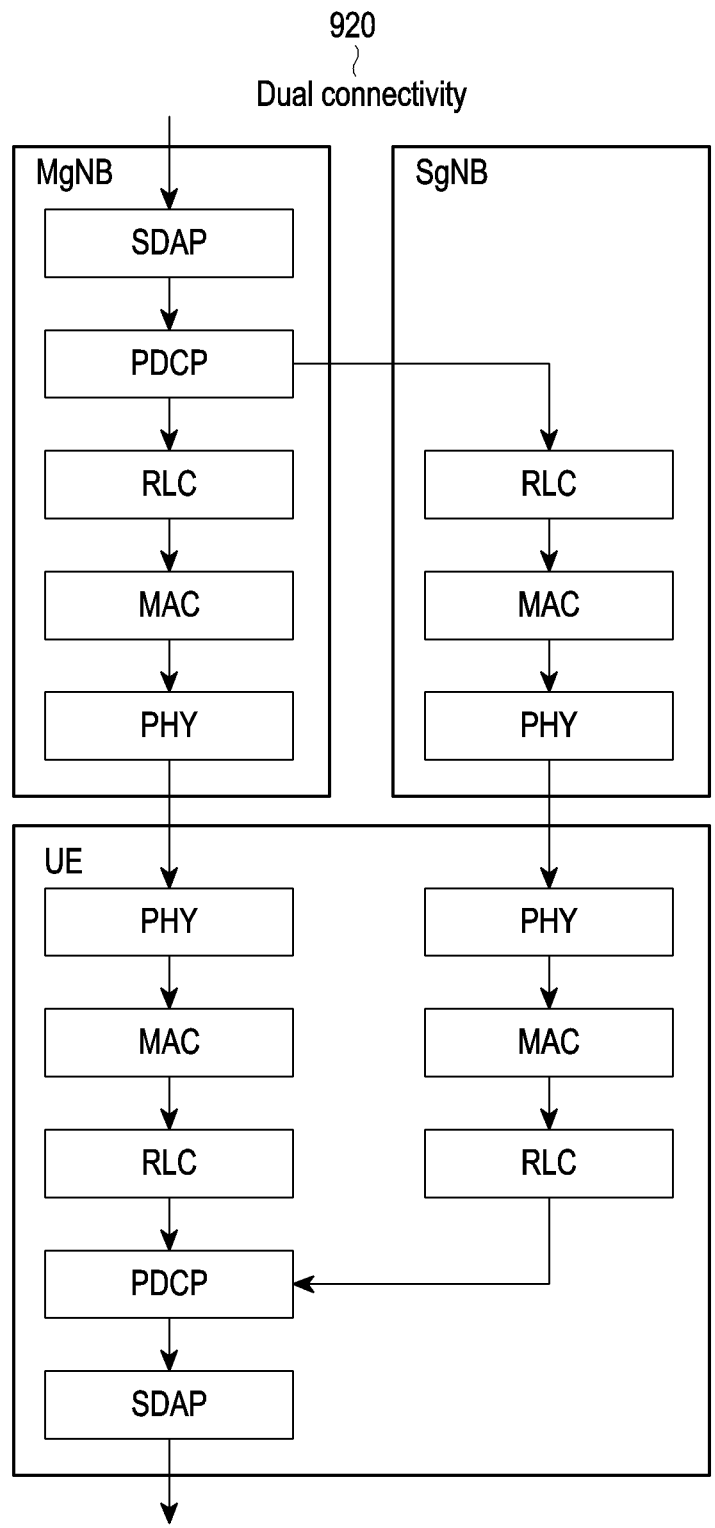

FIGS. 9A, 9B, and 9C are views illustrating the base station and UE radio protocol structures when performing single cell, carrier aggregation (CA), and dual connectivity (DC), respectively, in a wireless communication system.

Referring to FIG. 9A, the radio protocol stack of the wireless communication system may be constituted of an NR service data adaptation protocol (NR SDAP) 925 or 970, an NR packet data convergence protocol (NR PDCP) 930 or 965, an NR radio link control (NR RLC) 935 or 960, and an NR medium access control (NR MAC) 940 or 955 in each of the UE and the base station.

The NR SDAP layers 925 and 970 may include at least some of the following functions.

transfer of user plane data mapping between a QoS flow and a data radio bearer (DRB) for both DL and UL marking QoS flow ID in both DL and UL packets reflective QoS flow to DRB mapping for the UL SDAP PDUs).

For the SDAP layer, the UE may be configured with whether to use the header of the SDAP layer or whether to use the function of the SDAP layer for each PDCP layer, each bearer, or each logical channel, by the RRC message. When the SDAP header is configured, the one bit NAS reflective QoS indicator and one bit AS reflective QoS indicator of the SDAP header may instruct the UE to update or reset the mapping information of the data bearer and QoS flow of uplink and downlink. The SDAP header may include QoS flow ID indicating QoS. The QoS information identified by the QoS flow ID may be used to determine scheduling information and/or data processing priority for smoothly supporting service.

The NR PDCP layers 930 and 965 may include at least some of the following functions.

header compression and decompression: ROHC only transfer of user data in-sequence delivery of upper layer PDUs Out-of-sequence delivery of upper layer PDUs PDCP PDU reordering for reception Duplicate detection of lower layer SDUs Retransmission of PDCP SDUs Ciphering and deciphering Timer-based SDU discard in uplink The reordering of the NR PDCP refers to reordering PDCP PDUs received by the lower layer based on the PDCP sequence numbers (SNs) and may include transferring the data to the higher layer in the reordered sequence or immediately without considering order, recording PDCP PDUs missed by reordering, reporting the state of the missing PDCP PDUs to the transmit part, and requesting to retransmit the missing PDCP PDUs.

The NR RLC layers 935 and 960 may include at least some of the following functions.

transfer of upper layer PDUs in-sequence delivery of upper layer PDUs out-of-sequence delivery of upper layer PDUs error Correction through ARQ concatenation, segmentation and reassembly of RLC SDUs re-segmentation of RLC data PDUs reordering of RLC data PDUs duplicate detection protocol error detection RLC SDU discard RLC re-establishment The in-sequence delivery of the NR RLC layers 935 and 960 refers to transferring the RLC SDUs received from the lower layer to the higher layer in order and, if one original RLC SDU is split into several RLC SDUs that are then received, the in-sequence delivery may include reassembling and transferring them, reordering the received RLC PDUs based on the RLC sequence numbers (SNs) or PDCP sequence numbers (SNs), recording the RLC PDUs missed by reordering, reporting the state of the missing RLC PDUs to the transmit part, and requesting to retransmit the missing RLC PDUs and, if there are missing RLC SDUs, the in-sequence delivery may include transferring only RLC SDUs before the missing RLC SDUs to the higher layer in order. Although there are missing RLC SDUs, if a predetermined timer has expired, the in-sequence delivery may include transferring all of the RLC SDUs received before the timer starts to the higher layer in order. Or, although there are missing RLC SDUs, if the predetermined timer has expired, the in-sequence delivery may include transferring all of the RLC SDUs received thus far to the higher layer in order.

The NR RLC layers 935 and 960 may process RLC PDUs in order of reception (in order of arrival regardless of the SN sequence) and deliver to the PDCP device regardless of order (out-of-sequence delivery) and, if the received RLC PDU is a segment, store in a buffer or combine it with segments received later to be reconstructed into a single whole RLC PDU, and then, transfer the whole RLC PDU to the PDCP device. The NR RLC layer may not include the concatenation function, and the concatenation function may be performed in the NR MAC layer or replaced with the multiplexing function of the NR MAC layer.

The out-of-sequence delivery of the NR RLC layers 935 and 960 refers to the function of immediately delivering the RLC SDUs received from the lower layer regardless of order and, when the originally single RLC SDU is divided into several RLC SDUs which are then received, include the function of reassembling and delivering them, and may include the function of storing the RLC SN or PDCP SN of the received RLC PDUs and reordering, and recording missing RLC PDUs.

The NR MAC layers 940 and 955 may be connected with several NR RLC layer modules configured in one UE and may include at least some of the following functions.

mapping between logical channels and transport channels
multiplexing/demultiplexing of MAC SDUs
scheduling information reporting
error correction through HARQ
priority handling between logical channels of one UE
priority handling between UEs by means of dynamic scheduling
MBMS service identification
transport format selection
Padding The NR PHY layers 945 and 950 may channel-code and modulate higher layer data into OFDM symbols, transmit the OFDM symbols through a wireless channel or demodulates OFDM symbols received through a wireless channel, channel-decodes and transfers the same to a higher layer.

The detailed structure of the radio protocol structure may be varied depending on the carrier (or cell) operating scheme. As an example, when the base station transmits data to the UE based on a single carrier (or cell), the base station and the UE may use the protocol structure having a single structure for each layer like the single cell protocol structure 900 of FIG. 9A.

Referring to FIG. 9B, when the base station transmits data to the UE based on carrier aggregation (CA) that uses multiple carriers at a single transmit and receive point (TRP), the CA protocol structure 910 of the base station and the UE may have a single structure in the higher layers before the RLC and multiplex multiple PHY layers through the MAC layer.

Referring to FIG. 9C, when the base station transmits data to the UE based on dual connectivity (DC) that uses multiple carriers at multiple TRPs, the DC protocol structure 920 of the base station and the UE may have a single structure in the higher layers before the PDCP and may include multiple RLC/MAC/PHY layers.

In LTE and NR, the UE has a procedure of reporting the capability supported by the UE to the base station while being connected to the serving base station. Hereinafter, the report may be referred to as a UE capability report. The base station may transfer a UE capability enquiry message for requesting capability report to the UE in the connected state. The UE capability enquiry message may include a UE capability request for each radio access technology (RAT) type. The request for each RAT type may include requested frequency band information. Further, the UE capability enquiry message may include one RRC message container requesting a plurality of RAT types. Alternatively, a plurality of UE capability enquiry messages including a request for each RAT type may be transferred to the UE. In other words, a plurality of UE capability enquiries may be transmitted, and the UE may configure a plurality of UE capability information messages corresponding to the UE capability enquiries and report them to the base station. In the next-generation mobile communication system, a UE capability report for NR, LTE, EN-DC (LTE-NR DC), or MR-DC (multi-RAT DC) may be requested. Although the UE capability enquiry message is generally transmitted at the beginning of the UE's connection, the base station may transmit the UE capability enquiry message when necessary even after the UE establishes the connection.

Upon receiving a request for UE capability report from the base station, the UE may configure UE capability according to the RAT type and band information requested from the base station. A method for the UE to configure UE capability in the NR system is described below.

1. When the UE is provided with a list of LTE and/or NR bands at the request for UE capability from the base station, the UE may configure a band combination (BC) for EN-DC and NR standalone (SA). In other words, the UE may construct a BC candidate list for EN-DC and NR SA based on the bands requested by the base station through FreqBandlist. Band priorities may have priorities in the order listed in FreqBandlist.

2. When the base station transmits a UE capability report request including an "eutra-nr-only" flag or a "eutra" flag, the UE may completely remove the bands related to the BCs of the NR SA from the configured BC candidate list. In an embodiment, this operation may be performed when the eNB, which is an LTE base station, requests "eutra" capability.

3. The UE may remove fallback BCs from the BC candidate list configured in step 2. Here, removing the fallback BC means removing a band corresponding to at least one SCell in a certain super set BC, and since the super set BC may already cover the fallback BC, the fallback BC may be omitted. Step 3 may also be applied to MR-DC, that is, LTE bands may also be applied. Step 3. Thereafter, the remaining BCs may be the final "candidate BC list".

4. The UE may select BCs fitting the requested RAT type in the final "candidate BC list" to select BCs to be reported. The UE may configure a supportedBandCombinationList including the selected BCs in a predetermined order. In other words, the UE may configure the UE capability and the BC to be reported according to the preset order of rat-type (e.g., nr->eutra-nr->eutra). Further, the UE may configure a featureSetCombination for the configured supportedBandCombinationList and configure a "candidate feature set combination" list in the candidate BC list where the fallback BCs (including the capability of the same or lower step) have been removed. The "candidate feature set combination" may include the whole feature set combination for NR and EUTRA-NR BC and be obtained from the feature set combination of the UE-MRDC-Capabilities container and the UE-NR-Capabilities.

5. If the requested rat Type is eutra-nr and has an influence, the feature set combination may be wholly included in the two containers of the UE-MRDC-Capabilities and the UE-NR-Capabilities. However, the NR feature set may be included only in the UE-NR-Capabilities.

After the UE capability is configured, the UE may transfer a UE capability information message including the UE capability to the base station. The base station may perform appropriate scheduling and transmission/reception management on the UE based on the UE capability received from the UE.

In NR, channel state information reference signal (CSI-RS) is used as the reference signal for UE's channel state report and, in an embodiment, each CSI-RS resource configuration configured by higher layer may include at least one of the following detailed configuration information. However, it is not limited to the following examples.

NZP-CSI-RS-Resource ConfigID: ID of NZP (non-zero-power) CSI-RS resource configurations NrofPorts: Number of CSI-RS ports included in the CSI-RS resource CSI-RS-timeConfig: Transmission period and slot offset of CSI-RS resource CSI-RS-ResourceMapping: OFDM symbol location in slot of CSI-RS resource and subcarrier location in PRB CSI-RS-Density: Frequency density of CSI-RS.

CDMType: CDM length and CDM RE pattern of CSI-RS.

CSI-RS-FreqBand: CSI-RS transmission bandwidth and start location

Pc: Ratio between PDSCH EPRE (Energy Per RE) and NZP CSI-RS EPRE

Pc-SS: Ratio between SS/PBCH block EPRE and NZP CSI-RS EPRE

CSI-RS-ResourceRep: may indicate the relationship between the NZP CSI-RS resources belonging to one resource set. If CSI-RS-ResourceRep is 'ON', the UE may know that the same spatial domain transmission filter is applied to the NZP CSI-RS resources belonging to the resource set (i.e., the UE may assume that the base station has used the same transmission beam in the NZP CSI-RS resources), and each NZP CSI-RS resource has the same number and periodicity of CSI-RS ports. If CSI-RS-ResourceRep is 'OFF', the UE may not assume that the same spatial domain transmission filter is applied to the NZP CSI-RS resources belonging to the resource set (i.e., the UE may not assume that the base station has used the same transmission beam in the NZP CSI-RS resources), and may not know that each NZP CSI-RS resource has the same number and periodicity of CSI-RS ports.

In the NR communication system, one of {1, 2, 4, 8, 12, 16, 24, 32}, as the number of CSI-RS ports, may be set in one CSI-RS resource, and a different configuration degree of The CSI-RS component RE pattern is a basic unit constituting the CSI-RS resource and may be constituted of a total of YZ REs including Y=1+max (k') REs adjacent in the frequency axis and Z=1+max (l') REs adjacent in the time axis. In NR, a different frequency axis configuration degree of freedom may be supported depending on the number of CSI-RS ports set in the CSI-RS resource.

In the case of one port, the CSI-RS may be configured without subcarrier limitations in the PRB, and the UE may receive a designation of the CSI-RS RE location by a 12-bit bitmap (1000). In the case of {2, 4, 8, 12, 16, 24, or 32} ports and Y=2, the CSI-RS may be configured every two subcarriers in the PRB, and the UE may receive a designation of the locations of the CSI-RS REs by a 6-bit bitmap. In the case of four ports and Y=4, the CSI-RS may be configured every four subcarriers in the PRB, and the UE may receive a designation of the locations of the CSI-RS REs by a 3-bit bitmap. Similarly, in the case of the time domain, the UE may receive a designated of the CSI-RS RE location by a bitmap of a total of 14 bits. In this case, the length of the bitmap may be varied like the frequency domain location designation according to the Z value in Table 20 indicating the CSI-RS locations within a slot, but a similar principle applies, so that a detailed description is omitted.

TABLE 20

| Row | Ports X | Density ρ | Ccdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0),$ $(k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1),$ $(k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1),$ $(k_1, l_0 + 1), (k_2, l_0 + 1),$ $(k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0),$ $(k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 | freedom may be supported depending on the number of CSI-RS ports set in the CSI-RS resource.

In an embodiment, Table 20 shows the CSI-RS density, CDM length and type, frequency domain and time domain start location $\bar{k}$, $\bar{l}$, the number k' of the frequency domain REs and the number l' of the time domain REs of the CSI-RS component RE pattern, as configurable according to the number X of NR CSI-RS ports.

Figure 10:
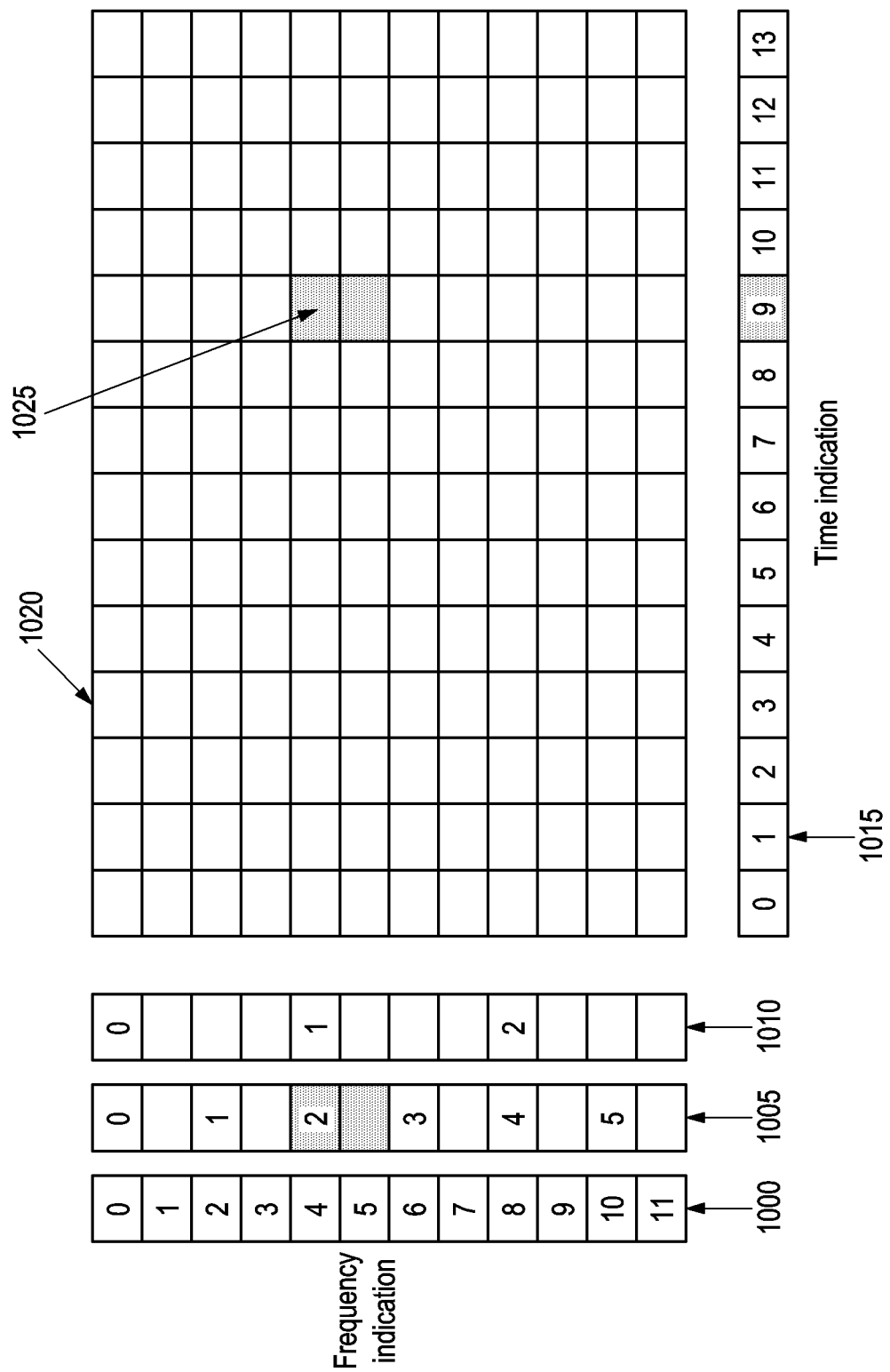
FIG. 10 is a view illustrating an example of configuring a CSI-RS by CSI-RS resource mapping.

FIG. 10 is a view illustrating an example of configuring a CSI-RS by CSI-RS resource mapping.

Referring to FIG. 10, an example of CSI-RS RE configuration by CSI-RS-ResourceMapping configured by a higher layer is illustrated. When X=2 ports are configured, the base station may designate the RE locations by the frequency indication 1005 and, if the base station designates the subcarrier location by the frequency indication 1005 value 2 and designates the OFDM symbol location by the frequency indication 1015 value 9, the UE may know that the CSI-RS is transmitted in the RE location 1025 in the PRB 1020.

<Channel State Measurement and Reporting>

A method for measuring and reporting the channel state in a 5G communication system is described below in detail.

Channel state information (CSI) may include at least one of a channel quality information (CQI), precoding matric indicator (PMI), CSI-RS resource indicator (CRI), SS/PBCH block resource indicator (SSBRI), layer indicator (LI), rank indicator (RI), and/or L1-reference signal received power (RSRP). The base station may control time and frequency resources for CSI measurement and reporting of the UE.

For CSI measurement and reporting, the UE may receive a configuration of at least one of configuration information (CSI-ReportConfig) for N(≥1) CSI reports, configuration information (CSI-ResourceConfig) for M(≥1) RS transmission resources, or list information (CSI-AperiodicTriggerStateList, CSI-SemiPersistentOnPUSCH-TriggerStateList) for one or more trigger states through higher layer signaling.

In an embodiment, the configuration information of CSI measurement and reporting may be as shown in Table 21 to Table 27.

TABLE 21

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig information element

```
-- ASN1START
-- TAG-CSI-REPORTCONFIG-START
CSI-ReportConfig ::=                          SEQUENCE {
    reportConfigId                                CSI-ReportConfigId,
    carrier                                       ServCellIndex              OPTIONAL,
-- Need S
    resourcesForChannelMeasurement                CSI-ResourceConfigId,
    csi-IM-ResourcesForInterference                                          CSI-ResourceConfigId
OPTIONAL,   -- Need R
    nzp-CSI-RS-ResourcesForInterference                                      CSI-ResourceConfigId
OPTIONAL,   -- Need R
    reportConfigType                              CHOICE {
        periodic                                    SEQUENCE {
            reportSlotConfig                            CSI-ReportPeriodicityAndOffset,
            pucch-CSI-ResourceList                      SEQUENCE (SIZE (1..maxNrofBWPs))
OF PUCCH-CSI-Resource
        },
        semiPersistentOnPUCCH                       SEQUENCE {
            reportSlotConfig                            CSI-ReportPeriodicityAndOffset,
            pucch-CSI-ResourceList                      SEQUENCE (SIZE (1..maxNrofBWPs))
OF PUCCH-CSI-Resource
        },
        semiPersistentOnPUSCH                       SEQUENCE {
            reportSlotConfig                            ENUMERATED {sl5, sl10, sl20,
sl40, sl80, sl160, sl320},
            reportSlotOffsetList                        SEQUENCE (SIZE (1.. maxNrofUL-
Allocations)) OF INTEGER(0..32),
            p0alpha                                     P0-PUSCH-AlphaSetId
        },
        aperiodic                                   SEQUENCE {
            reportSlotOffsetList                        SEQUENCE (SIZE (1..maxNrofUL-
Allocations)) OF INTEGER(0..32)
        }
    },
    reportQuantity                                CHOICE {
        none                                          NULL,
        cri-RI-PMI-CQI                                NULL,
        cri-RI-i1                                     NULL,
        cri-RI-i1-CQI                                 SEQUENCE {
            pdsch-BundleSizeForCSI                       ENUMERATED {n2, n4}
OPTIONAL    -- Need S
        },
        cri-RI-CQI                                    NULL,
        cri-RSRP                                      NULL,
        ssb-Index-RSRP                                NULL,
        cri-RI-LI-PMI-CQI                             NULL
    },
    reportFreqConfiguration                       SEQUENCE {
        cqi-FormatIndicator                           ENUMERATED { widebandCQI,
subbandCQI }                                  OPTIONAL,   -- Need R
        pmi-FormatIndicator                           ENUMERATED { widebandPMI,
subbandPMI }                                  OPTIONAL,   -- Need R
        csi-ReportingBand                             CHOICE {
            subbands3                                    BIT STRING(SIZE(3)),
```

TABLE 21-continued

```
            subbands4                               BIT STRING(SIZE(4)),
            subbands5                               BIT STRING(SIZE(5)),
            subbands6                               BIT STRING(SIZE(6)),
            subbands7                               BIT STRING(SIZE(7)),
            subbands8                               BIT STRING(SIZE(8)),
            subbands9                               BIT STRING(SIZE(9)),
            subbands10                              BIT STRING(SIZE(10)),
            subbands11                              BIT STRING(SIZE(11)),
            subbands12                              BIT STRING(SIZE(12)),
            subbands13                              BIT STRING(SIZE(13)),
            subbands14                              BIT STRING(SIZE(14)),
            subbands15                              BIT STRING(SIZE(15)),
            subbands16                              BIT STRING(SIZE(16)),
            subbands17                              BIT STRING(SIZE(17)),
            subbands18                              BIT STRING(SIZE(18)),
            ...,
            subbands19-v1530                        BIT STRING(SIZE(19))
        } OPTIONAL    -- Need S
    }
OPTIONAL,  -- Need R
    timeRestrictionForChannelMeasurements           ENUMERATED {configured,
notConfigured},
    timeRestrictionForInterferenceMeasurements      ENUMERATED {configured,
notConfigured},
    codebookConfig                                  CodebookConfig
OPTIONAL,  -- Need R
    dummy                                           ENUMERATED {n1, n2}
OPTIONAL,   -- Need R
    groupBasedBeamReporting                         CHOICE {
        enabled                                         NULL,
        disabled                                        SEQUENCE {
            nrofReportedRS                                  ENUMERATED {n1, n2, n3, n4}
OPTIONAL    -- Need S
        }
    },
    cqi-Table                       ENUMERATED {table1, table2, table3, spare1}
OPTIONAL,   -- Need R
    subbandSize                     ENUMERATED {value1, value2},
    non-PMI-PortIndication                          SEQUENCE (SIZE (1..maxNrofNZP-CSI-RS-
ResourcesPerConfig)) OF PortIndexFor8Ranks OPTIONAL,    -- Need R
    ...,
    [[
    semiPersistentOnPUSCH-v1530                     SEQUENCE {
        reportSlotConfig-v1530                          ENUMERATED {sl4, sl8, sl16}
    }
OPTIONAL    -- Need R
    ]],
    [[
    semiPersistentOnPUSCH-v16xy                     SEQUENCE {
        reportSlotOffsetListForDCI-Format0-2-r16            SEQUENCE (SIZE (1..
maxNrofUL-Allocations-r16)) OF INTEGER (0..32)
OPTIONAL,   -- Need R
        reportSlotOffsetListForDCI-Format0-1-r16            SEQUENCE (SIZE (1..
maxNrofUL-Allocations-r16)) OF INTEGER (0..32)
OPTIONAL,   -- Need R
    }
OPTIONAL,   -- Need R
    reportQuantity-r16                              CHOICE {
        cri-SINR-r16                                    NULL,
        ssb-Index-SINR-r16                              NULL
    }
OPTIONAL,   -- Need R
    nrofReportedRS-ForSINR-r16                      ENUMERATED {n1, n2, n3, n4}
OPTIONAL,   -- Need S
    codebookConfig-r16                              CodebookConfig-r16
OPTIONAL,   -- Need R
    ]]
}
CSI-ReportPeriodicityAndOffset ::=      CHOICE {
    slots4                              INTEGER(0..3),
    slots5                              INTEGER(0..4),
    slots8                              INTEGER(0..7),
    slots10                             INTEGER(0..9),
    slots16                             INTEGER(0..15),
    slots20                             INTEGER(0..19),
    slots40                             INTEGER(0..39),
    slots80                             INTEGER(0..79),
    slots160                            INTEGER(0..159),
    slots320                            INTEGER(0..319)
}
```

TABLE 21-continued

```
PUCCH-CSI-Resource ::=              SEQUENCE {
    uplinkBandwidthPartId               BWP-Id,
    pucch-Resource                      PUCCH-ResourceId
}
PortIndexFor8Ranks ::=              CHOICE {
    portIndex8                          SEQUENCE{
        rank1-8                                             PortIndex8
OPTIONAL,    -- Need R
        rank2-8                                     SEQUENCE(SIZE(2)) OF PortIndex8
OPTIONAL,    -- Need R
        rank3-8                                     SEQUENCE(SIZE(3)) OF PortIndex8
OPTIONAL,    -- Need R
        rank4-8                                     SEQUENCE(SIZE(4)) OF PortIndex8
OPTIONAL,    -- Need R
        rank5-8                                     SEQUENCE(SIZE(5)) OF PortIndex8
OPTIONAL,    -- Need R
        rank6-8                                     SEQUENCE(SIZE(6)) OF PortIndex8
OPTIONAL,    -- Need R
        rank7-8                                     SEQUENCE(SIZE(7)) OF PortIndex8
OPTIONAL,    -- Need R
        rank8-8                                     SEQUENCE(SIZE(8)) OF PortIndex8
OPTIONAL     -- Need R
    },
    portIndex4                          SEQUENCE{
        rank1-4                                             PortIndex4
OPTIONAL,    -- Need R
        rank2-4                                     SEQUENCE(SIZE(2)) OF PortIndex4
OPTIONAL,    -- Need R
        rank3-4                                     SEQUENCE(SIZE(3)) OF PortIndex4
OPTIONAL,    -- Need R
        rank4-4                                     SEQUENCE(SIZE(4)) OF PortIndex4
OPTIONAL     -- Need R
    },
    portIndex2                          SEQUENCE{
        rank1-2                                             PortIndex2
OPTIONAL,    -- Need R
        rank2-2                                     SEQUENCE(SIZE(2)) OF PortIndex2
OPTIONAL,    -- Need R
    },
    portIndex1                          NULL
}
PortIndex8::=                       INTEGER (0..7)
PortIndex4::=                       INTEGER (0..3)
PortIndex2::=                       INTEGER (0..1)
-- TAG-CSI-REPORTCONFIG-STOP
-- ASN1STOP
```

| CSI-ReportConfig field descriptions |
|---| carrier
Indicates in which serving cell the CSI-ResourceConfig indicated below are to be found. If the field is absent, the resources are on the same serving cell as this report configuration.
codebookConfig
Codebook configuration for Type-1 or Type-2 including codebook subset restriction. If the field codebookConfig-r16 is present, UE shall ignore the codebookConfig (without suffix).
cqi-FormatIndicator
Indicates whether the UE shall report a single (wideband) or multiple (subband) CQI. (see TS 38.214 [19], clause 5.2.1.4).
cqi-Table
Which CQI table to use for CQI calculation (see TS 38.214 [19], clause 5.2.2.1).
csi-IM-ResourcesForInterference
CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.
csi-ReportingBand
Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).
dummy
This field is not used in the specification. If received it shall be ignored by the UE.
groupBasedBeamReporting
Turning on/off group beam based reporting (see TS 38.214 [19], clause 5.2.1.4).
non-PMI-PortIndication
Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).

TABLE 21-continued

The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.
nrofReportedRS
The number (N) of measured RS resources to be reported per report setting in a non-group-based report. N <= N_max, where N_max is either 2 or 4 depending on UE capability.
(see TS 38.214 [19], clause 5.2.1.4) When the field is absent the UE applies the value 1.
nrofReportedRS-ForSINR
The number (N) of measured RS resources to be reported per report setting. N <= N_max (see TS 38.214 [19], clause x). When the field is absent the UE applies the value 1.
nzp-CSI-RS-ResourcesForInterference
NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.
p0alpha
Index of the p0-alpha set determining the power control for this CSI report transmission (see TS 38.214 [19], clause 6.2.1.2).
pdsch-BundleSizeForCSI
PRB bundling size to assume for CQI calculation when reportQuantity is CRI/RI/i1/CQI. If the field is absent, the UE assumes that no PRB bundling is applied (see TS 38.214 [19], clause 5.2.1.4.2).
pmi-FormatIndicator
Indicates whether the UE shall report a single (wideband) or multiple (subband) PMI. (see TS 38.214 [19], clause 5.2.1.4).
pucch-CSI-ResourceList
Indicates which PUCCH resource to use for reporting on PUCCH.
reportConfigType
Time domain behavior of reporting configuration.
reportFreqConfiguration
Reporting configuration in the frequency domain. (see TS 38.214 [19], clause 5.2.1.4).
reportQuantity
The CSI related quantities to report. see TS 38.214 [19], clause 5.2.1. If the field reportQuantity-r16 is present, UE shall ignore reportQuantity (without suffix).
reportSlotConfig
Periodicity and slot offset (see TS 38.214 [19], clause 5.2.1.4). If the field reportSlotConfig-v1530 is present, the UE shall ignore the value provided in reportSlotConfig (without suffix).
reportSlotOffsetList, reportSlotOffsetListForDCI-Format0-1, reportSlotOffsetListForDCI-Format0-2
Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n + Y, second report in n + Y + P, where P is the configured periodicity.
Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 6.1.2.1). The field reportSlotOffsetList refers to DCI format 0_0, the field reportSlotOffsetListForDCI-Format0-1 refers to DCI format 0_1 and the field reportSlotOffsetListForDCI-Format0-2 refers to DCI format 0_2, respectively (see TS 38.214 [19], clause 6.1.2.1).
resourcesForChannelMeasurement
Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.
subbandSize
Indicates one out of two possible BWP-dependent values for the subband size as indicated in TS 38.214 [19], table 5.2.1.4-2. If csi-ReportingBand is absent, the UE shall ignore this field.
timeRestrictionForChannelMeasurements
Time domain measurement restriction for the channel (signal) measurements (see TS 38.214 [19], clause 5.2.1.1).
timeRestrictionForInterferenceMeasurements
Time domain measurement restriction for interference measurements (see TS 38.214 [19], clause 5.2.1.1).

TABLE 22

CSI-ResourceConfig

The IE CSI-ResourceConfig defines a group of one or more NZP-CSI-RS-ResourceSet, CSI-IM-ResourceSet and/or CSI-SSB-ResourceSet.

CSI-ResourceConfig information element

```
-- ASN1START
-- TAG-CSI-RESOURCECONFIG-START
    CSI-ResourceConfig ::=              SEQUENCE {
        csi-ResourceConfigId                CSI-ResourceConfigId,
        csi-RS-ResourceSetList              CHOICE {
            nzp-CSI-RS-SSB                      SEQUENCE {
                nzp-CSI-RS-ResourceSetList   SEQUENCE (SIZE (1..maxNrofNZP-
    CSI-RS-ResourceSetsPerConfig)) OF NZP-CSI-RS-ResourceSetId
    OPTIONAL, -- Need R
                csi-SSB-ResourceSetList      SEQUENCE (SIZE (1..maxNrofCSI-SSB-
    ResourceSetsPerConfig)) OF CSI-SSB-ResourceSetId
    OPTIONAL -- Need R
            },
            csi-IM-ResourceSetList       SEQUENCE (SIZE (1..maxNrofCSI-IM-
    ResourceSetsPerConfig)) OF CSI-IM-ResourceSetId
        },
        bwp-Id                          BWP-Id,
        resourceType                    ENUMERATED { aperiodic, semiPersistent,
    periodic },
        ...
    }
-- TAG-CSI-RESOURCECONFIG-STOP
-- ASN1STOP
```

CSI-ResourceConfig field descriptions bwp-Id
The DL BWP which the CSI-RS associated with this CSI-ResourceConfig are located in (see TS 38.214 [19],
clause 5.2.1.2.
csi-IM-ResourceSetList
List of references to CSI-IM resources used for beam measurement and reporting in a CSI-RS resource set.
Contains up to maxNrofCSI-IM-ResourceSetsPerConfig resource sets if resourceType is 'aperiodic' and 1
otherwise (see TS 38.214 [19], clause 5.2.1.2).
csi-ResourceConfigId
Used in CSI-ReportConfig to refer to an instance of CSI-ResourceConfig.
csi-SSB-ResourceSetList
List of references to SSB resources used for beam measurement and reporting in a CSI-RS resource set
(see TS 38.214 [19], clause 5.2.1.2).
nzp-CSI-RS-ResourceSetList
List of references to NZP CSI-RS resources used for beam measurement and reporting in a CSI-RS resource
set. Contains up to maxNrofNZP-CSI-RS-ResourceSetsPerConfig resource sets if resourceType is 'aperiodic'
and 1 otherwise (see TS 38.214 [19], clause 5.2.1.2).
resourceType
Time domain behavior of resource configuration (see TS 38.214 [19], clause 5.2.1.2). It does not apply to
resources provided in the csi-SSB-ResourceSetList.

TABLE 23

NZP-CSI-RS-ResourceSet

The IE NZP-CSI-RS-ResourceSet is a set of Non-Zero-Power (NZP) CSI-RS resources (their IDs)
and set-specific parameters.

NZP-CSI-RS-ResourceSet information element

```
-- ASN1START
-- TAG-NZP-CSI-RS-RESOURCESET-START
NZP-CSI-RS-ResourceSet ::=              SEQUENCE {
    nzp-CSI-ResourceSetId                   NZP-CSI-RS-ResourceSetId,
    nzp-CSI-RS-Resources                    SEQUENCE (SIZE (1..maxNrofNZP-CSI-
RS-ResourcesPerSet)) OF NZP-CSI-RS-ResourceId,
    repetition                          ENUMERATED { on, off }
OPTIONAL,    -- Need S
    aperiodicTriggeringOffset           INTEGER(0..6)
OPTIONAL,    -- Need S
    trs-Info                            ENUMERATED {true}
OPTIONAL,    -- Need R
    ...,
    [[
    aperiodicTriggeringOffsetExt-r16        INTEGER(0..31)
```

TABLE 23-continued

OPTIONAL -- Need S
    ]]
}
-- TAG-NZP-CSI-RS-RESOURCESET-STOP
-- ASN1STOP

NZP-CSI-RS-ResourceSet field descriptions aperiodicTriggeringOffset, aperiodicTriggeringOffsetExt
Offset X between the slot containing the DCI that triggers a set of aperiodic NZP CSI-RS resources and the slot in which the CSI-RS resource set is transmitted. For aperiodicTriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffsetExt, the value indicates the number of slots. The network configures only one of the fields. When neither field is included, the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set.
repetition
Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). Can only be configured for CSI-RS resource sets which are associated with CSI-ReportConfig with report of L1 RSRP or "no report".
trs-Info
Indicates that the antenna port for all NZP-CSI-RS resources in the CSI-RS resource set is same. If the field is absent or released the UE applies the value false (see TS 38.214 [19], clause 5.2.2.3.1).

TABLE 24

CSI-SSB-ResourceSet

The IE CSI-SSB-ResourceSet is used to configure one SS/PBCH block resource set which refers to SS/PBCH as indicated in ServingCellConfigCommon.

CSI-SSB-ResourceSet information element

-- ASN1START
-- TAG-CSI-SSB-RESOURCESET-START
        CSI-SSB-ResourceSet ::=         SEQUENCE {
            csi-SSB-ResourceSetId           CSI-SSB-ResourceSetId,
            csi-SSB-ResourceList            SEQUENCE (SIZE(1..maxNrofCSI-
        SSB-ResourcePerSet)) OF SSB-Index,
            ...
        }
-- TAG-CSI-SSB-RESOURCESET-STOP
-- ASN1STOP

TABLE 25

CSI-IM-ResourceSet

The IE CSI-IM-ResourceSet is used to configure a set of one or more CSI Interface Management (IM) resources (their IDs) and set-specific parameters.

CSI-IM-ResourceSet information element

-- ASN1START
-- TAG-CSI-IM-RESOURCESET-START
        CSI-IM-ResourceSet ::=          SEQUENCE {
            csi-IM-ResourceSetId            CSI-IM-ResourceSetId,
            csi-IM-Resources                SEQUENCE (SIZE(1..maxNrofCSI-
        IM-ResourcesPerSet)) OF CSI-IM-ResourceId,
            ...
        }
-- TAG-CSI-IM-RESOURCESET-STOP
-- ASN1STOP CSI-IM-ResourceSet field descriptions csi-IM-Resources
CSI-IM-Resources associated with this CSI-IM-ResourceSet (see TS 38.214 [19], clause 5.2).

TABLE 26

| CSI-AperiodicTriggerStateList |
|---|

The CSI-AperiodicTriggerStateList IE is used to configure the UE with a list of aperiodic trigger states.
Each codepoint of the DCI field "CSI request" is associated with one trigger state (see TS 38.321 [3],
clause 6.1.3.13). Upon reception of the value associated with a trigger state, the UE will perform
measurement of CSI-RS, CSI-IM and/or SSB (reference signals) and aperiodic reporting on L1 according
to all entries in the associatedReportConfigInfoList for that trigger state.

| CSI-AperiodicTriggerStateList information element |
|---|

```
-- ASN1START
-- TAG-CSI-APERIODICTRIGGERSTATELIST-START
    CSI-AperiodicTriggerStateList ::=            SEQUENCE (SIZE (1..maxNrOfCSI-
    AperiodicTriggers)) OF CSI-AperiodicTriggerState
    CSI-AperiodicTriggerState ::=                SEQUENCE {
        associatedReportConfigInfoList           SEQUENCE
    (SIZE(1..maxNrofReportConfigPerAperiodicTrigger)) OF CSI-
    AssociatedReportConfigInfo,
        ...
    }
    CSI-AssociatedReportConfigInfo ::=           SEQUENCE {
        reportConfigId                           CSI-ReportConfigId,
        resourcesForChannel                      CHOICE {
            nzp-CSI-RS                           SEQUENCE {
                resourceSet                      INTEGER (1..maxNrofNZP-
    CSI-RS-ResourceSetsPerConfig),
                qcl-info                         SEQUENCE
    (SIZE(1..maxNrofAP-CSI-RS-ResourcesPerSet)) OF TCI-StateId
    OPTIONAL    -- Cond Aperiodic
            },
            csi-SSB-ResourceSet                  INTEGER (1..maxNrofCSI-SSB-
    ResourceSetsPerConfig)
        },
        csi-IM-ResourcesForInterference          INTEGER (1..maxNrofCSI-IM-
    ResourceSetsPerConfig)
    OPTIONAL, -- Cond CSI-IM-ForInterference
        nzp-CSI-RS-ResourcesForInterference      INTEGER (1..maxNrofNZP-CSI-RS-
    ResourceSetsPerConfig)
    OPTIONAL, -- Cond NZP-CSI-RS-ForInterference
        ...
    }
-- TAG-CSI-APERIODICTRIGGERSTATELIST-STOP
-- ASN1STOP
```

| CSI-AssociatedReportConfigInfo field descriptions |
|---| csi-IM-ResourcesForInterference
CSI-IM-ResourceSet for interference measurement. Entry number in csi-IM-ResourceSetList in the CSI-
ResourceConfig indicated by csi-IM-ResourcesForInterference in the CSI-ReportConfig indicated by
reportConfigId above (value 1 corresponds to the first entry, value 2 to the second entry, and so on). The
indicated CSI-IM-ResourceSet should have exactly the same number of resources like the NZP-CSI-RS-
ResourceSet indicated in nzp-CSI-RS-ResourcesforChannel.
csi-SSB-ResourceSet
CSI-SSB-ResourceSet for channel measurements. Entry number in csi-SSB-ResourceSetList in the CSI-
ResourceConfig indicated by resourcesForChannelMeasurement in the CSI-ReportConfig indicated by
reportConfigId above (value 1 corresponds to the first entry, value 2 to the second entry, and so on).
nzp-CSI-RS-ResourcesForInterference
NZP-CSI-RS-ResourceSet for interference measurement. Entry number in nzp-CSI-RS-ResourceSetList in
the CSI-ResourceConfig indicated by nzp-CSI-RS-ResourcesForInterference in the CSI-ReportConfig
indicated by reportConfigId above (value 1 corresponds to the first entry, value 2 to the second entry, and so on).
qcl-info
List of references to TCI-States for providing the QCL source and QCL type for each NZP-CSI-RS-Resource
listed in nzp-CSI-RS-Resources of the NZP-CSI-RS-ResourceSet indicated by nzp-CSI-RS-
ResourcesforChannel. Each TCI-StateId refers to the TCI-State which has this value for tci-StateId and is
defined in tci-StatesToAddModList in the PDSCH-Config included in the BWP-Downlink corresponding to the
serving cell and to the DL BWP to which the resourcesForChannelMeasurement (in the CSI-ReportConfig
indicated by reportConfigId above) belong to. First entry in qcl-info-forChannel corresponds to first entry in
nzp-CSI-RS-Resources of that NZP-CSI-RS-ResourceSet, second entry in qcl-info-forChannel corresponds
to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the
CSI-ResourceConfig indicated by resourcesForChannelMeasurement in the CSI-ReportConfig indicated by
reportConfigId above (value 1 corresponds to the first entry, value 2 to thesecond entry, and so on).

TABLE 26-continued

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | The field is mandatory present if the CSI-ReportConfig identified by reportConfigId is configured with csi-IM-ResourcesForInterference; otherwise it is absent. |
| NZP-CSI-RS-ForInterference | The field is mandatory present if the CSI-ReportConfig identified by reportConfigId is configured with nzp-CSI-RS-ResourcesForInterference; otherwise it is absent. |

TABLE 27

CSI-SemiPersistentOnPUSCH-TriggerStateList

The CSI-SemiPersistentOnPUSCH-TriggerStateList IE is used to configure the UE with list of trigger states for semi-persistent reporting of channel state information on L1. See also TS 38.214 [19], clause 5.2.

CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList ::=
                                              SEQUENCE(SIZE
    (1..maxNrOfSemiPersistentPUSCH-Triggers)) OF CSI-SemiPersistentOnPUSCH-
    TriggerState
    CSI-SemiPersistentOnPUSCH-TriggerState ::=        SEQUENCE {
      associatedReportConfigInfo                        CSI-ReportConfigId,
      ...
    }
-- TAG-CSI-SEMIPERSISTENTONPUSCHTRIGGERSTATELIST-STOP
-- ASN1STOP
```

For the above-described CSI reporting configuration (CSI-ReportConfig), each report configuration CSI-Report-Config may be associated with the CSI resource configuration associated with the report configuration and one downlink (DL) bandwidth part identified by the higher layer parameter bandwidth part identifier (bwp-id) given as CSI-ResourceConFIG. As time domain reporting for each report configuration CSI-ReportConfig, 'aperiodic,' 'semi-persistent,' and 'periodic' schemes may be supported, and be configured from the base station to the UE by the reportConfigType parameter configured from the higher layer. The semi-persistent CSI reporting method may support 'PUCCH-based semi-persistent (semi-PersistentOnPUCCH)' and 'PUSCH-based semi-persistent (semi-PersistentOnPUSCH)'. In the case of the periodic or semi-persistent CSI reporting method, the UE may receive a configuration of a PUCCH or PUSCH resource for transmitting CSI from the base station through higher layer signaling. The period and slot offset of the PUCCH or PUSCH resource to transmit CSI may be given as a numerology of an uplink (UL) bandwidth part configured to transmit a CSI report. In the case of the aperiodic CSI reporting method, the UE may receive a scheduling of a PUSCH resource for transmitting the CSI from the base station through L1 signaling (above-described DCI format 0_1).

For the above-described CSI resource configuration (CSI-ResourceConfig), each CSI resource configuration CSI-ReportConfig may include S (≥1) CSI resource sets (given as the higher layer parameter csi-RS-ResourceSetlist). The CSI resource set list may be composed of a non-zero power (NZP) CSI-RS resource set and an SS/PBCH block set or of a CSI-interference measurement (CSI-IM) resource set.

Each CSI resource configuration may be located in the downlink (DL) bandwidth part identified by the higher layer parameter bwp-id. The CSI resource configuration may be connected to CSI report configuration of the same downlink bandwidth part. The time domain operation of the CSI-RS resource in the CSI resource configuration may be set to one of 'aperiodic', 'periodic' or 'semi-persistent' from the higher layer parameter resource type. For periodic or semi-persistent CSI resource configuration, the number of CSI-RS resource sets may be limited to S=1. The configured period and slot offset may be given as a numerology of the downlink bandwidth part identified by bwp-id. The UE may receive a configuration of one or more CSI resource configurations for channel or interference measurement from the base station through higher layer signaling. For example, the following CSI resources may be included.

CSI-IM resource for interference measurement
NZP CSI-RS resource for interference measurement
NZP CSI-RS resource for channel measurement For CSI-RS resource sets associated with the resource in which the higher layer parameter resourceType is designated as 'aperiodic', 'periodic', or 'semi-persistent', the resource configuration for channel or interference measurement for one or more component cells (CCs) and the trigger state for the CSI report configuration in which the reportType is set to 'aperiodic' may be configured by the higher layer parameter CSI-AperiodicTriggerStateList.

The aperiodic CSI reporting of the UE may use the PUSCH, and the periodic CSI reporting may use the PUCCH. The semi-persistent CSI reporting may be performed using the PUSCH when triggered or activated by the DCI or using the PUCCH after activated by the MAC control element (CE). As described above, CSI resource configuration may also be configured aperiodically, periodically, or semi-persistently. In an embodiment, the combination between the CSI report configuration and the CSI resource configuration may be supported based on Table 28 below.

TABLE 28

Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI reporting may be triggered with the above-described DCI format 0_1 "CSI request" corresponding to the scheduling DCI for the PUSCH. The UE may monitor the PDCCH, obtain DCI format 01, and obtain scheduling information of PUSCH and a CSI request indicator. The CSI request indicator may be set with $N_{TS}$ (=0, 1, 2, 3, 4, 5, or 6) bits and be determined by the higher layer signaling (reportTriggerSize). One trigger state among one or a plurality of aperiodic CSI reporting trigger states that may be configured by higher layer signaling (CSI-AperiodicTriggerStatelist) may be triggered by the CSI request indicator.

When all bits of the CSI request field are 0, this may mean that no CSI report is requested.

If the number M of CSI trigger states in the configured CSI-AperiodicTriggerStateLite is larger than $2^{N_{Ts}}-1$, M CSI trigger states may be mapped to $2^{N_{Ts}}-1$ according to a predefined mapping relationship, and one trigger state among the $2^{N_{Ts}}-1$ trigger states may be indicated by the CSI request field.

If the number M of CSI trigger states in the configured CSI-AperiodicTriggerStateLite is equal to or smaller than $2^{N_{Ts}}-1$, one of the M CSI trigger states may be indicated by the CSI request field.

Table 29 below illustrates an example of a relationship between the CSI request indicator and the CSI trigger state that may be indicated by the indicator.

TABLE 29

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

For the CSI resource in the CSI trigger state triggered by the CSI request field, the UE may perform measurement, generating CSI (including at least one or more of above-described CQI, PMI, CRI, SSBRI, LI, RI, or L1-RSRP). The UE may transmit the obtained CSI by the PUSCH scheduled by the corresponding DCI format 0_1. When one bit corresponding to the uplink data indicator (UL-SCH indicator) in DCI format 0_1 indicates "1", uplink data (UL-SCH) and the obtained CSI may be multiplexed to the PUSCH resource scheduled by DCI format 0_1 and be transmitted. When one bit corresponding to the uplink data indicator (UL-SCH indicator) in DCI format 0_1 indicates "0", only CSI, without the uplink data (UL-SCH), may be mapped to the PUSCH resource scheduled by DCI format 0_1 and be transmitted.

Figure 11A:
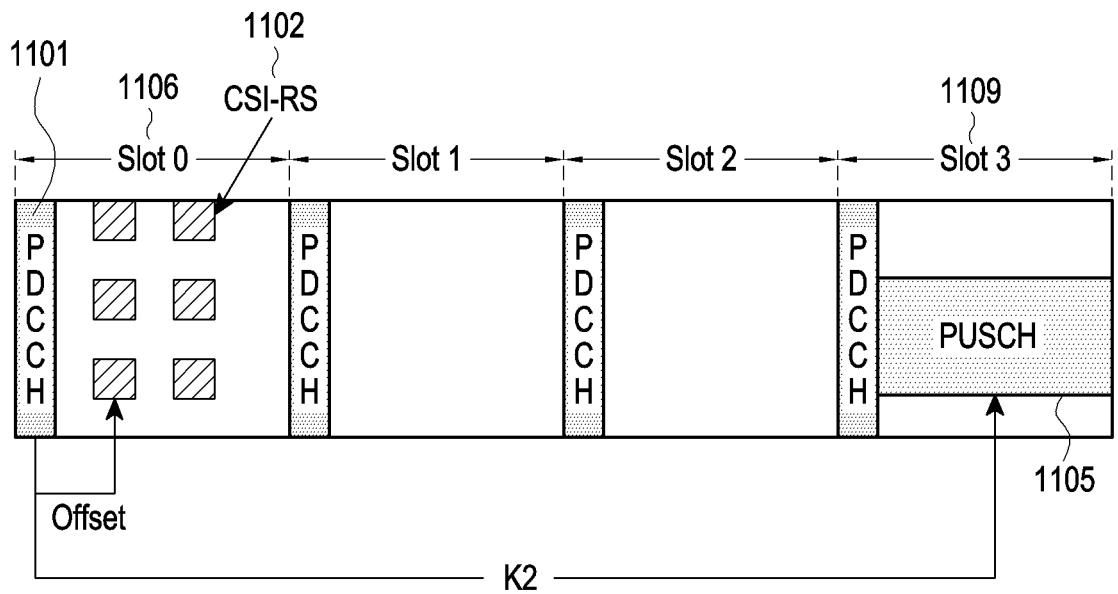
FIGS. 11A and 11B are views illustrating an example of an aperiodic CSI reporting method.
Figure 11B:
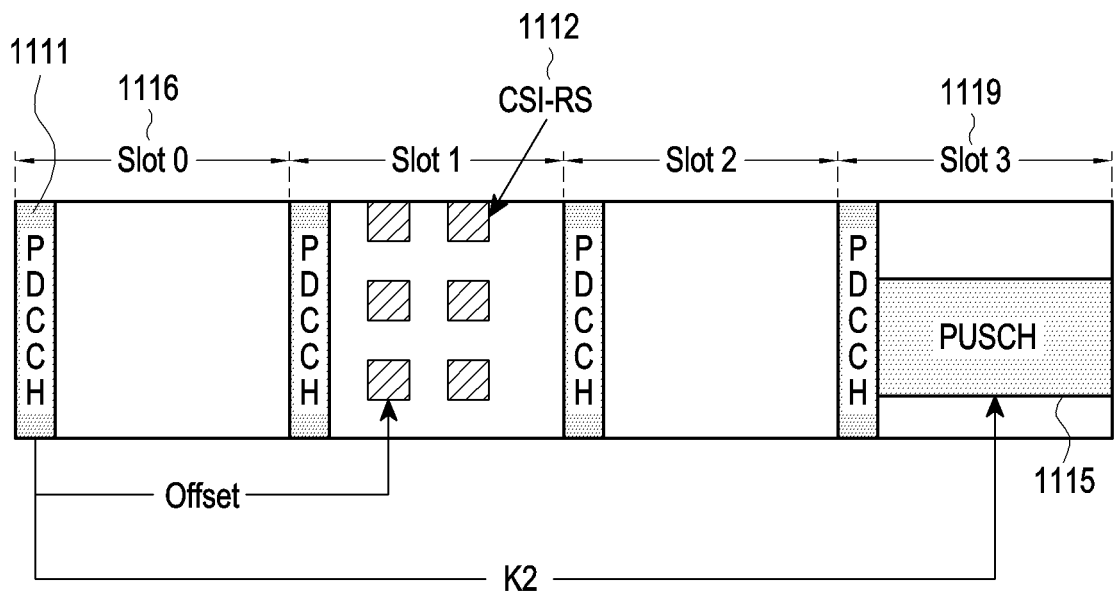

FIGS. 11A and 11B are views illustrating examples of an aperiodic CSI reporting method.

Referring to FIG. 11A, the UE may obtain DCI format 0_1 by monitoring the PDCCH 1101, obtaining scheduling information and CSI request information for the PUSCH 1105. The UE may obtain resource information of the CSI-RS 1102 to be measured from the received CSI request indicator. The UE may determine to perform measurement on the CSI-RS 1102 transmitted at what time, based on the time of reception of DCI format 0_1 and parameter (above-described aperiodicTriggringOffset) for the offset in the CSI resource set configuration (e.g., NZP CSI-RS resource set configuration (NZP-CSI-RS-ResourceSet)). Specifically, the UE may receive a configuration of offset value X of the parameter aperiodicTriggeringOffset in the NZP-CSI-RS resource set configuration from the base station by higher layer signaling, and the configured offset value X may mean an offset between the slot where the DCI for triggering aperiodic CSI reporting is received and the slot where the CSI-RS resource is transmitted. For example, the aperiodicTriggeringOffset parameter value and offset value X may have a mapping relationship shown in Table 30 below.

TABLE 30

| aperiodicTriggeringOffset | Offset X |
|---|---|
| 0 | 0 slot |
| 1 | 1 slot |
| 2 | 2 slots |

TABLE 30-continued

| aperiodicTriggeringOffset | Offset X |
| --- | --- |
| 3 | 3 slots |
| 4 | 4 slots |
| 5 | 16 slots |
| 6 | 24 slots |

The illustrated example shows an example in which the above-described offset value X=0. In this case, the UE may receive the CSI-RS 1102 in the slot where DCI format 0_1 for triggering aperiodic CSI reporting is received (corresponding to slot 0 of FIGS. 6A, 6B, and 6C) and report the CSI generated using the result of measurement of the received CSI-RS to the base station through the PUSCH 1105.

The UE may obtain scheduling information (information corresponding to each field of the above-described DCI format 01) for the PUSCH 1105 for CSI reporting from DCI format 0_1. As an example, the UE may obtain information about the slot to transmit the PUSCH 1105 from the above-described time domain resource allocation information of the PUSCH 1105. In the example of FIGS. 6A, 6B, and 6C, the UE obtains 3 as the K2 value corresponding to the slot offset value for PDCCH-to-PUSCH so that the PUSCH 1105 may be transmitted in slot 3 1109 which is three slots away from slot 0 1106 which is the time of reception of the PDCCH 1101.

Referring to FIG. 11B, the UE may obtain DCI format 0_1 by monitoring the PDCCH 1111, obtaining scheduling information and CSI request information for the PUSCH 1115. The UE may obtain resource information of the CSI-RS 1112 to be measured from the received CSI request indicator. The illustrated example shows an example in which the above-described offset value X=1 for the CSI-RS. In this case, the UE may receive the CSI-RS 1112 in the slot where DCI format 0_1 for triggering aperiodic CSI reporting is received (corresponding to slot 0 1116 of FIGS. 11A and 11B) and report the CSI generated from the result of measurement of the received CSI-RS to the base station through the PUSCH 1115.

Figure 12A:
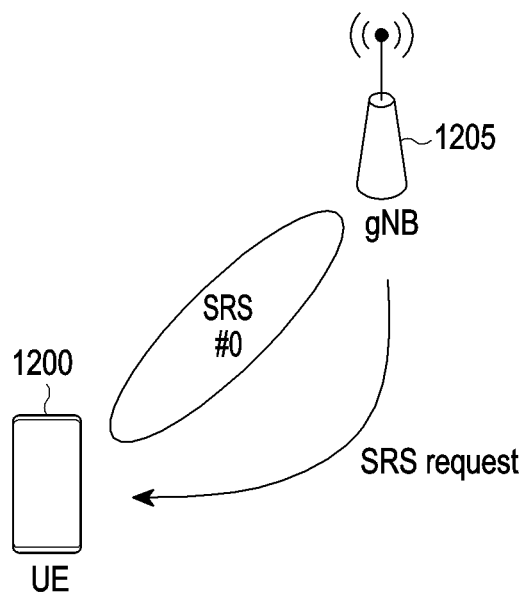
FIGS. 12A, 12B, and 12C are views illustrating examples of various operation scenarios of an SRS.
Figure 12B:
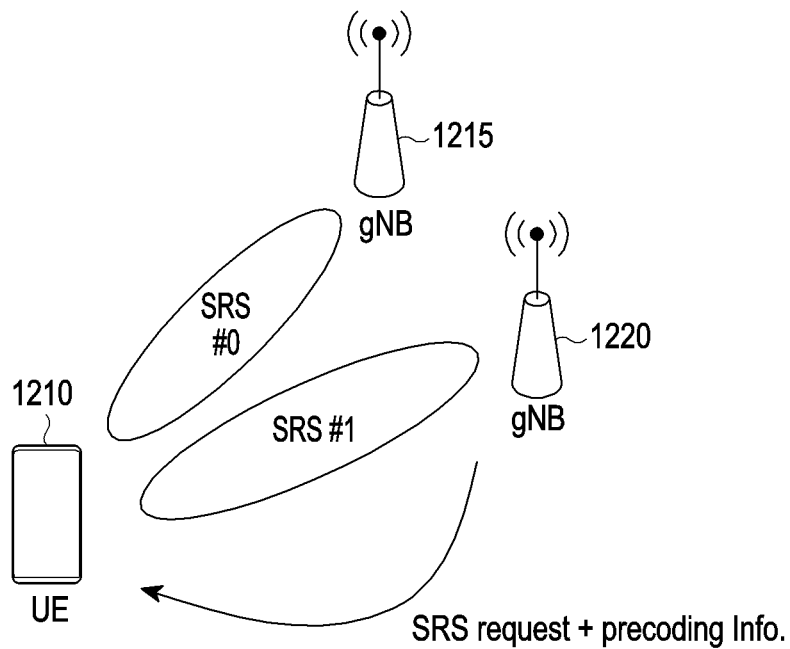
Figure 12C:
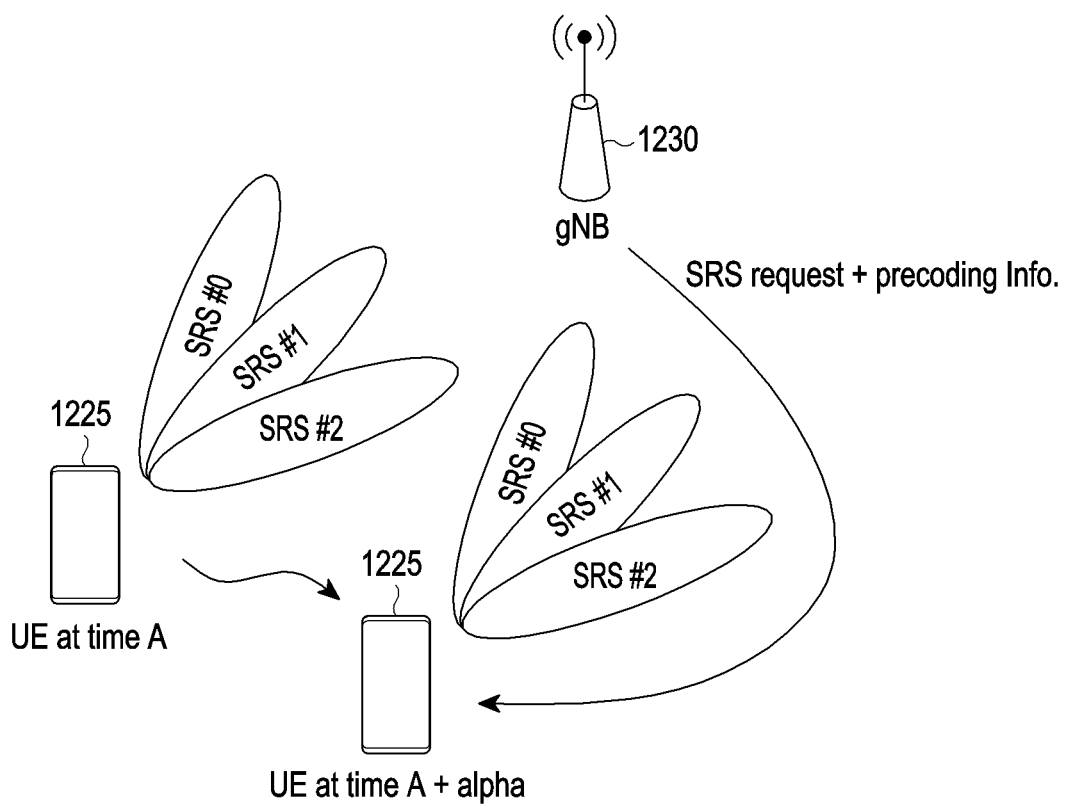

FIGS. 12A, 12B, and 12C are views illustrating examples of various operation scenarios of an SRS. Referring to the example of FIG. 7, the NR system may consider at least three SRS operation scenarios as follows.

Referring to FIG. 12A, the base station 1205 may configure a beam in one direction, to the UE 1200. Here, configuring a beam/precoding in one direction may include refraining from applying a beam/precoding or applying a wide beam (cell-coverage or sector coverage). The UE 1200 may transmit the SRS according to the transmission period and offset if the SRS is a periodic SRS or semi-persistent SRS or according to an SRS request of the base station (at a predetermined time after the SRS request) if the SRS is an aperiodic SRS. In this case, for the SRSs, additional information on beam/precoding is not needed.

Referring to FIG. 12B, the base station 1215 or 1220 may configure beams in one or more directions to the UE 1210, and the UE 1210 may transmit multiple SRSs beamformed in one or more directions. For example, as in the example shown in FIG. 7, it is possible to configure SRS resource (or port) #0 to be beamformed to the base station 1215 and SRS resource (or port) #1 to be beamformed to the base station 1220. In this case, unlike method 1) above, the base stations 1215 and 1220 need to provide SRS beam/precoding information as well as the SRS request.

Referring to FIG. 12C, the base station 1230 may configure beams in one or more directions to the UE 1225, and the UE 1225 may transmit multiple SRSs beamformed in one or more directions. For example, as in the example shown in FIG. 7, the base station may configure the UE to apply different beams/precoding to SRS resource (or port) #0, SRS resource (or port) #1, and SRS resource (or port) #2, respectively to transmit the SRS. Thus, even when the UE's mobility is high, stable communication may be achieved through beam/precoder diversity. For example, the UE 1225 may provide channel state information to the base station through SRS #2 at time A and provide channel state information to the base station 1230 through SRS #0 at time A+alpha. In this case, unlike method 1) above, the base station 1230 needs to provide the UE 1225 with SRS beam/precoding information as well as the SRS request.

Although based on SRS transmission, the foregoing descriptions may also be applied to PRACH, PUSCH, or PUCCH or other UL channel/RS transmissions and, to avoid making the gist of the disclosure unnecessarily unclear, a detailed description of all scenario cases is omitted.

Figure 13:
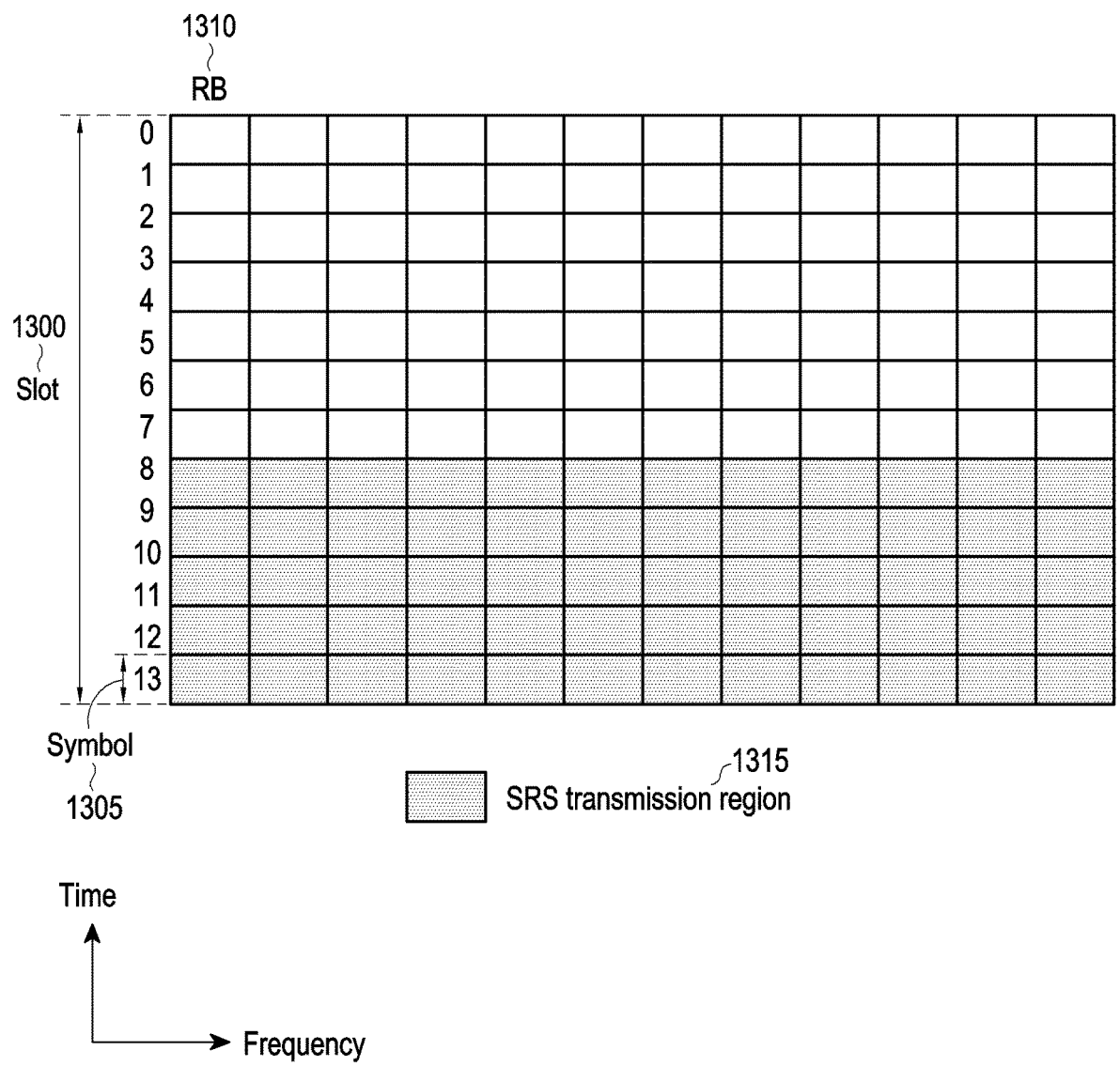
FIG. 13 is a view illustrating an uplink transmission structure of a wireless communication system.

FIG. 13 is a view illustrating an uplink transmission structure of a 5G or NR system.

Referring to FIG. 13, the basic transmission unit of the 5G or NR system is a slot 1300, and assuming a general cyclic prefix (CP) length, each slot may be constituted of 14 symbols 1305, and one symbol may correspond to one UL waveform (CP-OFDM or DFT-S-OFDM) symbol. The resource block (RB) 1310 is a resource allocation unit corresponding to one slot in the time domain, and may be constituted of 12 subcarriers in the frequency domain.

The uplink structure may be largely divided into a data region and a control region. Unlike the LTE system, in the 5G or NR system, the control region may be configured and transmitted in an arbitrary location of the uplink. Here, the data region may include a series of communication resources including data, e.g., voice and/or packets, transmitted to each UE and may correspond to the remaining resources except for the control region in the subframe. The control region may include a series of communication resources for at least one of downlink channel quality reporting from each UE, reception ACK/NACK for the downlink signal, or uplink scheduling request.

The UE may simultaneously transmit its data and control information in the data region and control region. The symbols where the UE may periodically transmit the SRS in one slot may be the last six-symbol section 1315 and be transmitted through a preconfigured SRS transmission band in the UL BWP in the frequency domain. However, this is merely an example, and the symbols capable of transmitting the SRS may be extended to other time ranges or be transmitted through a frequency band. The RBs capable of transmitting the SRS may be transmitted by multiples of 4 RBs when transmitted in the frequency domain and be transmitted in, at most, 272 RBs.

Further, in the 5G or NR system, the number N of symbols of the SRS may be set to 1, 2, or 4, and transmission may be performed in contiguous symbols. Further, the 5G or NR system may allow repetitive transmission of the SRS symbol. Specifically, the repetition factor of the SRS symbol is r∈{1,2,4}, and may be set as r≤N. For example, when one SRS antenna is mapped to one symbol and transmitted, transmission may be repeated up to four symbols. In contrast, four different antenna ports may be transmitted in four different symbols. In this case, since each antenna port is mapped to one symbol, the repetitive transmission of the SRS symbol is not allowed.

In the case of LTE/NR, the SRS may be configured based on the following higher layer signaling information (or their subset).

BandwidthConfig: may configure SRS bandwidth information. The exact value of each code point may vary according to the uplink system BW value.

SubframeConfig (or Configindex): may configure SRS transmission period and transmission offset values. The exact value of each code point may vary depending on whether the frequency division duplex (FDD) or the time division duplex (TDD) is used.

ackNackSRS-SimultaneousTransmission: indicates whether ACK/NACK-SRS are simultaneously transmitted.

MaxUpPts: indicates whether the frequency location of SRS transmission is initialized in UpPTS.

Hopping: is two-bit information to indicate whether SRS frequency hopping is performed and the hopping location and method.

Frequency domain location: indicates the frequency domain location of SRS transmission.

Duration: indicates whether periodic SRS is transmitted.

Transmission comb: indicates the comb offset value upon SRS transmission.

Cyclic shift: indicates the cyclic shift value upon SRS transmission.

Antenna port: indicates the number of SRS antenna ports used for SRS transmission. LTE may support 1, 2, or 4 ports.

The LTE/LTE-A system may support periodic and aperiodic SRS transmission based on the above-described configuration information. The NR system may use other additional information, e.g., activation/deactivation signaling for the SRS resource, than the above-described configuration information and may support periodic, semi-persistent, and aperiodic SRS transmission. Depending on the transmission type of SRS, e.g., depending on whether it is periodic, semi-persistent, or aperiodic SRS transmission, some of the configuration information may be omitted.

The SRS may be configured with a constant amplitude zero auto correlation (CAZAC) sequence. The CAZAC sequences constituting the SRS transmitted from several UEs have different cyclic shift values. Further, the CAZAC sequences generated through the cyclic shift from one CAZAC sequence have a feature of having a zero correlation value with the sequences having different cyclic shift values from their own. By such a feature, the SRSs simultaneously allocated in the same frequency area may be divided depending on the CAZAC sequence cyclic shift value set for each SRS by the base station.

The SRSs of several UEs may be divided depending on the frequency location as well as the cyclic shift value. The frequency location may be divided into SRS subband unit allocation or Comb. Comb2 and Comb4 may be supported in 5G or NR systems. In the case of Comb2, one SRS may be allocated only to the even-numbered or odd-numbered subcarriers in the SRS subband. In this case, each of the even-numbered subcarriers and the odd-numbered subcarriers may constitute one Comb.

Each UE may be allocated an SRS subband based on the tree structure. The UE may perform hopping on the SRS allocated to each subband at each SRS transmission time. Accordingly, all transmit antennas of the UE may transmit the SRS over the entire uplink data transmission bandwidth.

Figure 14:
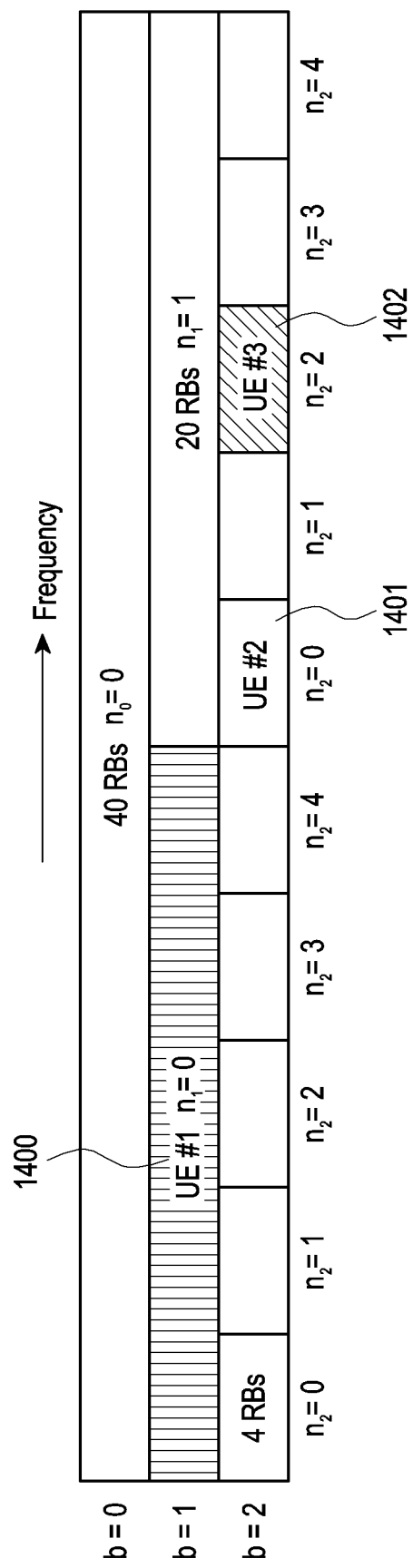
FIG. 14 is a view illustrating a structure in which an SRS is allocated per subband.

FIG. 14 is a view illustrating a structure in which an SRS is allocated per subband.

FIG. 14 shows an example in which when there is a data transmission band corresponding to 40RBs in the frequency domain, the SRSs are allocated to UE 1, 2, and 3 1400, 1401, and 1402 by the tree structure configured by the base station.

In FIG. 14, when the level index of the tree structure is b, the uppermost level (b=0) of the tree structure may be constituted of one SRS subband having a bandwidth of 40 RBs. At the second level (b=1), two SRS subbands with a bandwidth of 20 RBs may be generated from the SRS subband of the b=0 level. Accordingly, two SRS subbands may exist in the entire data transmission band of the second level (b=1). At the third level (b=2), 5 4 RB SRS subbands may be generated from one 20 RB SRS subband of the level immediately above (b=1), and 10 4RB SRS subbands exist in one level.

The configuration of such a tree structure may have various levels, SRS subband sizes, and the number of SRS subbands per level according to the configuration of the base station. Here, the number of SRS subbands at level b generated from one SRS subband of a higher level is Nb, and the indices for these Nb SRS subbands may be defined as nb={0, . . . , Nb−1}. As the subbands per level vary in this way, a UE may be allocated to each subband per level as shown in FIG. 14.

For example, UE 1 1400 may be allocated to the first SRS subband ($n_1=0$) of the two SRS subbands having a 20RB bandwidth at the b=1 level, and UE 2 1401 and UE 3 1402, respectively, may be allocated the first SRS subband ($n_2=0$) and third SRS subband ($n_2=2$) below the second 20RB SRS subband. Through these processes, the UE may simultaneously transmit SRS through multiple component carriers (CCs) and simultaneously transmit SRS in multiple SRS subbands within one CC.

Specifically, for the above-described SRS subband configuration, NR may support SRS bandwidth configurations as shown in Table 31 below.

TABLE 31

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |

TABLE 31-continued

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

NR may support SRS frequency hopping based on the values in Table 31. The detailed procedure may follow Table 32 below.

TABLE 32

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource elements (k, l) in a slot for each of the antenna ports $p_i$ according to $$a^{(p_i)}_{K_{TC}k'+k_0^{(p_i)}, l'+l_0} = \begin{cases} \frac{1}{\sqrt{N_{ap}}} \beta_{SRS} r^{(p_i)}(k', l') & k' = 0, 1, \ldots, M_{sc,b}^{SRS}-1 \quad l' = 0, 1, \ldots, N_{symb}^{SRS}-1 \\ 0 & \text{otherwise} \end{cases}$$

The length of the sounding reference signal sequence is given by
$M_{sc,b}^{SRS} = m_{SRS,b} N_{sc}^{RB}/K_{TC}$
where $m_{SRS,b}$ is given by a selected row of Table 6.4.1.4.3-1 with b = $B_{SRS}$ where $B_{SRS} \in \{0, 1, 2, 3\}$ is given by the field b-SRS contained in the higher-layer parameter freqHopping. The row of the table is selected according to the index $C_{SRS} \in \{0, 1, \ldots, 63\}$ given by the field c-SRS contained in the higher-layer parameter freqHopping.
The frequency-domain starting position $k_0^{(p_i)}$ is defined by $$k_0^{(p_i)} = \bar{k}_0^{(p_i)} + \sum_{b=0}^{B_{SRS}} K_{TC} M_{sc,b}^{SRS} n_b$$

where $$\bar{k}_0^{(p_i)} = n_{shift} N_{sc}^{RB} + k_{TC}^{(p_i)}$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases}$$

If $N_{BWP}^{start} \leq n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC} - 1\}$ is contained in the higher-layer parameter transmissionComb in the SRS-Config IE and $n_b$ is a frequency position index.
Frequency hopping of the sounding reference signal is configured by the parameter $b_{hop} \in \{0, 1, 2, 3\}$, given by the field b-hop contained in the higher-layer parameter freqHopping.
If $b_{hop} \geq B_{SRS}$, frequency hopping is disabled and the frequency position index $n_b$ remains constant (unless re-configured) and is defined by
$n_b = \lfloor 4n_{RRC}/m_{SRS,b} \rfloor \bmod N_b$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for b = $B_{SRS}$ are given by the selected row of Table 6.4.1.4.3-1 corresponding to the configured value of $C_{SRS}$.
If $b_{hop} < B_{SRS}$, frequency hopping is enabled and the frequency position indices $n_b$ are defined by $$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

where $N_b$ is given by Table 6.4.1.4.3-1,

TABLE 32-continued $$F_b(n_{SRS}) = \begin{cases} (N_b/2)\left\lfloor\dfrac{n_{SRS}\bmod \prod_{b'=b_{hop}}^{b} N_{b'}}{\prod_{b'=b_{hop}}^{b-1} N_{b'}}\right\rfloor + \left\lfloor\dfrac{n_{SRS}\bmod \prod_{b'=b_{hop}}^{b} N_{b'}}{2\prod_{b'=b_{hop}}^{b-1} N_{b'}}\right\rfloor & \text{if } N_b \text{ even} \\ \lfloor N_b/2\rfloor\left\lfloor n_{SRS}/\prod_{b'=b_{hop}}^{b-1} N_{b'}\right\rfloor & \text{if } N_b \text{ odd} \end{cases}$$

and where $N_{b_{hop}} = 1$ regardless of the value of $N_b$. The quantity $n_{SRS}$ counts the number of SRS transmissions. For the case of an SRS resource configured as aperiodic by the higher-layer parameter resourceType, it is given by $n_{SRS} = \lfloor l'/R \rfloor$ within the slot in which the $N_{symb}^{SRS}$ symbol SRS resource is transmitted. The quantity $R \leq N_{sym}^{SRS}$ is the repetition factor given by the field repetitionFactor contained in the higher-layer parameter resourceMapping.

As described above, the 5G or NR UE may support the SU-MIMO (single user) technique and may have up to 4 transmit antennas. Further, it is possible to simultaneously transmit SRSs in multiple CCs or multiple SRS subbands within the CC. Unlike the LTE system, the 5G or NR system may support various numerologies, configure various SRS transmission symbols, and allow repetitive SRS transmission.

The 5G or NR system may support various numerologies and multiple SRS transmission OFDM symbols and repetition factors in SRS transmission. Therefore, it is necessary to count SRS transmissions considering it. Counting SRS transmissions may be used in various ways. For example, counting SRS transmissions may be utilized to support antenna switching according to SRS transmission. Specifically, what SRS transmission time, what antenna, and what band to transmit the SRS may be determined by SRS transmission counting.

<Rate Matching and Puncturing>

Hereinafter, ate matching and puncturing are described in detail.

When the time and frequency resource A to transmit symbol sequence A overlaps time and frequency resource B, rate matching or puncturing may be considered as transmission/reception of channel A considering resource C in the overlapping area between resource A and resource B. The specific operation may follow the following contents.

The base station may map channel A only to the remaining resource area except for resource C corresponding to the area overlapping resource B, of the entire resource A to transmit symbol sequence A to the UE and transmit it. For example, when symbol sequence A is composed of {symbol #1, symbol #2, symbol #3, symbol 4}, resource A is {resource #1, resource #2, resource #3, resource #4}, and resource B is {resource #3, resource #5}, the base station may sequentially map symbol sequence A to {resource #1, resource #2, resource #4}, which are the remaining resources except for {resource #3} corresponding to resource C from resource A and send it. As a result, the base station may map the symbol sequence {symbol #1, symbol #2, symbol #3} to {resource #1, resource #2, resource #4}, respectively, and transmit it.

The UE may determine resource A and resource B from the scheduling information of symbol sequence A from the base station and thus determine resource C which is the overlapping area between resource A and resource B. The UE may receive symbol sequence A assuming that symbol sequence A has been mapped and transmitted in the remaining area except for resource C of the entire resource A. For example, when symbol sequence A is composed of {symbol #1, symbol #2, symbol #3, symbol 4}, resource A is {resource #1, resource #2, resource #3, resource #4}, and resource B is {resource #3, resource #5}, the UE may receive it assuming that symbol sequence A has been sequentially mapped to {resource #1, resource #2, resource #4}, which are the remaining resources except for {resource #3} corresponding to resource C from resource A. As a result, the UE may perform the subsequent series of reception operations assuming that the symbol sequence {symbol #1, symbol #2, symbol #3} is mapped to {resource #1, resource #2, resource #4}.

<Puncturing>

When there is resource C corresponding to the area, overlapping resource B, of the entire resource A to transmit symbol sequence A to the UE, the base station maps symbol sequence A to the entire resource A but does not perform transmission in the resource area corresponding to resource C but may perform transmission only in the remaining resource areas except for the resource C of resource A. For example, when symbol sequence A is composed of {symbol #1, symbol #2, symbol #3, symbol 4}, resource A is {resource #1, resource #2, resource #3, resource #4}, and resource B is {resource #3, resource #5}, the base station may respectively map symbol sequence A {symbol #1, symbol #2, symbol #3, symbol #4} to resource A {resource #1, resource #2, resource #3, resource #4} and may perform transmission only in the symbol sequence {symbol #1, symbol #2, symbol #4} corresponding to {resource #1, resource #2, resource #4}, which are the remaining resources except for {resource #3} corresponding to resource C, of resource A, but may not transmit {symbol #3} mapped to {resource #3} corresponding to resource C. As a result, the base station may map the symbol sequence {symbol #1, symbol #2, symbol #4} to {resource #1, resource #2, resource #4}, respectively, and transmit it.

The UE may determine resource A and resource B from the scheduling information of symbol sequence A from the base station and thus determine resource C which is the overlapping area between resource A and resource B. The UE may receive symbol sequence A assuming that symbol sequence A has been mapped to the entire resource A but transmission has been performed only in the remaining area except for resource C of resource area A. For example, when symbol sequence A is composed of {symbol #1, symbol #2, symbol #3, symbol 4}, resource A is {resource #1, resource #2, resource #3, resource #4}, and resource B is {resource #3, resource #5}, the UE may receive them assuming that symbol sequence A {symbol #1, symbol #2, symbol #3, symbol #4} is respectively mapped to resource A {resource #1, resource #2, resource #3, resource #4} but {symbol #3} mapped to {resource #3} corresponding to resource C is not transmitted and that the symbol sequence {symbol #1, symbol #2, symbol #4} corresponding to {resource #1, resource #2, resource #4}, which are the remaining resources except for {resource #3} corresponding to resource C, of resource A, are mapped. As a result, the UE may perform the subsequent series of reception operations assuming that the symbol sequence {symbol #1, symbol #2, symbol #4} is mapped to {resource #1, resource #2, resource #4}.

<Rate Matching Resource>

Figure 15:
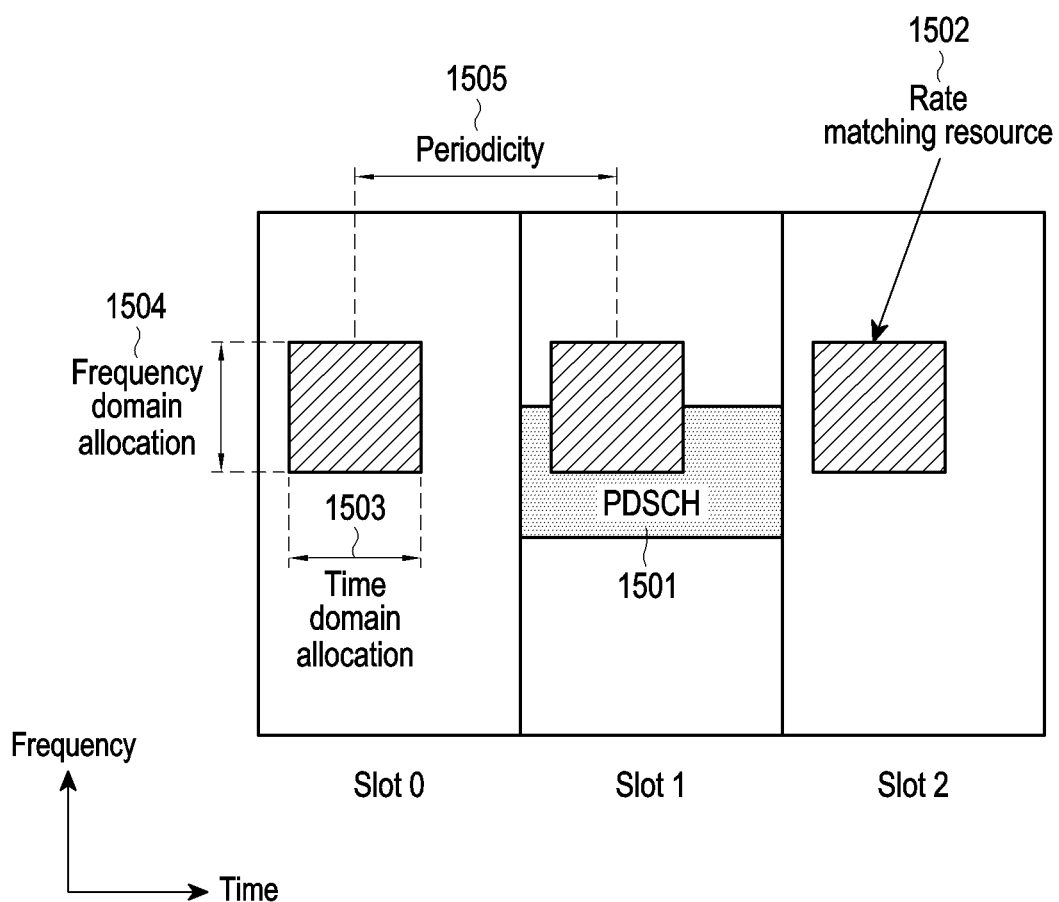
FIG. 15 is a view illustrating data transmission/reception considering a downlink data channel and rate matching resource.

FIG. 15 is a view illustrating data transmission/reception considering a downlink data channel and rate matching resource, by a base station and a UE.

Referring to FIG. 15, a downlink data channel (e.g., PDSCH) 1501 and a rate matching resource 1502 are shown. The base station may transmit configuration information configuring one or more rate matching resources 1502 to the UE through higher layer signaling (e.g., RRC signaling). The configuration information related to the rate matching resource 1502 may include time axis resource allocation information 1503, frequency axis resource allocation information 1504, and period information 1505. In the following description, the bitmap corresponding to the frequency axis resource allocation information 1504 is referred to as a "first bitmap", the bitmap corresponding to the time axis resource allocation information 1503 is referred to as a "second bitmap", and the bitmap corresponding to the period information 1505 is referred to as a "third bitmap". In slot 1, when the whole or part of the time and frequency resource of the scheduled data channel 1501 overlaps a configured rate matching resource 1502, the base station may rate-match the data channel 1501 in the part overlapping the rate matching resource 1502 and transmit it, and the UE may assume that in the rate matching resource 1502, the data channel 1501 has been rate-matched and then perform reception and decoding.

The base station may dynamically notify the UE whether to rate-match the data channel 1501 in the part overlapping the configured rate matching resource 1502 through the DCI (this corresponds to the "rate matching indicator" in the above-described DCI format). In an embodiment, the base station may select some of the configured rate matching resources 1502, group them into a rate matching resource group, and inform the UE whether the data channel 1501 is rate-matched for each rate matching resource group, through the DCI, using the bitmap scheme. For example, when four rate matching resources, RMR #1, RMR #2, RMR #3, and RMR #4, are configured, the base station may configure rate matching groups RMG #1={RMR #1, RMR #2} and RMG #2={RMR #3, RMR #4} and may inform the UE whether rate-matching is done in RMG #1 and RMG #2, in two bits in the DCI field. For example, for the rate matching group performing rate matching, the corresponding bit in the bitmap may be indicated as "1" and, for the rate matching group which should not perform rate matching, the corresponding bit in the bitmap may be indicated as "0."

5G may support granularity of "RB symbol level" and "RE level" as a method for configuring the above-described rate matching resource to the UE. In an embodiment, the following configuration method may be followed.

<RB Symbol Level>

The UE may receive a configuration of up to four rate matching patterns per bandwidth part, through higher layer signaling, e.g., 'RateMatchPattern,' and one RateMatchPattern may include the following content.

As a reserved resource in the bandwidth part, a resource in which the time and frequency resource area of the corresponding reserved resource is configured, as a combination of the bitmap of the symbol level and the bitmap of the RB level on the frequency axis may be included. The reserved resource may span over one or two slots. Signaling information (e.g., 'periodicityAndPattern') indicating the time domain pattern that repeats the time and frequency area configured in each RB level and symbol level bitmap pair may be additionally configured.

A time and frequency domain resource area configured as the control resource set in the bandwidth part and the resource area corresponding to the time domain pattern configured as the search space configuration in which the corresponding resource area is repeated may be included.

<RE Level>

The UE may receive a configuration of the following content through higher layer signaling.

The configuration information (e.g., "lte-CRS-ToMatchAround") for the RE corresponding to the pattern of the LTE CRS (e.g., cell-specific reference signal or common reference signal) may include at least one of nrofCRS-Ports indicating the number of LTE CRS ports and LTE-CRS-vshift indicating the v-shift value, carrierFreqDL indicating the location of the center subcarrier of the LTE carrier for the reference frequency point (e.g., reference point A), 'carrierBandwidthDL' indicating the bandwidth size of the LTE carrier, or 'mbsfn-SubframConfigList' indicating the subframe configuration corresponding to multicast-broadcast single-frequency network (MBSFN). The UE may determine the location of the CRS in the NR slot corresponding to the LTE subframe based on the above-described information.

Configuration information about the resource set corresponding to one or more zero power (ZP) CSI-RSs in the bandwidth part may be included in the higher layer signaling.

Figure 16:
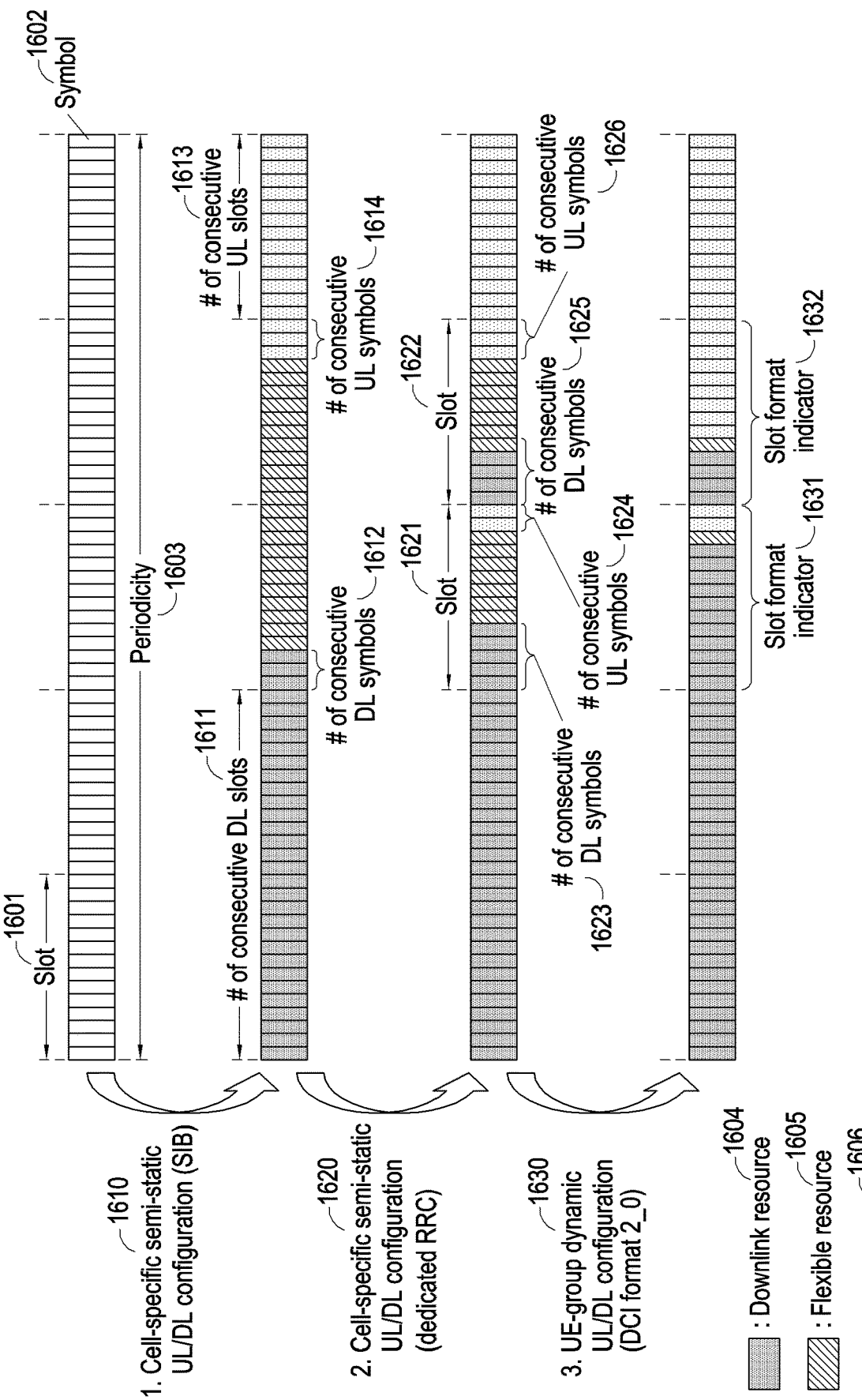
FIG. 16 is a view illustrating an example of an uplink-downlink configuration considered in a wireless communication system.

FIG. 16 is a view illustrating an example of an uplink-downlink configuration in a wireless communication system.

Referring to FIG. 16, a slot 1601 may include 14 symbols 1602. The uplink-downlink configuration of the symbol/slot may be configured in the following three steps.

First, the uplink-downlink configuration 1610 of the symbol/slot may be semi-statically indicated through cell-specific uplink-downlink configuration information through the system information in the symbol unit. Specifically, the cell-specific uplink-downlink configuration information may include uplink-downlink pattern information and reference subcarrier spacing information. The uplink-downlink pattern information may include at least one of the pattern period 1601 meaning the period at which one DL-UL pattern is applied, the number 1611 of consecutive full DL slots at the beginning of each DL-UL pattern), the number 1612 of consecutive DL symbols in the beginning of the slot following the last full DL slot, the number 1613 of consecutive full UL slots at the end of each DL-UL pattern, or the number 1614 of consecutive UL symbols in the end of the slot preceding the first full UL slot. In this case, slots and symbols not indicated by uplink or downlink may be determined as flexible slots/symbols.

Second, the UE-specific uplink-downlink configuration 1620 for flexible slots or slots 1621 and 1622 including flexible symbols may be semi-statically indicated by UE-specific configuration information through dedicated higher layer signaling. Each slot/symbol may be configured as uplink or downlink by the number 1623 or 1625 of contiguous downlink symbols from the start symbol of the slot 1621 or 1622 and the number 1624 or 1626 of contiguous uplink symbols from the end of the slot or the entire slot may be configured as downlink or uplink.

Finally, the uplink-downlink configuration 1630 for each UE group for the symbols not indicated as downlink or uplink through system information and UE-specific configuration information may be dynamically configured as downlink or uplink by the slot format indicator (SFI) 1631 or 1632 included in the downlink control channel. The slot format indicator 1631 or 1632 may indicate one index selected from a preconfigured table showing uplink-downlink configurations of 14 symbols in one slot. The table may be as shown in Table 33 below, for example.

TABLE 33

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | U | U | U | D | D | D | D | D | D | D |
| 56–254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

Additional coverage extension technology has been adopted for the 5G wireless communication service, as compared with the LTE communication service, but actual coverage of the 5G wireless communication service may use the TDD technique appropriate for services which generally put more weight on downlink traffic. Further, as the center frequency increases to extend the frequency band, the coverage of the base station and the UE reduces. Thus, coverage enhancement is a key requirement for the 5G wireless communication service. In particular, overall, the UE transmit power is lower than the base station transmit power and, in the time domain, downlink takes a more proportion than uplink to support services that puts more weight on downlink traffic, so that coverage enhancement of uplink channel is a core requirement for the 5G wireless communication service.

The uplink channel coverage of the base station and UE may be physically enhanced by increasing the time resources of uplink channel, reducing the center frequency, or raising the UE transmit power. However, increasing time resources and changing frequency may be limited due to limitations on the frequency band predetermined by each network operator. Raising the UE transmit power may also be limited due to the fact that the maximum transmit power is fixed by the standard to reduce interference.

To enhance base station and UE coverage, it is possible to divide the proportions of the uplink resource and downlink resource in the time domain depending on the uplink and downlink traffic like in the TDD system or to divide the uplink resource and downlink resource in the frequency domain like in the FDD system. The system that may flexibly divide the uplink resource and downlink resource in the time domain and/or frequency domain may be referred to as an XDD system, flexible TDD system, hybrid TDD system, TDD-FDD system, hybrid TDD-FDD system, sub-band full duplex system, or dynamic TDD system and, for convenience of description, it is referred to as an XDD system in the disclosure. In XDD, 'X' may mean time and/or frequency.

The uplink-downlink configuration of the XDD system may be configured so that each symbol or slot may flexibly allocated to uplink or downlink depending on the traffic proportions of uplink and downlink in the entire frequency band. In the frequency domain, a guard band may be allocated between the downlink resource and the uplink resource. The guard band may be allocated to reduce interference with signal reception or uplink channel due to the out-of-band emissions caused when the base station transmits the downlink channel or signal in the downlink resource.

The UE which has more downlink traffic than uplink traffic may be allocated more downlink resources than uplink resources by the configuration of the base station. As an example, the downlink-to-uplink resource ratio may be 4:1 in the time domain. The UE which operates at the cell edge and thus has insufficient uplink coverage may be given slightly more downlink resources than uplink resources by the configuration of the base station. For example, the downlink-to-uplink resource ratio may be 1:4 in the time domain. As such, more downlink resources in the time domain may be allocated to UEs which operate relatively in the center of the cell and have more downlink traffic to increase downlink transmission efficiency, and more uplink resources in the time domain may be allocated to UEs which operate relatively at the cell edge and have insufficient uplink coverage.

Figure 17:
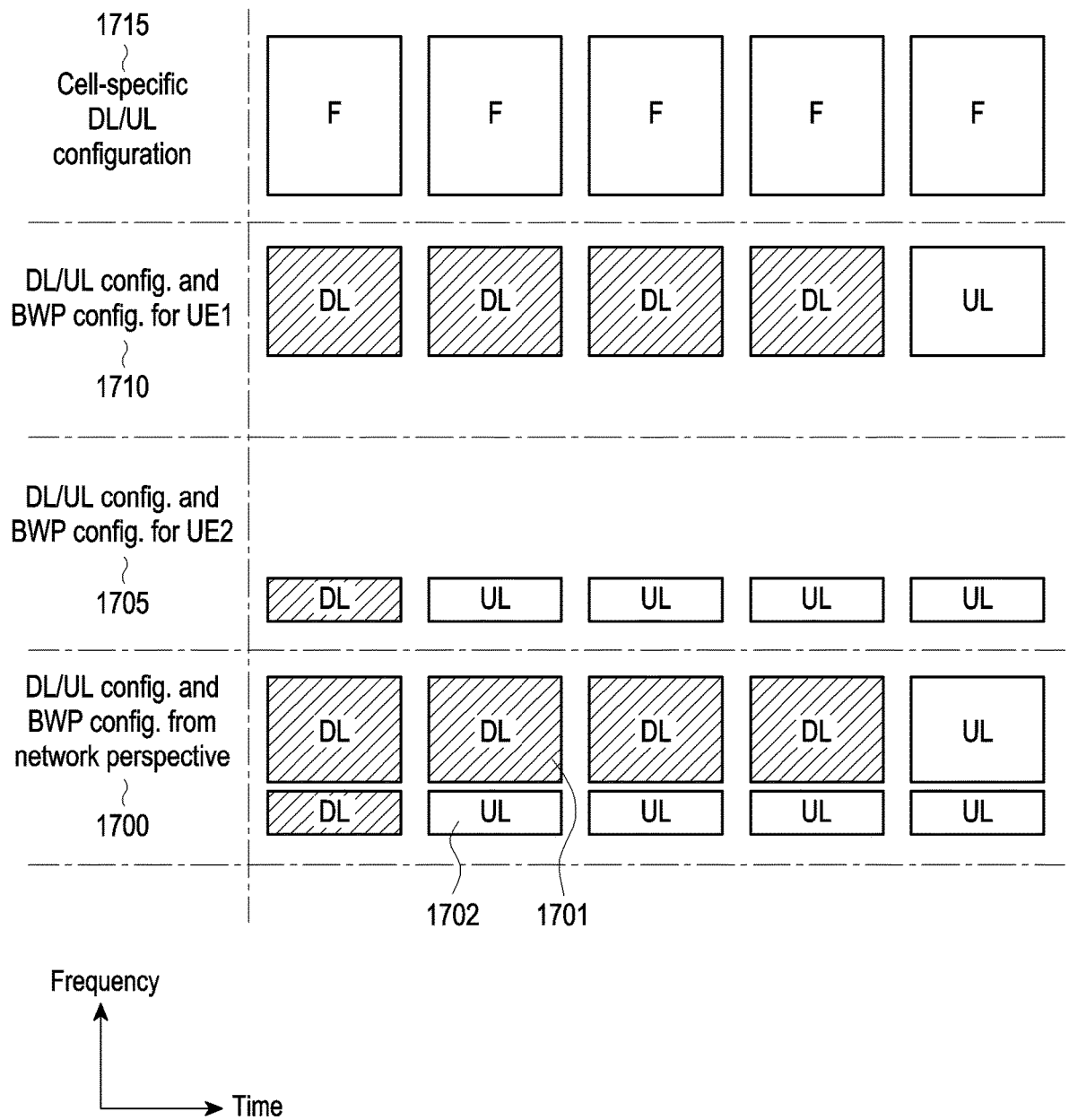
FIG. 17 is a view illustrating an example of an uplink-downlink configuration in an XDD system.

FIG. 17 is a view illustrating an example of an uplink-downlink configuration in an XDD system.

Referring to FIG. 17, for a cell-specific uplink-downlink configuration 1715 from the perspective of the base station, most of the time resources may be set as flexible (F) for flexible resource operation.

For UEs which do not support full duplex capable of simultaneous transmission/reception of uplink and downlink in the same time-frequency resource, the base station may separately configure downlink resources and uplink resources in a specific time (e.g., one slot). As an example, in the shown example, UEs 1 and 2 1710 and 1705 may be allocated either the downlink resource or uplink resource in each time range. The downlink resource of the UE 1710 receiving downlink and the uplink resource of the UE 1705 transmitting uplink in the second to fourth time ranges should be separated from each other. This is because downlink transmission 1701 and uplink transmission 1702 simultaneously occur in one time range, as it appears in the uplink-downlink configuration 1700 from a network perspective.

The separation between the downlink resource and the uplink resource may be performed through one of the two methods as follows. The first method is to configure BWP configuration information of UE 1 1710 and UE 2 1705 so that the DL BWP of UE 1 1710 and the UL BWP of UE 2 1705 do not overlap each other. This provides the advantage of minimizing influence on the implementation of the UE and the base station, but may lose flexibility and take a long time because BWP switching is required for changing the frequency resource ratio between downlink and uplink in one time range. For convenience of description, the first method is referred to hereinafter as a BWP-based XDD operation method. The second method is to allocate the scheduled PDSCH of UE 1 1710 and the scheduled PUSCH of UE 2 1705 not to overlap each other in the frequency domain. This method is based on base station scheduling and may thus have very high flexibility and very rapidly change the downlink-uplink frequency resource ratio but, due to the possibility that the DL BWP of UE 1 1710 may wholly or partially overlap the UL BWP of UE 2 1705, may be subject to various problems described below. For convenience of description, the second method is referred to hereinafter as a scheduling-based XDD operation method.

Figure 18:
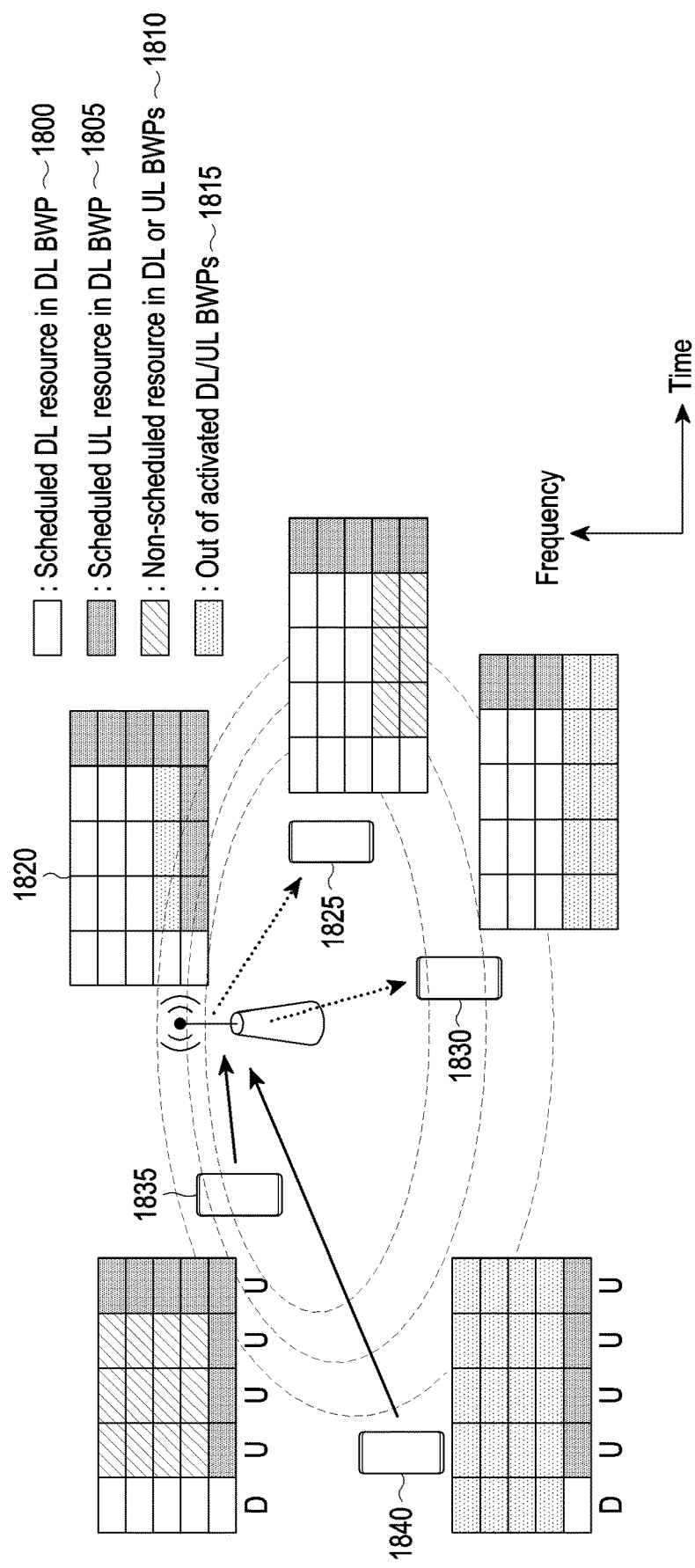
FIG. 18 is a view illustrating an example of an uplink-downlink configuration and a bandwidth part (BWP) configuration by a base station in an XDD system.

FIG. 18 is a view illustrating an example of an uplink-downlink configuration and a bandwidth part (BWP) configuration by a base station in an XDD system. The base station may properly use any one of the above-described downlink and uplink frequency resource division methods for XDD.

Referring to FIG. 18, from a base station perspective, an uplink-downlink configuration as in 1820 may be used. The base station may allocate a downlink-uplink resource ratio of 4:1 in the time domain, to UEs 1825 and 1830 which have more downlink traffic than uplink traffic. In this case, if the base station applies the above-described BWP-based XDD operation method to the UE 1830, the scheduled DL resource (e.g., PDSCH) 1800 and scheduled UL resource (e.g., PUSCH) 1805 for the UE 1830 may not be allocated to the other area 1815 than the activated DL BWP and UL BWP, so that the uplink/downlink throughput of the UE 1830 may be partially limited.

In an embodiment, when the base station applies the above-described scheduling-based XDD operation method to the UE 1825, the base station may have a higher scheduling degree of freedom as compared with the BWP-based XDD operation. As an example, the base station may allocate the scheduled PDSCH for the UE 1825 in the first time range (e.g., symbol(s), slot, or subframe) to a wider band than the other time ranges. Similarly, when uplink transmission of the other UEs (e.g., the UEs 1835 and 1840)) is required in the second to fourth time ranges, the base station may not allocate the PDSCH for the UE 1825 in the second to fourth time ranges.

The base station may allocate a downlink-to-uplink resource ratio of 1:4 to the UEs 1835 and 1840 which have more uplink traffic than downlink traffic or to which uplink coverage is critical. In this case, if the base station applies the BWP-based XDD operation method to the UE 1840, the scheduled PDSCH 1800 and scheduled PUSCH 1805 for the UE 1840 may not be allocated to the other area 1815 than the activated DL BWP and UL BWP, so that the uplink/downlink throughput of the UE 1840 may be partially limited.

In an embodiment, when the base station applies the scheduling-based XDD operation method to the UE 1835, the base station may have a higher scheduling degree of freedom as compared with the BWP-based XDD operation. As an example, the base station may allocate the scheduled PUSCH for the UE 1835 in the fifth time range (e.g., symbol(s), slot, or subframe) to a wider band than the other time ranges. Similarly, when downlink reception of the other UEs (e.g., the UE 1830)) is required in the second to fourth time ranges, the base station may not allocate the PUSCH for the UE 1835 in the second to fourth time ranges.

There may be a resource 1810 that is included in the activated DL BWP or UL BWP of each UE but has no downlink resource (e.g., PDSCH) or uplink resource (e.g., PUSCH) allocated thereto, and in the resource 1810, ambiguity may occur in the operations of the base station and the UE. As an example, the tracking reference signal (TRS) uses 52RBs and the smallest value of the BWP bandwidth where the TRS is transmitted, as the transmission bandwidth, so that the UE 1825, operating in the activated DL BWP including the uplink resources of the other UEs, may erroneously determine that the TRS is transmitted in the resource area 1810 where the downlink resource (e.g., PDSCH) is not allocated for XDD operation. As another example, the UE, operating in the activated UL BWP including the downlink resources of the other UEs, may erroneously determine that the periodic or semi-persistent uplink channel or signal such as PUCCH, or SRS is transmitted in the resource area 1810 where no downlink resource or no uplink resource is allocated for XDD operation.

The TRS is a reference signal configured for fine time/frequency tracking of the base station and may be referred to as a CSI-RS for tracking but, for convenience of description, is referred to as TRS in the disclosure. The TRS may be transmitted in one (X=1) or two (X=2) contiguous slots according to the pattern of a specific period such as 10 ms or 20 ms, and the contiguous TRSs are referred to as a TRS burst.

Figure 19:
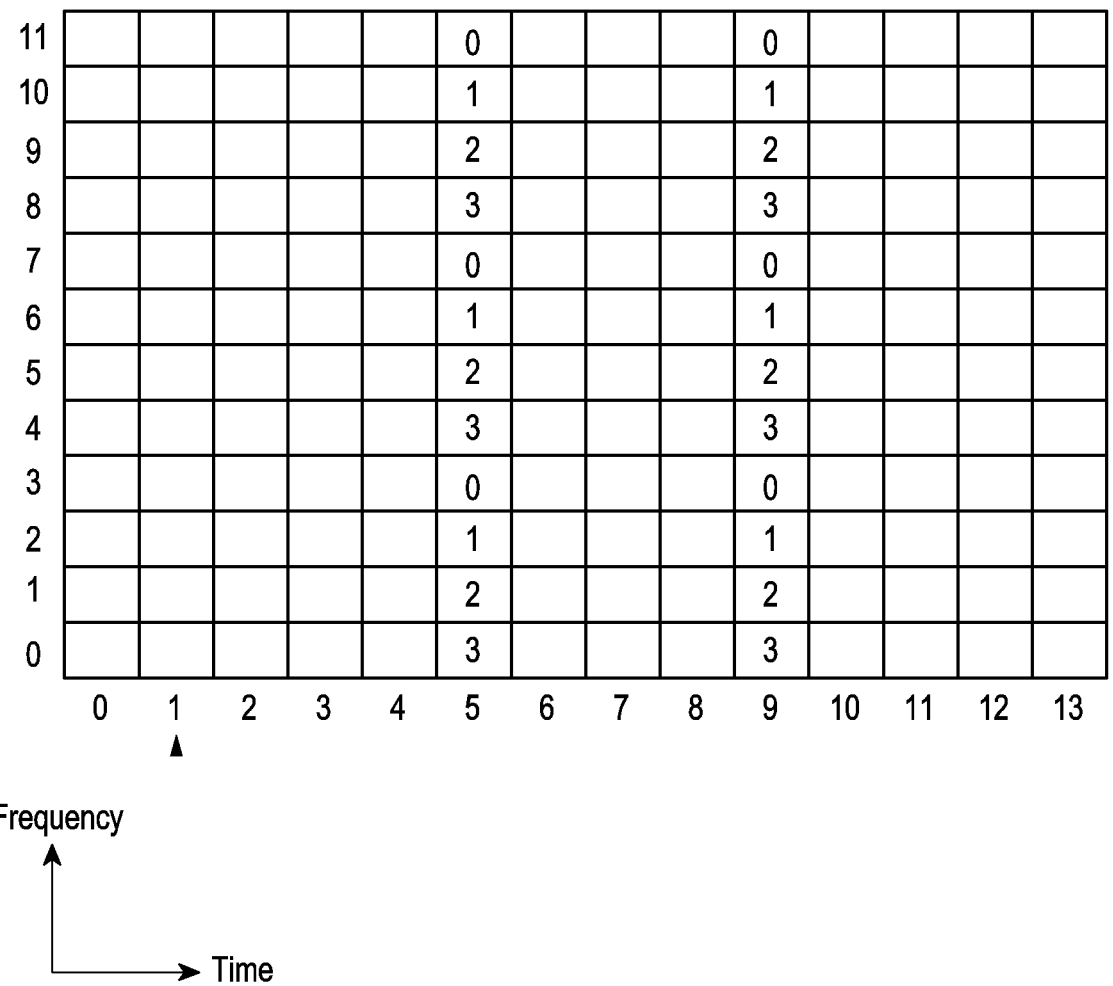
FIG. 19 is a view illustrating an example of a TRS pattern according to an embodiment of the disclosure.

FIG. 19 is a view illustrating an example of a TRS pattern according to an embodiment of the disclosure. It should be noted that the locations of the OFDM symbols shown are examples of the TRS configuration and the actual transmission locations may be varied depending on the base station configuration.

FIG. 19 shows TRS patterns possible in one slot. The shown TRS has the frequency RE density of 3 REs/RBs/ports, and each RE of the TRS may be repeated every four subcarriers. In other words, the TRS of one port may be transmitted in the REs having one value among 0, 1, 2, and 3 indicated in the TRS OFDM symbol REs. In an embodiment, the TRS may be transmitted in one among three OFDM symbol pairs of {5th, 9th}, {6th, 10th}, and {7th, 11th} in a frequency band of 6 GHz or less, referred to as frequency range 1 (FR1) and transmitted in one among ten OFDM symbol pairs of {1st, 5th}, {2nd, 6th}, {3rd, 7th}, {4th, 8th}, {5th, 9th}, {6th, 10th}, {7th, 11th}, {8th, 12th}, {9th, 13th}, and {10th, 14th} in a frequency band of 6 GHz or more, referred to as frequency range 2 (FR2).

FIG. 20 illustrates an example of a 1-Port CSI-RS configuration according to an embodiment of the disclosure.

FIG. 20 illustrates an example of 1-port CSI-RS configuration to cover the TRS pattern of FIG. 19. The base station may configure one resource set by one resource configuration information and configure up to four CSI-RS resources in each resource set. In this case, the frequency density of the CSI-RS may be set to 3 REs/RBs/ports. If X=1 TRS burst is used, the base station may configure CSI-RS resources #0 and #1. If X=2 TRS burst is used, the base station may configure all of CSI-RS resources #0, #1, #2, and #3. When X=1 or X=2 TRS burst is used, the UE may assume the same antenna port having the same port index for the CSI-RS resources configured in one resource set and, based thereon, perform continuous time/frequency tracking.

When the CSI-RS resources are configured as the TRS, the base station may not configure a corresponding report setting (i.e., there is no report setting referencing the CSI-RS resource) or set the report setting value to 'none' and transmit it to the UE. The UE may use the CSI-RS resources for time/frequency tracking purposes according to the configuration of the base station or may ensure that no CSI report may be created.

In FIG. 20, the subcarrier locations of the 1-port CSI-RS resources and the OFDM symbol location may be varied depending on the TRS subcarrier location of FIG. 19.

The TRS may be transmitted periodically, semi-persistently, or aperiodically. The periodic TRS (P-TRS) may be periodically transmitted until the RRC reconfiguration according to the period and slot offset configured by RRC. The semi-persistent TRS (SP-TRS) may be activated or deactivated by the MAC CE or DCI and be transmitted according to the period and slot offset configured by RRC while active. The aperiodic TRS (A-TRS) may be transmitted by the trigger in the DCI or MAC CE without a period or slot offset.

In an embodiment, A-TRS triggering and/or A-TRS transmission timing may follow a pre-agreed value (e.g., the same slot as A-TRS triggering) or the offset configured by the higher layer. Since it may be difficult to measure the statistical characteristics of the channel due to insufficient REs on the time axis as measured only with the aperiodic TRS, the aperiodic TRS may be connected (associated) with the periodic TRS or semi-persistent TRS. The connection between the A-TRS and the SP-TRS or P-TRS may be supported by various methods, such as quasi co-location (QCL), as an example. For example, the base station may configure at least one SP-TRS or P-TRS as QCL reference RS for A-TRS to allow the UE to extract a channel statistical value including at least one of the delay spread, average delay, doppler spread, or doppler shift based on the TRSs (QCL type A) or to allow the UE to extract spatial parameters related to at least one of the TX beam or RX beam (QCL type D).

In an embodiment, the TRS may be allocated a bandwidth by freqBand which is a higher layer parameter. For example, when the bandwidth of the BWP where the TRS is transmitted is smaller than 52RBs, the bandwidth of the TRS may be the same as the bandwidth of the BWP and, when the bandwidth of the BWP where the TRS is transmitted is equal to or larger than 52RBs, the bandwidth of the TRS may be set to 52RBs.

A power amplifier (PA) and a low-noise amplifier (LNA) used in the base station and UE of the wireless communication system may have a predetermined level of non-linearity. The baseband equivalent value $x_{nPA}(n)$ of the non-linear PA output signal may be expressed as the following equation.

$$x_{nPA}(n) = \sum_{odd\ p}^{p} f_{p,n} \circ x(n)|x(n)|^{p-1} \quad \text{Equation 3}$$

Here, x(n) is the baseband transmit signal, p is the maximum nonlinear order, $f_{p,n}$ is the impulse response of the PA of length N−1, and ∘ is the convolution operation. If the coupling response between the transmitting end and the receiving end (that is, the coupling response from the PA to the LNA) is $h_n$, the downlink leakage signal $x_{Lkg}(n)$ may be expressed as the following equation.

$$x_{Lkg}(n) = h_n \circ x_{nPA}(n) = \sum_{odd\ p}^{p} h_{p,n} \circ x(n)|x(n)|^{p-1} \quad \text{Equation 4}$$

Here, $h_{p,n}$ is the effective coupling response coefficient for order p.

In XDD, when the uplink frequency band and the downlink frequency band are closely disposed, e.g., when the guard band between uplink and downlink simultaneously transmitted/received is not sufficiently wide or the distance on the frequency axis between the uplink resource and downlink resource simultaneously allocated is short, the base station may receive the downlink leakage signal $x_{Lkg}(n)$ as well as the desired uplink signal $x_{UL}(n)$ upon uplink band reception. In this context, the received uplink signal y(n) may be expressed as the following equation.

$$y(n) = x_{UL}(n) + x_{Lkg}(n) + z(n) \quad \text{Equation 5}$$

Here, z(n) means the noise signal.

The above-described context and corresponding equations may be easily converted and applied to a case in which the UE receives the uplink leakage signal together upon downlink band reception. In order not to obscure the subject matter of the disclosure, a detailed description of the influence of an uplink leakage signal upon downlink reception will be omitted.

In the disclosure, for convenience of description, the uplink leakage signal received together when the desired downlink signal is received, or the downlink leakage signal received together when the desired uplink signal is received is collectively referred to as adjacent channel leakage (ACL) interference.

The ACL may be interchangeably used with other terms meaning uplink signal measurement and reporting by the UE, such as cross-link interference (CLI).

Figure 21:
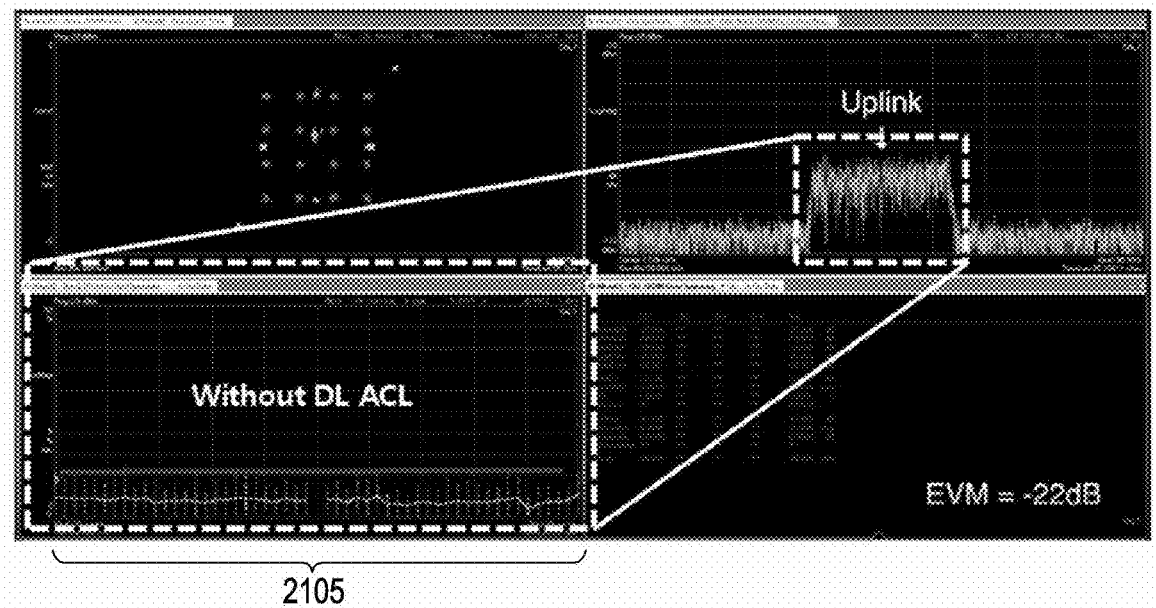
FIG. 21 is a view illustrating an example of uplink reception frequency response measurement upon uplink independent transmission/reception according to an embodiment of the disclosure.
Figure 22:
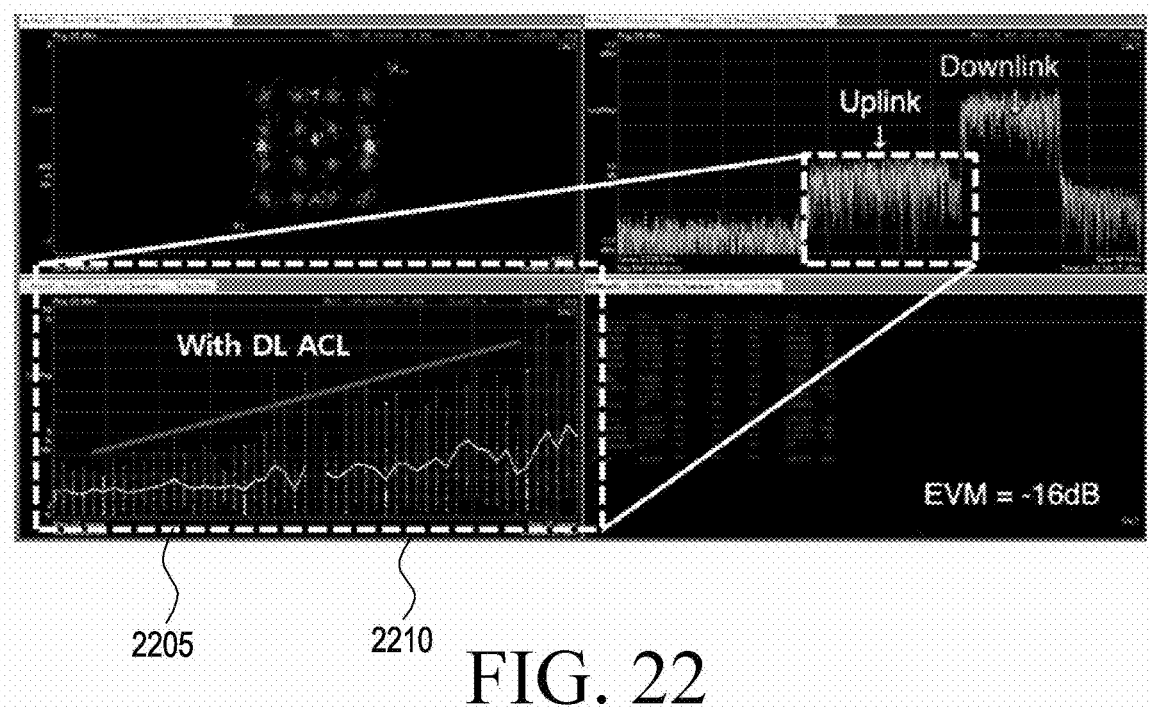
FIG. 22 is a view illustrating an example of uplink reception frequency response measurement upon uplink/downlink simultaneous transmission/reception according to an embodiment of the disclosure.

Examples of the influence of adjacent channel leakage during XDD operation are shown in FIGS. 21 and 22.

FIG. 21 is a view illustrating an example of uplink reception frequency response measurement upon uplink independent transmission/reception according to an embodiment of the disclosure.

Referring to FIG. 21, since there is no influence of adjacent channel leakage interference when the uplink alone is transmitted (i.e., when operated as TDD), the power spectral density (PSD) 2105 measured in the band of interest may have a relatively flat tendency.

FIG. 22 is a view illustrating an example of uplink reception frequency response measurement upon uplink/downlink simultaneous transmission/reception according to an embodiment of the disclosure.

Referring to FIG. 22, when uplink and downlink are simultaneously transmitted/received (i.e., when operated as XDD), an influence of adjacent channel leakage interference occurs, exhibiting the tendency that the PSD 2210 measured in the band of interest (the uplink signal in FIG. 22) close to the interference (downlink signal in FIG. 22) has a relatively large value, and the PSD 2205 measured in the band of interest (uplink signal in FIG. 22) far from the interference (downlink signal in FIG. 22) has a relatively small value. Due to the influence of the adjacent channel leakage, the error vector magnitude (EVM) value may be significantly increased (EVM=−16 dB in FIG. 22) even when there is no adjacent channel leakage, and a lot of noise is created in the constellation of the uplink receive signal.

The disclosure provides embodiments for measuring and reporting or sharing the adjacent channel leakage interference to enhance the performance of the XDD system, such as maximizing the reception performance and minimizing the guard band.

Hereinafter, the main gist of the disclosure is described with reference to specific embodiments.

A transmission/reception method and device of a base station and a UE considering an XDD system are described below. However, the gist of the disclosure is not limited to the XDD system, but may similarly be applied to channel and signal transmission/reception methods and devices for duplex methods (e.g., full-duplex or dynamic TDD) that may be provided in the 5G system for similar purposes.

First Embodiment

Methods for measuring adjacent channel leakage interference considering XDD operation and reporting information about the measured interference between base stations, between UEs, and between UE and base station are described.

Figure 23:
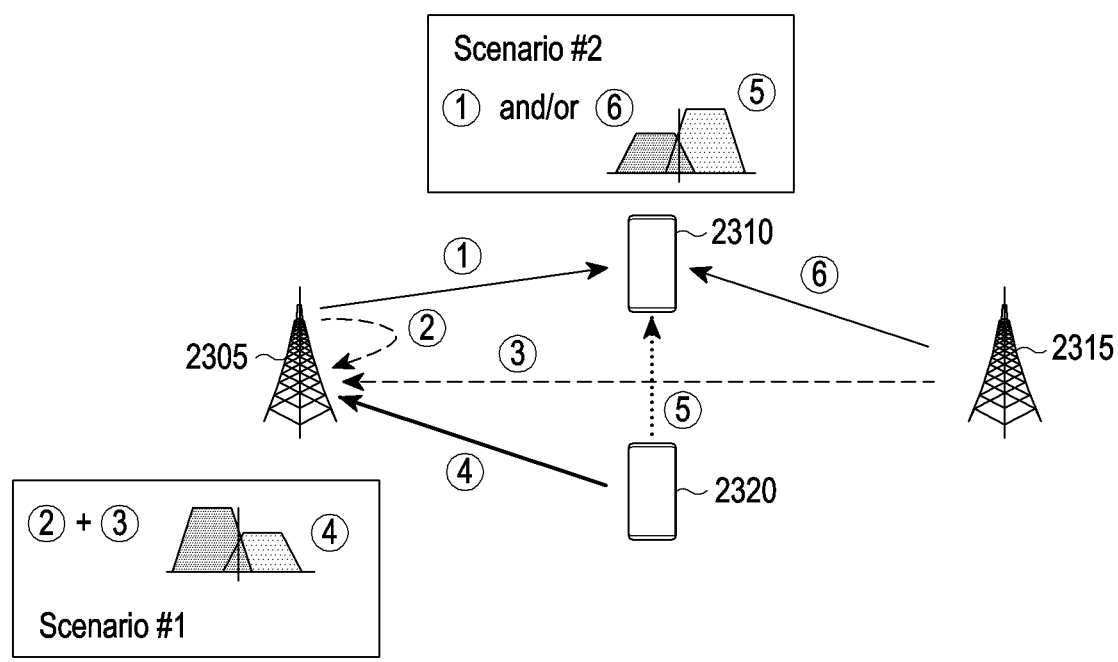
FIG. 23 is a view illustrating an example of an uplink-downlink interference scenario in an XDD system according to an embodiment of the disclosure.

FIG. 23 is a view illustrating an example of an uplink-downlink interference scenario in an XDD system according to an embodiment of the disclosure.

Referring to scenario #1 of FIG. 23, the base station 2305 may consider adjacent channel leakage from downlink signals ② and ③ simultaneously transmitted with the desired uplink signal ④ to receive the desired uplink signal ④ transmitted from the UE 2320. The base station 2305 may apply different methods according to at least one of the characteristics of interference downlink signals ② and ③, backhaul delay, or network context, in measuring the adjacent channel leakage.

In an embodiment, the base station 2305 may allocate no uplink signal or channel to the time frequency resource for measuring downlink adjacent channel leakage or configure an uplink rate matching resource. When the downlink adjacent channel leakage includes self-interference ② from the downlink transmitted from the transmit antenna of the base station 2305, the base station 2305 may properly determine uplink allocation and uplink rate matching resource configuration for the UE 2320 according to the transmission information of the self interference ② because the base station 2305 knows the transmission information of the self interference ②.

In an embodiment, when the downlink adjacent channel leakage includes the interference ③ from the downlink signal transmitted from the transmit antenna of another base station 2315, the base station 2305 may not know the whole or part of the transmission information of the downlink signal. In this case, to precisely measure the downlink adjacent channel leakage, it may be required to share the information related to allocation (scheduling) or configuration of the downlink signal transmitted from the base station 2315 between the base stations. Here, the term "between base stations" may mean at least one of 'between gNBs', 'between transmission and reception points (TRPs)', 'between distributed units (DUs)', 'between controllers or central units (CUs)', 'between radio units (RUs)' or 'between public land mobile networks (PLMNs) or operators', according to the network context. To share the information between the base stations, an interface may be defined which may be used to transmit the measurement value of the adjacent channel leakage, and the third embodiment below may be referenced for the details related thereto.

Referring to scenario #2 of FIG. 23, the UE 2310 may consider adjacent channel leakage from the uplink signal ⑤ from another UE 2320, simultaneously transmitted with the desired downlink signals ① and ⑥ to receive the desired downlink signals ① and/or ⑥ transmitted from the base stations 2305 and 2315. The base station 2305 may apply different methods according to various conditions including the characteristics of the interference uplink signal ⑤ due to a difference in relative locations between the UEs 2310 and 2320 in configuring the UE 2310 to measure the adjacent channel leakage.

In an embodiment, when the distance between the UE 2310 to receive the downlink signal and the UE 2320 to transmit the uplink signal is short, the base station 2305 may estimate that the downlink reception performance of the UE 2310 is highly likely to deteriorate due to the adjacent channel leakage. The base station 2305 may configure the time/frequency resource to measure the uplink adjacent channel leakage through higher layer signaling or indicate it through L1 signaling, to the UE 2310 for expecting the degree of deterioration of the downlink reception performance. The UE 2310 may measure the uplink adjacent channel leakage interference in the configured resource and report the measurement value to the base station 2305 or share it with another UE (e.g., the UE 2320).

Here, the distance between the UEs may mean a geographical distance and may also mean information (e.g., including at least one of angle information, codebook index or precoding matrix, or channel correlation) obtained through channel estimation of the uplink reference signal, such as SRS, or downlink reference signal, such as CSI-RS.

In an embodiment, the adjacent channel leakage interference may be measured and reported based on the uplink signal/channel (e.g., SRS) or may be measured and reported based on the downlink signal/channel (e.g., CSI-RS).

<Uplink Signal/Channel-Based Adjacent Channel Leakage Interference Measurement>

The uplink signal/channel-based adjacent channel leakage interference may be measured based on the time/frequency resource information (e.g., RE mapping pattern) of the uplink signal or channel including at least one of the SRS resource, UL rate matching resource, UL OFDM symbol location, UL slot location, UL PRB/subband location, or UL BWP. As an example, the adjacent channel leakage interference measurement may be performed by the UE 2310 of scenario #2 described in connection with FIG. 23.

In an embodiment, the base station may configure at least one SRS resource to the UE and may measure the SRS-RSRP according to Table 34 below and report it to the base station or configure or instruct it to be shared between the UEs. Similarly, the base station may configure the UE to measure the cross-link interference received signal strength indicator (CLI-RSSI) in a specific OFDM symbol according to the definitions of Table 35 and report the measurement result to the base station or share it with other UEs. In an embodiment, the base station may transmit SRS configuration information or CLI configuration information including parameters and resources that may be used to measure the SRS or CLI to the UE. The UE may measure the SRS-RSRP or CLI-RSSI from the uplink signal received based on the configuration information. In an embodiment, the base station may transmit SRS report configuration information or CLI report configuration information including the resource and parameters that may be used to report the SRS or CLI to the UE. The UE may report the SRS-RSRP or CLI-RSSI based on the report configuration information.

In an embodiment, to allow sharing of at least one of the SRS-RSRP and CLI-RSSI between the UEs, report values such as SRS-RSRP-UE or CLI-RSSI-UE may be defined and configured in the UE. In an embodiment, the base station may indicate whether the SRS-RSRP or CLI-RSSI report configured in the UE is one for UE-base station reporting or sharing between the UEs, by a separate higher layer parameter. The UE may provide the report values to other UEs according to the configuration of the base station.

Tables 34 and 35 below show the SRS-RSRP or CLI-RSSI defined as the average of all the frequency resources in the given time resource. In an embodiment, a subband report may be introduced to properly report imbalance per frequency resource of adjacent channel leakage interference.

In other words, the base station may transmit configuration information to instruct to report the SRS-RSRP or CLI-RSSI for at least one subband to the UE. In this case, the resource unit for measuring and reporting the subband adjacent channel leakage interference may be constituted of one or more frequency resources. In an embodiment, the one or more frequency resources may include contiguous subcarriers (or REs) following the number or set value defined in the standard or may include one or more PRBs or resource block groups (RBGs). In an embodiment, the one or more frequency resources may be defined using the set value of the csi-ReportingBand and its definition shown in Table 21.

In an embodiment, considering the tendency that the adjacent channel leakage interference gradually reduces or increases along the frequency domain, the subband for the adjacent channel leakage interference measurement may be configured to include frequency resources located at two opposite ends of the configured measurement band or include at least some of specific frequency resources evenly dividing the configured measurement band. As an example, one adjacent channel leakage interference report may include two values of which the first value may represent the amount of interference of the lowest (highest) index on the frequency axis (e.g., one of the lowest (highest) subcarrier/PRB/subband index), and the second value may represent the amount of interference of the highest (lowest) index on the frequency axis (e.g., one of the highest (lowest) subcarrier/PRB/subband index). When one adjacent channel leakage interference report includes N values, each value may be extended in a similar manner to that described above.

To measure the adjacent channel leakage interference according to one of the above-described examples, when a report for at least one of the SRS-RSRP or CLI-RSSI is configured in the UE, and a frequency resource (e.g., at least one subband) for the report is configured, the UE may calculate "the linear average over the power contribution (in [W])" of Tables 34 and 35, per subband.

TABLE 34

SRS reference signal received power (SRS-RSRP)

| | |
|---|---|
| Definition | SRS reference signal received power (SRS-RSRP) is defined as linear average of the power contributions (in [W]) of the resource elements carrying sounding reference signals (SRS). SRS-RSRP shall be measured over the configured resource elements within the considered measurement frequency bandwidth in the configured measurement time occasions. For frequency range 1, the reference point for the SRS-RSRP shall be the antenna connector of the UE. For frequency range 2, SRS-RSRP shall be measured based on the combined signal from antenna elements corresponding to a given receiver branch. For frequency range 1 and 2, if receiver diversity is in use by the UE, the reported SRS-RSRP value shall not be lower than the corresponding SRS-RSRP of any of the individual receiver branches. |
| Applicable for | RRC_CONNECTED intra-frequency |

TABLE 35

CLI Received signal strength indicator (CLI-RSSI)

| | |
|---|---|
| Definition | CLI Received Signal Strength Indicator (CLI-RSSI), is defined as linear average of the total received power (in [W]) observed only in the configured OFDM symbols of the configured measurement time resource(s), in the configured measurement bandwidth from all sources, including co-channel serving and non-serving cells, adjacent channel interference, thermal noise etc. |

TABLE 35-continued

| CLI Received signal strength indicator (CLI-RSSI) | |
|---|---|
| | For frequency range 1, the reference point for the RSSI shall be the antenna connector of the UE. For frequency range 2, CLI-RSSI shall be measured based on the combined signal from antenna elements corresponding to a given receiver branch. For frequency range 1 and 2, if receiver diversity is in use by the UE, the reported CLI-RSSI value shall not be lower than the corresponding CLI-RSSI of any of the individual receiver branches. |
| Applicable for | RRC_CONNECTED intra-frequency |

<Downlink Signal/Channel-Based Adjacent Channel Leakage Interference Measurement>

The downlink signal/channel-based adjacent channel leakage interference may be measured based on the time/frequency resource information (e.g., RE mapping pattern) of the downlink signal or channel including at least one of the CSI-RS resource, DL rate matching resource, DL OFDM symbol location, DL PRB/subband location, or DL BWP.

In an embodiment, the base station may configure at least one CSI-RS resource to the UE and may measure one or more of the CSI-RSRP, CSI-RSRQ, or CSI-SINR according to Tables 36 to 38 below and report it to the base station or configure or instruct it to be shared between the UEs. In an embodiment, the base station may configure the UE to measure the RSSI in a specific OFDM symbol according to the definitions of Table 39, report it to the base station, or share it between the UEs. Specifically, the base station may transmit configuration information including resources and parameters that may be used for measurement of CSI-RSRP, CSI-RSRQ, CSI-SINR, or RSSI to the UE. The UE may measure CSI-RSRP, CSI-RSRQ, CSI-SINR, or RSSI from the received downlink signal based on the configuration information. Further, the base station may transmit report configuration information including resources and parameters that may be used for reporting CSI-RSRP, CSI-RSRQ, CSI-SINR, or RSSI to the UE. The UE may report CSI-RSRP, CSI-RSRQ, CSI-SINR, or RSSI based on the report configuration information.

In an embodiment, the base station may measure CSI-RSRP, CSI-RSRQ, CSI-SINR, or RSSI from the downlink signal received from an adjacent base station based on the time and frequency resources of the adjacent channel leakage interference for each subband, and share them between base stations.

As an embodiment, to allow inter-UE sharing of at least one of the CSI-RSRP, CSI-RSRQ, CSI-SINR, and RSSI, report values, such as CSI-RSRP-UE, CSI-RSRQ-UE, CSI-SINR-UE, and RSSI-UE, may be defined and may be configured in the UE. In an embodiment, the base station may indicate whether the CSI-RSRP, CSI-RSRQ, CSI-SINR, or RSSI report configured in the UE is one for UE-base station reporting or UE-UE reporting, by a separate higher layer parameter. The UE may generate a CSI-RSRP-UE, CSI-RSRQ-UE, CSI-SINR-UE, or RSSI-UE according to the configuration and transmit it to another UE.

Table 36 to Table 39 show CSI-RSRP, CSI-RSRQ, CSI-SINR, or RSSI defined as an average of all frequency resources in the given time resource, but a subband report may be introduced to properly report imbalance per frequency resource of the adjacent channel leakage interference. The base station may transmit configuration information to instruct to report the CSI-RSRP, CSI-RSRQ, CSI-SINR, or RSSI for at least one subband to the UE. In this case, the resource unit for measuring and reporting the subband adjacent channel leakage interference may be constituted of one or more frequency resources. In an embodiment, the one or more frequency resources may include contiguous subcarriers (or REs) following the number or set value defined in the standard or may include one or more PRBs or RBGs. In an embodiment, the one or more frequency resources may be defined using the set value of the csi-ReportingBand and its meaning shown in Table 21.

In an embodiment, considering the tendency that the adjacent channel leakage interference gradually reduces or increases along the frequency domain, the subband for the adjacent channel leakage interference measurement may be configured to include frequency resources located at two opposite ends of the configured measurement band or include at least some of specific frequency resources evenly dividing the configured measurement band. As an example, one adjacent channel leakage interference report may include two values of which the first value may represent the amount of interference of the lowest (highest) index on the frequency axis (e.g., one of the lowest (highest) subcarrier/PRB/subband index), and the second value may represent the amount of interference of the highest (lowest) index on the frequency axis (e.g., one of the highest (lowest) subcarrier/PRB/subband index). When one adjacent channel leakage interference report includes N values, each value may be extended in a similar manner to that described above.

To measure the adjacent channel leakage interference according to one of the above-described embodiments, when a report for at least one of the CSI-RSRP, CSI-RSRQ, CSI-SINR, and RSSI is configured in the UE, and a frequency resource (e.g., at least one subband) for the report is configured, the UE may calculate "the linear average over the power contribution (in [W])" of Tables 36 and 39, separately per subband.

TABLE 36

| CSI reference signal received power (CSI-RSRP) | |
|---|---|
| Definition | CSI reference signal received power (CSI-RSRP), is defined as the linear average over the power contributions (in [W]) of the resource elements of the antenna port(s) that carry CSI reference signals configured for RSRP measurements within the considered measurement frequency bandwidth in the configured CSI-RS occasions.<br>For CSI-RSRP determination CSI reference signals transmitted on antenna port 3000 according to TS 38.211 [4] shall be used. If CSI-RSRP is used for L1-RSRP, CSI reference signals transmitted on antenna ports 3000, 3001 can be used for CSI-RSRP determination.<br>For intra-frequency CSI-RSRP measurements, if the measurement gap is not configured, |

TABLE 36-continued

CSI reference signal received power (CSI-RSRP)

|   |   |
|---|---|
|   | UE is not expected to measure the CSI-RS resource(s) outside of the active downlink bandwidth part.<br>For frequency range 1, the reference point for the CSI-RSRP shall be the antenna connector of the UE. For frequency range 2, CSI-RSRP shall be measured based on the combined signal from antenna elements corresponding to a given receiver branch. For frequency range 1 and 2, if receiver diversity is in use by the UE, the reported CSI-RSRP value shall not be lower than the corresponding CSI-RSRP of any of the individual receiver branches. |
| Applicable for | If CSI-RSRP is used for L1-RSRP,<br>RRC_CONNECTED intra-frequency.<br>Otherwise,<br>RRC_CONNECTED intra-frequency,<br>RRC_CONNECTED inter-frequency |

TABLE 37

CSI reference signal received quality (CSI-RSRQ)

| | |
|---|---|
| Definition | CSI reference signal received quality (CSI-RSRQ) is defined as the ratio of N × CSI-RSRP to CSI-RSSI, where N is the number of resource blocks in the CSI-RSSI measurement bandwidth. The measurements in the numerator and denominator shall be made over the same set of resource blocks.<br>CSI Received Signal Strength Indicator (CSI-RSSI), comprises the linear average of the total received power (in [W]) observed only in OFDM symbols of measurement time resource(s), in the measurement bandwidth, over N number of resource blocks from all sources, including co-channel serving and non-serving cells, adjacent channel interference, thermal noise etc. The measurement time resource(s) for CSI-RSSI corresponds to OFDM symbols containing configured CSI-RS occasions.<br>For CSI-RSRQ determination CSI reference signals transmitted on antenna port 3000 according to TS 38.211 [4] shall be used.<br>For intra-frequency CSI-RSRQ measurements, if the measurement gap is not configured, UE is not expected to measure the CSI-RS resource(s) outside of the active downlink bandwidth part.<br>For frequency range 1, the reference point for the CSI-RSRQ shall be the antenna connector of the UE. For frequency range 2, CSI-RSSI shall be measured based on the combined signal from antenna elements corresponding to a given receiver branch, where the combining for CSI-RSSI shall be the same as the one used for CSI-RSRP measurements. For frequency range 1 and 2, if receiver diversity is in use by the UE, the reported CSI-RSRQ value shall not be lower than the corresponding CSI-RSRQ of any of the individual receiver branches. |
| Applicable for | RRC_CONNECTED intra-frequency,<br>RRC_CONNECTED inter-frequency |

TABLE 38

CSI signal-to-noise and interference ratio (CSI-SINR)

| | |
|---|---|
| Definition | CSI signal-to-noise and interference ratio (CSI-SINR), is defined as the linear average over the power contribution (in [W]) of the resource elements carrying CSI reference signals divided by the linear average of the noise and interference power contribution (in [W]). If CSI-SINR is used for L1-SINR reporting with dedicated interference measurement resources, the interference and noise is measured over resource(s) indicated by higher layers as described in TS 38.214 [6]. Otherwise, the interference and noise are measured over the resource elements carrying CSI reference signals reference signals within the same frequency bandwidth.<br>For CSI-SINR determination CSI reference signals transmitted on antenna port 3000 according to TS 38.211 [4] shall be used.<br>For intra-frequency CSI-SINR measurements not used for L1-SINR reporting, if the measurement gap is not configured, UE is not expected to measure the CSI-RS resource(s) outside of the active downlink bandwidth part.<br>For frequency range 1, the reference point for the CSI-SINR shall be the antenna connector of the UE. For frequency range 2, CSI-SINR shall be measured based on the combined signal from antenna elements corresponding to a given receiver branch. For frequency range 1 and 2, if receiver diversity is in use by the UE, the reported CSI-SINR value shall not be lower than the corresponding CSI-SINR of any of the individual receiver branches. |
| Applicable for | If CSI-SINR is used for L1-SINR,<br>RRC_CONNECTED intra-frequency.<br>Otherwise,<br>RRC_CONNECTED intra-frequency,<br>RRC_CONNECTED inter-frequency |

TABLE 39

Received Signal Strength Indicator (RSSI)

| | |
|---|---|
| Definition | Received Signal Strength Indicator (RSSI), comprises the linear average of the total received power (in [W]) observed only in configured OFDM symbols and in the configured measurement bandwidth over N number of resource blocks corresponding to LBT bandwidth with the center frequency of configured ARFCN, by the UE from all sources, including co-channel serving and non-serving cells, adjacent channel interference, thermal noise etc.<br>Higher layers configure the measurement bandwidth, measurement duration and which OFDM symbol(s) should be measured by the UE.<br>For frequency range 1, the reference point for the RSSI shall be the antenna connector of the UE. If receiver diversity is in use by the UE, the reported RSSI value shall not be lower than the corresponding RSSI of any of the individual receiver branches. |
| Applicable for | RRC_CONNECTED intra-frequency,<br>RRC_CONNECTED inter-frequency |

Although it has been described above that the subband measurement of the adjacent channel leakage interference is performed in the SRS RE pattern, CSI-RS RE pattern, or OFDM symbol level, embodiments of the disclosure are not limited, and similar operations may be performed with respect to various time/frequency resource areas including at least one of the PDSCH rate matching pattern, PUSCH rate matching pattern, or reference signal RE pattern.

Figure 24A:
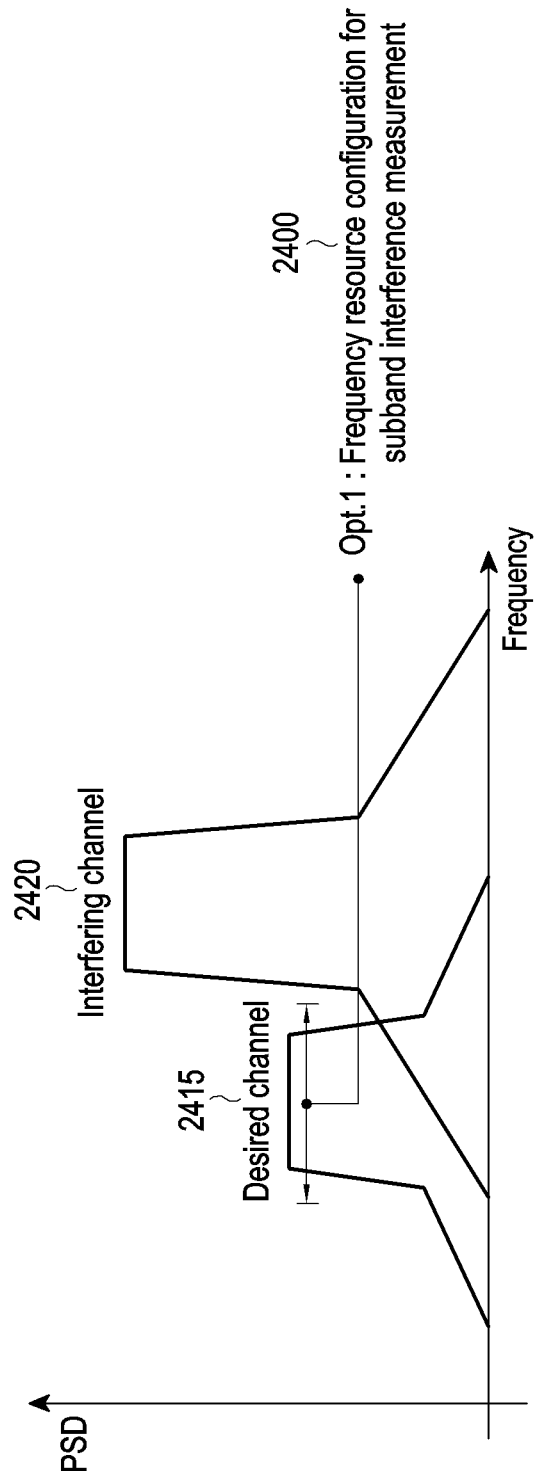
FIGS. 24A and 24B are views illustrating an example of a frequency domain resource configuration for adjacent channel leakage interference measurement according to an embodiment of the disclosure.
Figure 24B:
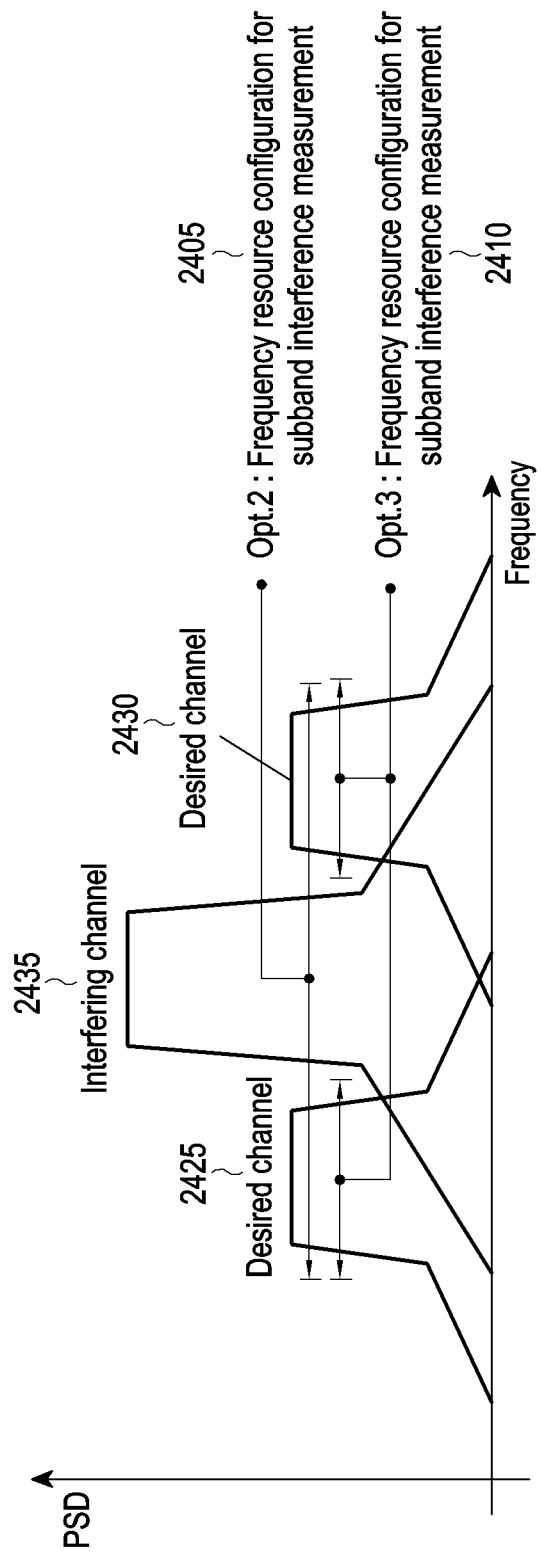

FIGS. 24A and 24B are views illustrating an example of a frequency domain resource configuration for adjacent channel leakage interference measurement according to an embodiment of the disclosure. Here, for convenience of description, the PSD of FIG. 22 is simplified. The illustrated desired channel 2415, 2425, or 2430 may correspond to the uplink resource in the context as shown in FIG. 22, and the illustrated interfering channel 2420 or 2435 may correspond to the downlink resource in the context as shown in FIG. 22. Depending on the XDD operation environment, e.g., in scenario #2 of FIG. 23, what are meant by the desired channel and the interfering channel may be properly changed, but a detailed description thereof is omitted not to obscure the gist of the description.

As shown, the tendency of the adjacent channel leakage interference may be changed depending on the resource allocation options of the desired channel and the interfering channel, so that the subband adjacent channel leakage interference measurement of one of the three options below may be performed.

Referring to FIG. 24A, option 1 2400 describes a frequency resource configuration for subband interference measurement for the case where, for XDD operation, the interfering channel 2420 operating in one downlink resource and the desired channel 2415 in one uplink resource are configured to be adjacent to each other in the frequency domain. The closer to the interfering channel 2420 in the frequency band of the desired channel, the larger adjacent channel leakage interference occurs. Thus, the base station may configure one frequency resource including the whole or part of the frequency band of the desired channel 2415, for subband interference measurement to measure and report the adjacent channel leakage interference.

Referring to FIG. 24B, option 2 2405 describes a frequency resource configuration for subband interference measurement for the case where, for XDD operation, the interfering channel 2425 in one uplink resource is configured to be adjacent in the frequency domain between desired channels 2425 and 2430 in two downlink resources. The configuration may be considered to minimize the influence on another operator of an adjacent band by the adjacent channel leakage of the interfering channel 2435. In this case, the closer to the interfering channel 2435 in the frequency bands of the desired channels 2425 and 2430, the larger adjacent channel leakage interference occurs. Thus, different tendencies of adjacent channel leakage occur in the two downlink resources 2425 and 2430. Given this, one frequency resource including all of the frequency bands of the two desired channels 2425 and 2430 may be configured for subband interference measurement, and in some bands thereof, it is possible to measure and report adjacent channel leakage interference.

Referring to FIG. 24B, option 3 2410 describes a frequency resource configuration for subband interference measurement for the case where, for XDD operation, the interfering channel 2425 in one uplink resource is configured to be adjacent in the frequency domain between desired channels 2425 and 2430 in two downlink resources. The configuration may be considered to minimize the influence on another operator of an adjacent band by the adjacent channel leakage of the interfering channel 2435. In this case, the closer to the interfering channel 2435 in the frequency bands of the desired channels 2425 and 2430, the larger adjacent channel leakage interference occurs. Thus, different tendencies of adjacent channel leakage occur in the two downlink resources 2425 and 2430. Given this, two individual frequency resources corresponding to the two desired channels 2425 and 2430 may be configured to measure adjacent channel leakage interference.

Second Embodiment

UL frequency hopping considering subband adjacent channel leakage interference may be provided. UL frequency hopping, which is described below, may be applied to an uplink channel/signal, such as PUSCH, PUCCH, or SRS, for example.

Figure 25:
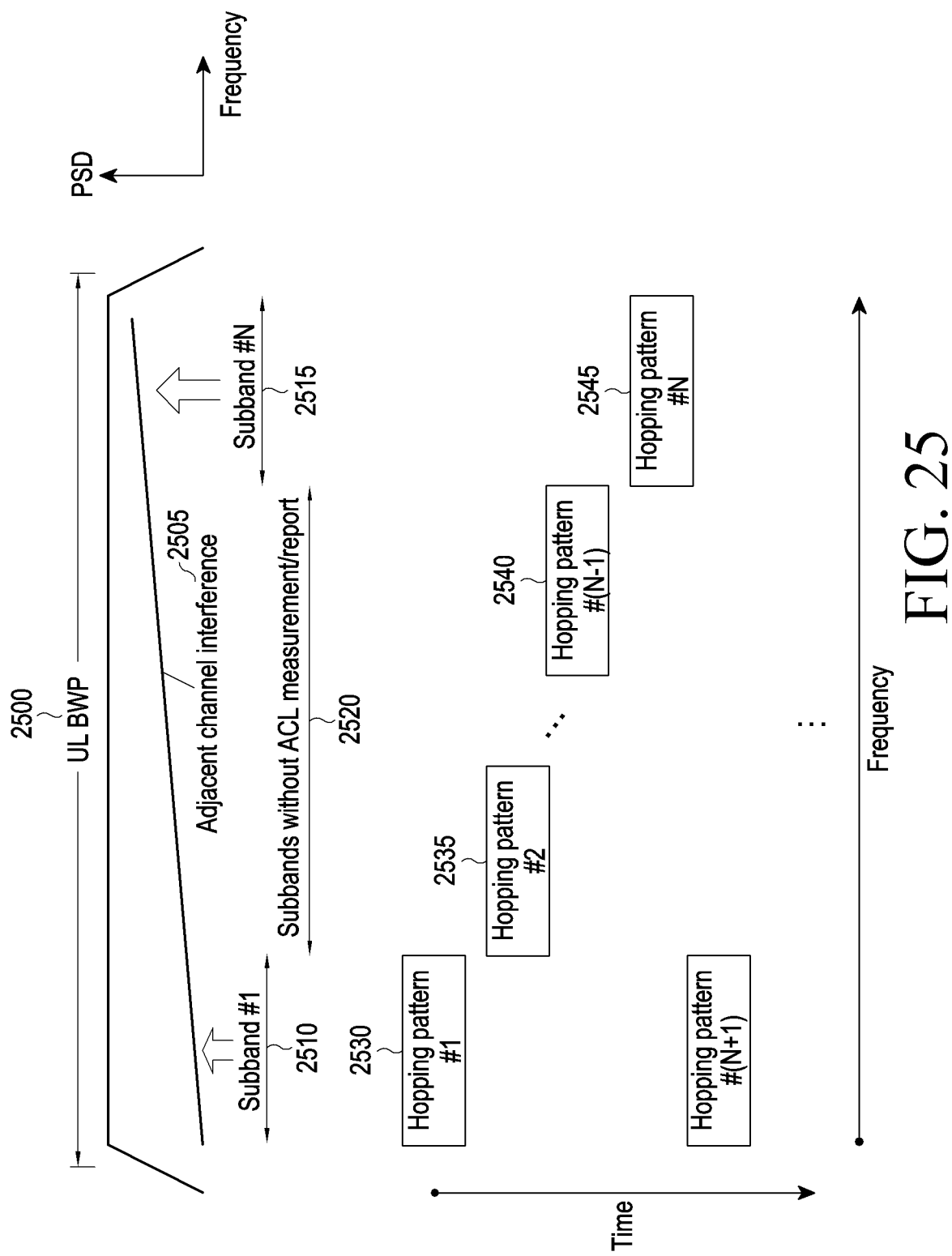
FIG. 25 is a view illustrating an example of uplink frequency hopping considering adjacent channel leakage interference measurement and reporting according to an embodiment of the disclosure.

FIG. 25 is a view illustrating an example of uplink frequency hopping considering adjacent channel leakage interference measurement and reporting according to an embodiment of the disclosure.

Referring to FIG. 25, the base station may configure one or more subbands #1 to #N 2510 and 2515 that may be used to measure the adjacent channel leakage interference 2500 within the UL BWP 2500. In this case, subbands 2520 other than the subbands 2510 and 2515 configured for adjacent channel leakage interference measurement may exist in the UL BWP 2500.

In an embodiment, the base station may configure frequency hopping for SRS, PUCCH, or PUSCH to increase uplink coverage. In this case, the UE may transmit SRS, PUCCH, or PUSCH in the frequency bands 2530, 2535, 2540, or 2545 determined according to a previously agreed-on (or configured) hopping pattern. The base station and the UE may know that there is adjacent channel leakage interference with a relatively small value in the frequency band 2530 of the first hopping pattern, through the measurement and reporting for the first subband 2510 and may know that there is adjacent channel leakage interference with a relatively large value in the frequency band 2545 of the Nth hopping pattern, through the measurement and reporting for the Nth subband 2515. Accordingly, uplink reception in the Nth subband 2515 may be inferior to the uplink reception performance in the first subband 2510.

To reduce the difference in uplink reception performance for each hopping pattern due to a different adjacent channel leakage interference value for each subband, the base station may configure the transmit power of the uplink signal or channel to increase in proportion to the measured or reported adjacent channel leakage interference value. In an embodiment, the base station may transmit, to the UE, configuration information instructing to transmit the uplink channel/signal for use in measurement of the adjacent channel leakage interference according to hopping pattern #1 and hopping pattern #N. The configuration information or the separate higher layer signaling transmitted by the base station may instruct the UE to use relatively low transmit power in subband #1 2510 overlapping the frequency band 2530 of hopping pattern #1 and use relatively high transmit power in subband #N 2515 overlapping the frequency band 2545 of hopping pattern #N.

Since the frequency bands of some hopping patterns (e.g., the hopping patterns 2535 and 2540) in the UL BWP 2500 do not overlap the subbands 2510 and 2515 for measurement and reporting of the adjacent channel leakage interference, the base station and the UE may interpolate the transmit power values applied to the frequency bands 2530 and 2545 of hopping patterns #1 and #N to obtain interpolated transmit power values and apply the interpolated transmit power values to the frequency bands 2535 and 2540 of the hopping patterns. In another embodiment, the base station and the UE may interpolate the transmit power values corrected considering the adjacent channel leakage interference measured in the subbands 2510 and 2515 to obtain interpolated transmit power values and apply the interpolated transmit power values to the frequency bands 2535 and 2540 of the hopping patterns.

Third Embodiment

Interfaces for sharing information related to measurement of subband adjacent channel leakage interference between network components are described.

Figure 26:
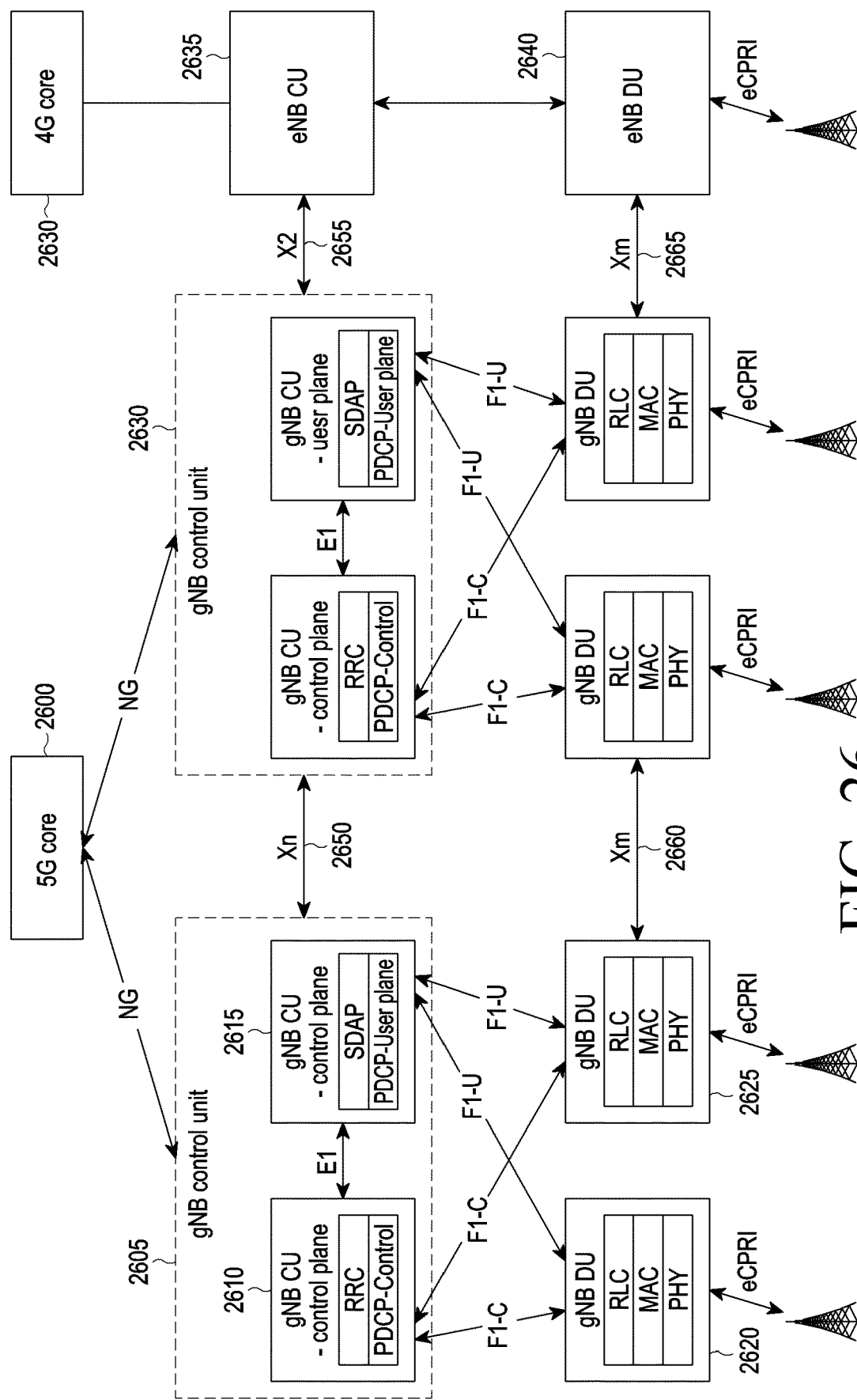
FIG. 26 is a view illustrating an example of an interface for sharing an adjacent channel leakage interference measurement value according to an embodiment of the disclosure.

FIG. 26 is a view illustrating an interface for sharing adjacent channel leakage interference measurement values according to an embodiment of the disclosure.

Referring to FIG. 26, a 5G network may include a 5G core network 2600 and one or more gNB control units (CUs) 2605 connected thereto, gNB distributed units (DUs) 2620 and 2625 that may be connected to one or more CUs, and radio units (or remote units) (RUs) respectively connected to the DUs. An interface between the components is defined to seamlessly connect the network components. As an example, one gNB CU 2605 and the other gNB CU 2630 may exchange information shown in Table 40 below, through an interface referred to as Xn 2650. In an embodiment, when the gNB CU 2630 is connected with the eNB CU 2635, information shown in Table 40 below may be exchanged through an X2 interface 2655 defined in LTE considering backward compatibility.

TABLE 40

| | Function | X2 | Xn | Overview |
|---|---|---|---|---|
| C-plane functions | Interface management | v | v | Interface setup, reset, configuration update, error indication |
| | UE context management | v | v | Function for UE context management |
| | Mobility management | v | v | Management for e.g. UE inter-node mobility (handover) |
| | DC within same RAT | v | v | Function to operate DC in same RAT |
| | Load management | v | | Function to indicate resource load status to other nodes |
| | Energy saving | v | v | Function for energy saving by turning cells on/off |
| | Message transfer | v | | Function for forwarding messages to other eNBs |
| | UE context retrieval | v | | Function for retrieving UE context from other nodes |
| | EN-DC | v | v | Function for operating DC between LTE and NR |
| | Secondary RAT data usage report | v | | Function for reporting data volume of a RAT when using several RATs (such as EN-DC) |
| | Inactive management | | v | Function for managing inactive UEs |
| U-plane functions | User data transfer | v | v | Transferring user data during DC |
| | Flow control | v | v | Additional functions: polling, discarding duplicate data, status indication for retransmission data, etc. |

The configuration information on adjacent channel leakage interference measurement described above may include information related to interference between base stations, e.g., as in ③ of FIG. 23 and needs to be shared between base station CUs or DUs. To that end, the X2 interface 2655 or Xn interface 2650 may further carry configuration information corresponding to at least one of the measurement and reporting of the adjacent channel leakage interference.

In an embodiment, the gNB CU 2630 may transmit configuration information about measurement and/or reporting of the adjacent channel leakage interference related to inter-base station interference to the gNB CU 2605 through the Xn interface 2650. The configuration information may be used to measure adjacent channel leakage interference in the gNB CU 2605 or create the UE's configuration information. In an embodiment, the gNB CU 2630 may transmit configuration information about the measurement and/or reporting of the adjacent channel leakage interference related to inter-base station interference to the eNB CU 2635 through the Xn interface 2655. The configuration information may be used to measure the adjacent channel leakage interference in the eNB CU 2635 or create the UE's configuration information.

In this case, Xm interfaces 2660 and 2665 which mean interfaces for carrying MAC information or interfaces between different DUs may also be used to carry configuration information related to the measurement and reporting of the adjacent channel leakage interference. In an embodiment, the gNB DU (e.g., the gNB DU 2625) may transmit configuration information about the measurement and/or reporting of the adjacent channel leakage interference related to inter-base station interference to another gNB DU or eNB DU (e.g., the eNB DU 2640) through the Xm interfaces 2660 and 2665. The configuration information may be used to measure adjacent channel leakage interference in the gNB CU or eNB DU or create the UE's configuration information.

Fourth Embodiment

A method for applying a measurement offset considering an asynchronous network in measuring and reporting adjacent channel leakage interference is provided.

In an embodiment, information about adjacent channel leakage interference measurement may include information about inter-base station interference as in ③ of FIG. 23. In an asynchronous network, transmission timings or reception timings between two different base stations may not exactly match at a sample level, a symbol level, or a slot level. When the degree of mismatch of the sample level, symbol level, or slot level is not shared between base stations, or when the degree of mismatch is not known to the UE, the time of adjacent channel leakage interference measurement may be inaccurate. The ambiguity of the time of the adjacent channel leakage interference measurement may impair the accuracy of calculation when the base station calculates the signal-to-interference-noise ratio (SINR) considering the adjacent channel leakage interference as part of the entire interference.

To address this problem, the base station may provide, to another base station or the UE, a measurement offset of higher layer signaling indicating the degree of timing mismatch between base stations of the sample level, symbol level, or slot level. In this case, the measurement offset for the degree of mismatch may include at least one of a sample level offset, a symbol level offset, and a slot level offset, or may be defined as one value indicating the degree of timing mismatch of the sample level, the symbol level, and the slot level.

In an embodiment, the base station may include a measurement offset indicating a timing difference between base stations in MeasGapConfig, which is higher layer signaling indicating configuration information about the measurement gap, and transmit it to the UE. As an embodiment, MeasGapConfig may include refFR2ServCellAsyncXDD, which is a parameter indicating a timing difference between base stations. The parameter may include at least one of a sample level offset, a symbol level offset, and a slot level offset, or may be defined as one value indicating the degree of timing mismatch of the sample level, the symbol level, and the slot level.

As another embodiment, MeasGapConfig transmitted by the base station may be configured as shown in Table 41. Here, refFR2ServCellAsyncCA, a parameter indicating the reference cell of Rel-16 asynchronous CA in MeasGapConfig, may include a value indicating the difference between transmission timing and reception timing between two different base stations at the sample level, symbol level, or slot level.

In Table 41, it is described that the refFR2ServCellAsyncCA field exists only when the condition of AsyncCA is met. Since the measurement of adjacent channel leakage interference due to XDD operation is required regardless of the AsyncCA condition, the condition for the presence of the refFR2ServCellAsyncCA field may be extended to include the case where the base station configures the XDD operation. In this case, the case where the base station configures XDD operation means that the base station sets UL rate matching may include at least one of when the base station configures UL rate matching, when it configures an XDD BWP, when it configures adjacent channel leakage interference measurement and reporting, or when it configures subband interference measurement and reporting.

TABLE 41

MeasGapConfig

The IE MeasGapConfig specifies the measurement gap configuration and controls setup/release of measurement gaps.

| MeasGapConfig information element |
| --- |
| -- ASN1START |
| -- TAG-MEASGAPCONFIG-START |
|     MeasGapConfig ::=                      SEQUENCE { |
|       gapFR2                              SetupRelease { GapConfig } |
|       OPTIONAL,   -- Need M |
|       ..., |
|       [[ |
|       gapFR1                              SetupRelease { GapConfig } |
|       OPTIONAL,   -- Need M |
|       gapUE                               SetupRelease { GapConfig } |
|       OPTIONAL    -- Need M |
|       ]] |
|     } |
|     GapConfig ::=                            SEQUENCE { |
|       gapOffset                           INTEGER (0..159), |
|       mgl                                  ENUMERATED {ms1dot5, ms3, ms3dot5, ms4, ms5dot5, ms6}, |
|       mgrp                                ENUMERATED {ms20, ms40, ms80, ms160}, |

TABLE 41-continued

```
    mgta                        ENUMERATED {ms0, ms0dot25,
ms0dot5},
    ...,
    [[
    refServCellIndicator        ENUMERATED {pCell, pSCell, mcg-
FR2}                            OPTIONAL  -- Cond
NEDCorNRDC
    ]],
    [[
    refFR2ServCellAsyncCA-r16   ServCellIndex
OPTIONAL   -- Cond AsyncCA
    ]]
}
-- TAG-MEASGAPCONFIG-STOP
-- ASN1STOP
```

MeasGapConfig field descriptions gapFR1
Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14].
gapFR2
Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in TS 38.133 [14].
gapUE
Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap), In NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133 [14].
gapOffset
Value gapOffset is the gap offset of the gap pattern with MGRP indicated in the field mgrp. The value range is from 0 to mgrp-1.
mgl
Value mgl is the measurement gap length in ms of the measurement gap. The measurement gap length is according to in Table 9.1.2-1 in TS 38.133 [14]. Value ms1dot5 corresponds to 1.5 ms, ms3 corresponds to 3 ms and so on.
mgrp
Value mgrp is measurement gap repetition period in (ms) of the measurement gap. The measurement gap repetition period is according to Table 9.1.2-1 in TS 38.133 [14].
mgta
Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms.
refFR2ServCellAsyncCA
Indicates the FR2 serving cell identifier whose SFN and subframe is used for FR2 gap calculation for this gap pattern with asynchronous CA involving FR2 carrier(s).
refServCellIndicator
Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG.

| Conditional Presence | Explanation |
|---|---|
| AsyncCA | This field is mandatory present when configuring FR2 gap pattern to UE in (NG)EN-DC/NR SA with asynchronous CA involving FR2 carrier(s), and NE-DC/NR-DC with asynchronous CA involving FR2 carrier(s) if IE refServCellIndicator is set to mcg-FR2. Otherwise, it is absent. |
| NEDCorNRDC | This field is mandatory present when configuring gap pattern to UE in NE-DC or NR-DC. In case the gap pattern to UE in NE-DC and NR-DC is already configured, then the field is absent, need M. Otherwise, it is absent. |

Hereinafter, UE operation and base station implementations considering XDD operation are described.

Figure 27A:
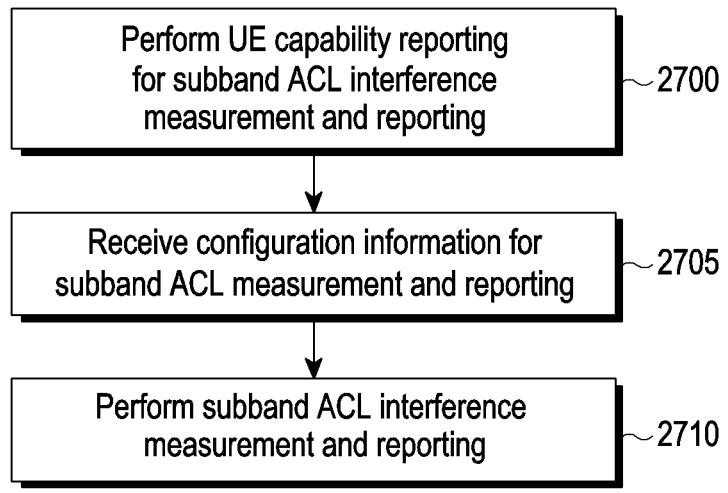
FIG. 27A is a flowchart illustrating UE operations according to an embodiment of the disclosure.

FIG. 27A is a flowchart illustrating UE operations according to an embodiment of the disclosure.

Referring to FIG. 27A, in step 2700, the UE may transmit a UE capability report for measurement and reporting of subband adjacent channel leakage interference according to at least one or a combination of the above-described embodiments to the base station. The UE capability report may include information indicating whether measurement and reporting of the subband adjacent channel leakage interference is possible and information indicating the type of methods supportable by the UE to measure and report the subband adjacent channel leakage interference. The base station may create configuration information including related information, such as frequency resource and time resource, for measurement and reporting of the subband adjacent channel leakage interference to the UE by referring to the UE capability report.

In step 2705, the UE may receive the configuration information from the base station through higher layer signaling and/or L1 signaling. As an example, the configuration information may include at least one of information instructing to perform the measurement and reporting of adjacent channel leakage (ACL) interference, time resource information indicating the time range to be used for measurement of the adjacent channel leakage (ACL) interference, frequency resource information indicating at least one subband to be used for measurement of adjacent channel leakage (ACL) interference, or the measurement offset indicating the degree of timing mismatch between base stations of the sample level, symbol level, or slot level.

In step 2710, the UE may measure the subband adjacent channel leakage interference according to the configuration information and report the measured subband adjacent channel leakage interference.

Figure 27B:
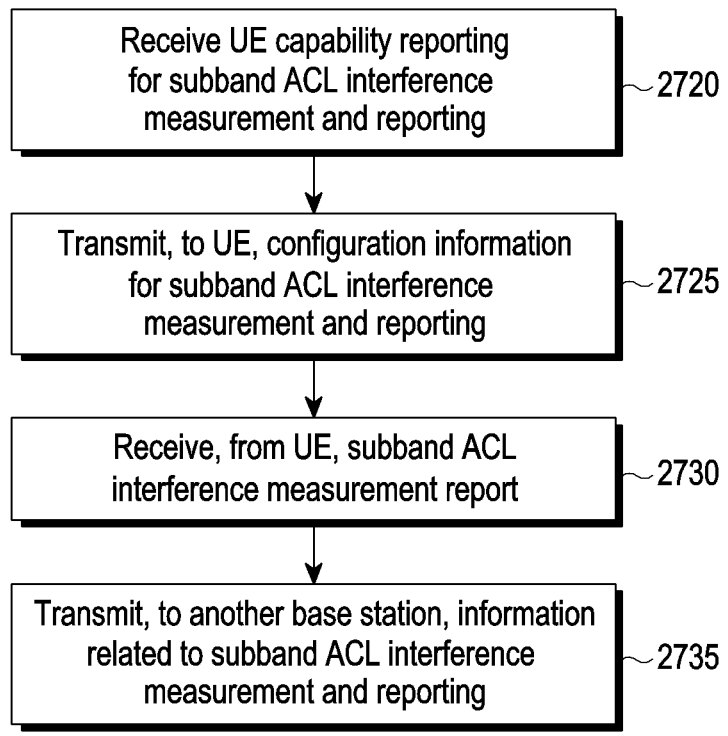
FIG. 27B is a flowchart illustrating base station operations according to an embodiment of the disclosure.

FIG. 27B is a flowchart illustrating base station operations according to an embodiment of the disclosure.

Referring to FIG. 27B, in step 2720, the base station may receive a UE capability report for measurement and reporting of subband adjacent channel leakage interference according to at least one or a combination of the above-described embodiments, from the UE. The UE capability report may include information indicating whether measurement and reporting of the subband adjacent channel leakage interference is possible and information indicating the type of methods supportable by the UE to measure and report the subband adjacent channel leakage interference.

In step 2725, the base station may create configuration information including information related to the frequency resource and time resource for measurement and reporting of subband adjacent channel leakage interference to the UE by referring to the UE capability report and transmit the configuration information on measurement and reporting of subband adjacent channel leakage interference to the UE through higher layer signaling and/or L1 signaling.

In step 2730, the base station may receive the subband adjacent channel leakage interference measurement report transmitted from the UE based on the configuration information. In step 2735, the base station may transmit, e.g., inter-base station information, created based on the interference measurement report and/or the configuration information, as the information related to the subband adjacent channel leakage interference measurement and reporting, to another base station or receive, from another base station, the subband adjacent channel leakage interference configuration information and/or information related to interference measurement report. Here, step 2735 is shown after step 2730, but the order is not limited.

Next, a hardware structure for XDD operation and an XDD bandwidth configuration using the same are described.

Figure 28:
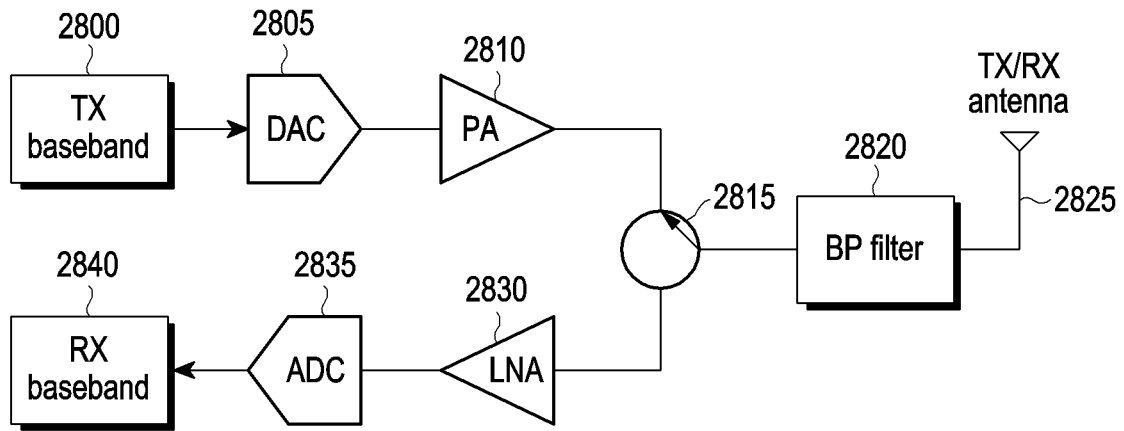
FIG. 28 is a view illustrating an example of base station implementation according to an embodiment of the disclosure.

FIG. 28 is a view illustrating an example of base station implementation according to an embodiment of the disclosure.

Referring to FIG. 28, a transmission (TX) baseband processor 2800 may output a digital signal generated through digital processing including modulation, and a digital-analog converter (DAC) 2805 may convert the digital signal into an analog signal. The analog signal may be amplified into a preset transmit power level by a power amplifier (PA) 2810, and the amplified signal may be transferred to a bandpass (BP) filter 2820 through a distributor 2815 that may be configured as a duplexer, circulator, or switch. The signal filtered by the BP filter 2820 to minimize adjacent channel leakage may be radiated through a transmission/reception antenna 2825.

The analog reception signal received through the transmission/reception antenna 2825 may be filtered to leave only a signal within the band of interest as possible, while passing through the BP filter 2820. The output signal of the BP filter 2820 may be transferred to a low-noise amplifier (LNA) 2830 through the distributor 2815. The LNA 2830 may amplify the transferred signal to a proper level, as an input to an analog-digital converter (ADC) 2835, and the ADC 2835 may convert the amplified signal into a digital signal and transfer it to a reception (RX) baseband processor 2840. The RX baseband processor 2840 may perform digital processing including demodulation on the transferred digital signal.

The base station implementation shown in FIG. 28 uses one BP filter 2820 and may thus be normally operated when the uplink and downlink transmission bands are equal or similar to each other.

Figure 29:
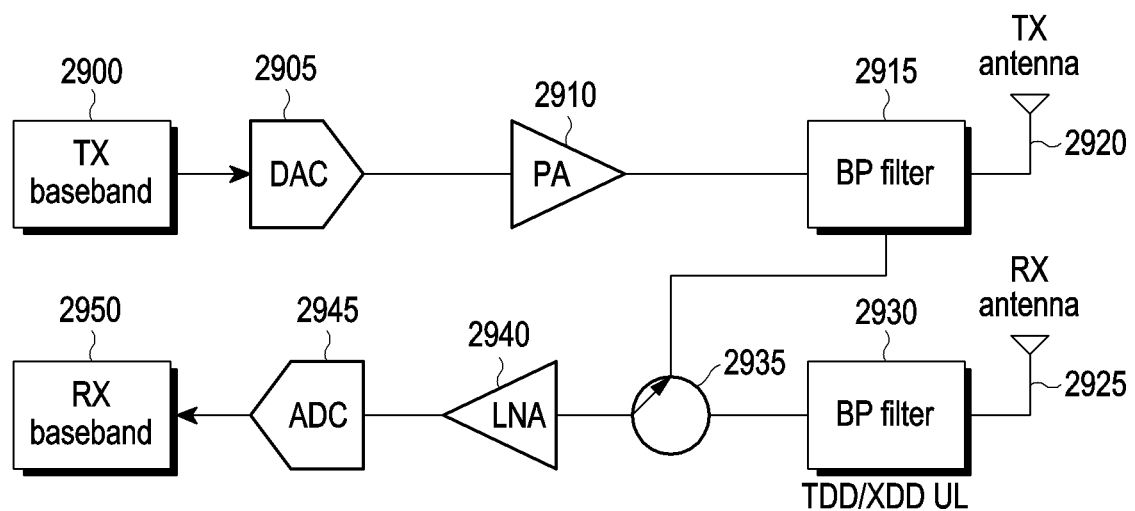
FIG. 29 is a view illustrating another example of base station implementation according to an embodiment of the disclosure.

FIG. 29 is a view illustrating another example of base station implementation according to an embodiment of the disclosure. In the illustrated implementation, an independent transmit end antenna and receive end antenna may be introduced and two different BP filters may be used for each antenna.

Referring to FIG. 29, a transmit end baseband processor 2900 may output a digital signal generated through digital processing including modulation, and a digital-analog converter (DAC) 2905 may convert the digital signal into an analog signal. The analog signal may be amplified into a preset transmit power level by the power amplifier (PA) 29-10, and the amplified signal may be transferred to the transmission BP filter 2915. The signal filtered by the BP filter 2915, which is configured with a downlink frequency band, to minimize adjacent channel leakage may be radiated through a transmission antenna 2920.

The analog reception signal received through the reception antenna 2925 may be filtered to leave only a signal within the band of uplink interest as possible, while passing through the reception BP filter 2930. The output signal of the BP filter 2930 may be transferred to a reception LNA 2940 through the distributor 2935. The reception signal properly amplified through the LNA 2940 may be converted into a digital signal through the ADC 2945 and be transferred to the RX baseband processor 2950. The RX baseband processor 2950 may perform digital processing including demodulation on the received digital signal.

When measuring the self interference from the base station transmit end, the base station may control the distributor 2935 (or coupler), which may be configured of a duplexer, a circulator, or a switch, to transfer the signal, transferred from the transmission BP filter 2915 to the transmission antenna 2920, to the LNA 2940. The self interference signal properly amplified through the LNA 2940 may be converted into a digital signal through the ADC

2945 and be transferred to the RX baseband processor 2950, and adjacent channel leakage interference may be measured at the digital level.

The base station implementation of FIG. 29 uses two different BP filters 2915 and 2930 and may thus obtain excellent adjacent channel leakage suppression performance even when the uplink and downlink transmission bands are different or the transmission bandwidths significantly differ.

Upon XDD operation, uplink bands in different slots may be rendered to significantly differ as in the example shown in FIG. 18. This means that one or more reception (or transmission) BP filters may be required for efficient XDD operation.

When the channel bandwidth of the TDD or XDD base station is B and the XDD UL transmission bandwidth is B_XDD, the base station may include a BP filter that may be implemented in hardware or software in addition to the BP filter configured with the channel bandwidth B, and the pass bandwidth B_F of the BP filter may be configured to meet the following equation.

$$B\_XDD <= B\_F << B$$

Here, a continuous frequency band having a bandwidth of B_F may exist within the channel bandwidth B, and the location of the band of B_F may be configured not to be changed within the frequency bandwidth B or may be semi-statically changed.

The frequency bandwidth of B_XDD may be constituted of contiguous PRB(s) within the bandwidth B_F, and the location may be dynamically or semi-statically configured to the UE by the base station's scheduling information or system information or information corresponding thereto.

Figure 30:
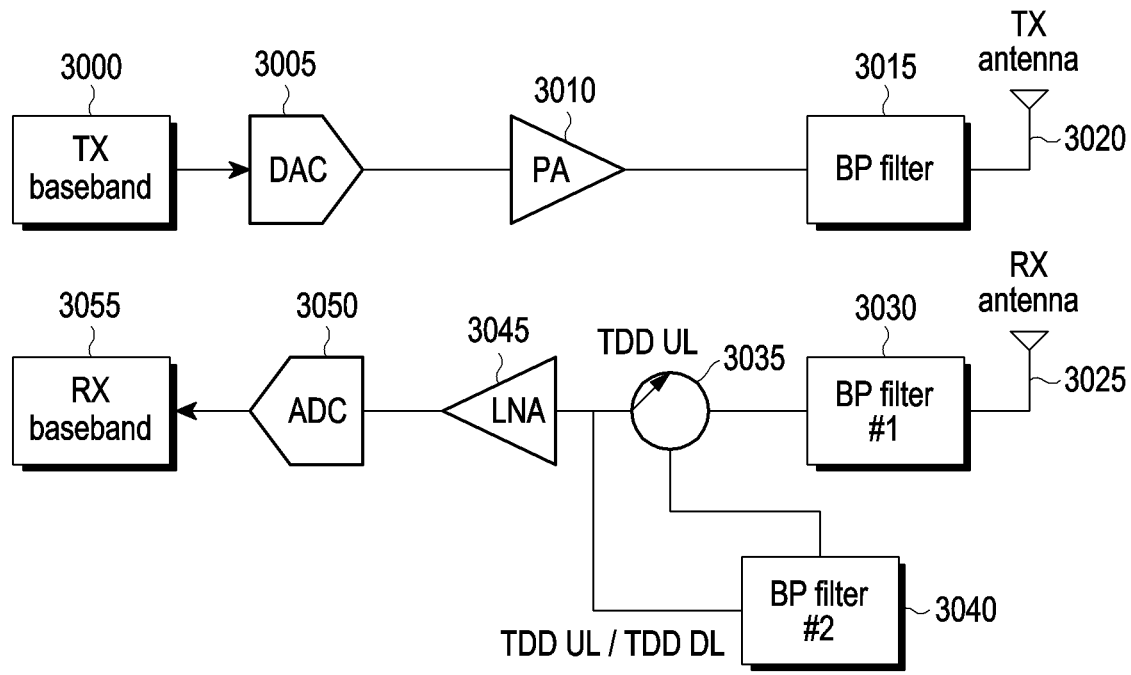
FIG. 30 is a view illustrating another example of base station implementation according to an embodiment of the disclosure.

FIG. 30 is a view illustrating another example of base station implementation according to an embodiment of the disclosure. In the illustrated implementation, a first reception BP filter 3030 that may be configured with the channel bandwidth B of the base station and a second reception BP filter 3040 that may be configured with the pass bandwidth B_F including the XDD UL transmission bandwidth B_XDD are shown.

Referring to FIG. 30, the transmit end baseband processor 3000 may transfer a digital signal generated through digital processing including modulation to the digital-analog converter (DAC) 3005. The DAC 3005 may convert the digital signal into an analog signal. The analog signal may be amplified into a preset transmit power level by the power amplifier (PA) 3010, and the amplified signal may be transferred to the transmission BP filter 3015. The signal filtered by the BP filter 3115, which is configured with a downlink frequency band, to minimize adjacent channel leakage may be radiated through a transmission antenna 3020.

The analog reception signal received through the reception antenna 3025 may be filtered to leave only a signal within the band of uplink interest as possible, while passing through the first reception BP filter 3030. The output signal of the BP filter 3030 may be transferred to a reception LNA 3045 through the distributor 3035. The reception signal properly amplified through the LNA 3045 may be converted into a digital signal through the ADC 3050 and be transferred to the RX baseband processor 3055. The RX baseband processor 3055 performs digital processing including demodulation on the received digital signal.

When an uplink bandwidth change occurs due to XDD operation, the base station may control the distributor 3035, which may be configured as a switch or coupler, so that the signal output from the first reception BF filter 3030 is input to the second reception BP filter 3040 configured with the XDD UL or TDD DL band. The output signal of the second reception BP filter 3040 may be transferred to the LNA 3045. The interference signal properly amplified through the LNA 3045 may be converted into a digital signal through the ADC 3050 and be transferred to the RX baseband processor 3055, and adjacent channel leakage interference may be measured at the digital level.

The BP filters shown in FIGS. 29 and 30 may be replaced with a spatial domain filter through beamforming. When the frequency band supported by the XDD base station is very high, such as a millimeter wave, the base station may be configured in substantially the same manner using an XDD antenna module, instead of the BP filter.

Figure 31:
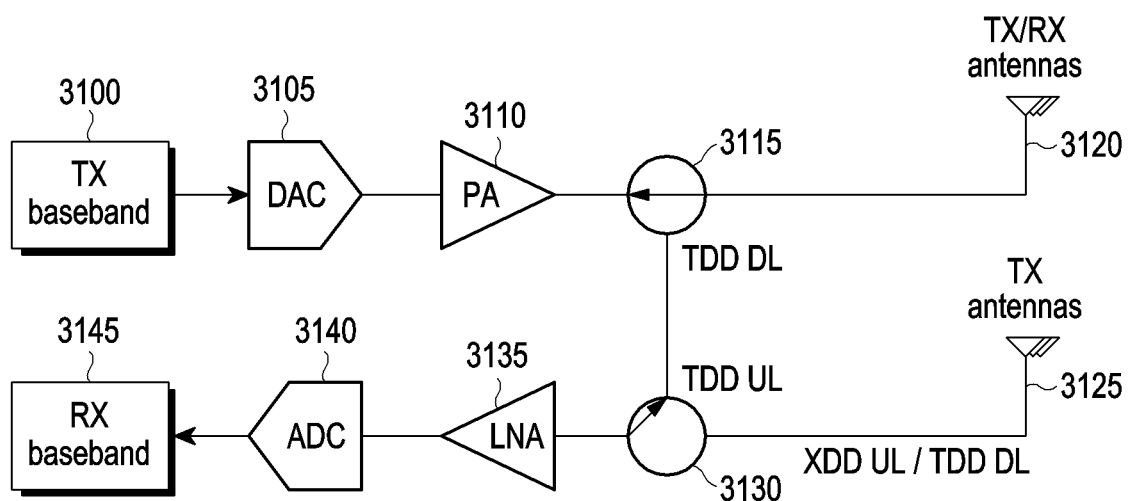
FIG. 31 is a view illustrating another example of base station implementation according to an embodiment of the disclosure.

FIG. 31 is a view illustrating another example of base station implementation according to an embodiment of the disclosure. In the illustrated implementation, instead of including BF filters, the transmission/reception antenna 3120 and the reception antenna 315 may be implemented as an antenna module having a spatial domain filtering function through beamforming.

Referring to FIG. 31, a transmit end baseband processor 3100 may transfer a digital signal generated through digital processing including modulation, to the DAC 3005, and the DAC 3005 may convert the digital signal into an analog signal. The analog signal may be amplified into a preset transmit power level by the PA 3110, and the amplified signal may be radiated by the transmission/reception antenna 3120 through the distributor 3115.

In the TDD UL operation, the analog reception signal received through the transmission/reception antenna 3120 may be transferred to the LNA 3135 through the distributor 3115. The reception signal properly amplified through the LNA 3135 may be converted into a digital signal through the ADC 3140 and be transferred to the RX baseband processor 3145. The RX baseband processor 3145 performs digital processing, such as demodulation, on the received digital signal.

The first antenna module 3120 may be used to support the DL/UL of TDD, and the second antenna module 3125 may be used for XDD UL only in which case, the first antenna module 3120 may be used for XDD DL. The first antenna module 3120 may be configured to have a pass bandwidth of channel bandwidth B, and the second antenna module 3125 may be configured to have a pass bandwidth of B_F (<=B).

The above-described embodiments and methods are not mutually exclusive and may be operated in combination according to contexts. For example, when the frequency hopping of the second embodiment is applied, one of the subband adjacent channel leakage interference measurement methods of the first embodiment may be used. In order not to obscure the gist of the embodiments, not all possible combinations are enumerated.

Figure 32:
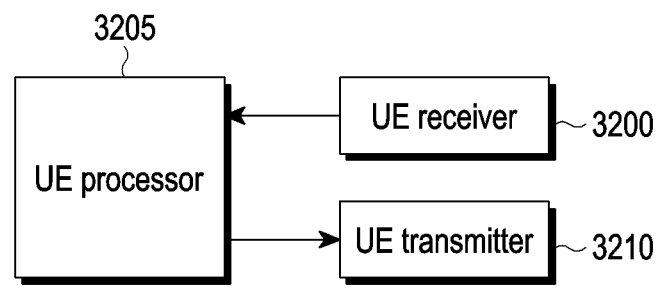
FIG. 32 is a block diagram illustrating a UE according to an embodiment of the disclosure.

FIG. 32 is a block diagram illustrating a UE according to an embodiment of the disclosure.

Referring to FIG. 32, a UE may include a UE receiver 3200, a UE transmitter 3210, and a UE processor 3205. The transmitter 3210, the receiver 3200, and the processor 3205 may be operated according to at least one or a combination of the above-described embodiments. The configuration of the UE is not limited to the illustrated example, and the UE may add more components than the above-described components or omit some components. Further, in a specific case, the transmitter 3210, the receiver 3200, and the processor 3205 may be implemented in the form of a single chip.

The transmitter 3210 and the receiver 3200 may be configured as a transceiver according to an embodiment. The transceiver 3200 and 3210 may transmit and receive signals to/from a base station. The signals may include control information and data. To that end, the transceiver 3200 and 3210 may include an RF transmitter for frequency-up converting and amplifying signals transmitted and an RF receiver for low-noise amplifying signals received and frequency-down converting the frequency of the received signals. Further, the transceiver 3200 and 3210 may receive signals via a radio channel, output the signals to the processor 3205, and transmit signals output from the processor 3205 via a radio channel.

The processor 3205 may control a series of operations of the UE according to at least one of the above-described embodiments of the disclosure. For example, the processor 3205 may perform at least one of transmission of an uplink channel/signal, reception of a downlink channel/signal, and measurement and reporting of adjacent channel leakage interference according to at least one or a combination of the embodiments of the disclosure. Further, there may be included a memory capable of storing control information or data, such as uplink-downlink configuration information and guard band configuration information included in the signal obtained from the UE. The memory may have an area for storing data required for control by the processor 3205 and data generated during control by the controller 3205.

Figure 33:
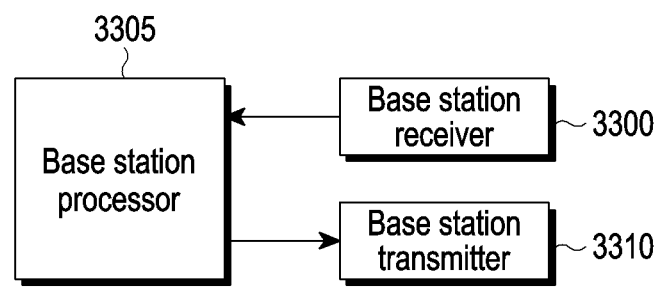
FIG. 33 is a block diagram illustrating a base station according to an embodiment of the disclosure.

FIG. 33 is a block diagram illustrating a base station according to an embodiment of the disclosure.

Referring to FIG. 33, a base station may include a base station transmitter 3310, a base station receiver 3300, and a base station processor 3305. The transmitter 3310, the receiver 3300, and the processor 3305 of the base station may be operated according to at least one or a combination of the above-described embodiments. The configuration of the base station is not limited to the illustrated example, and the base station may add more components than the above-described components or omit some components. Further, in a specific case, the transmitter 3310, the receiver 3300, and the processor 3305 may be implemented in the form of a single chip.

The transmitter 3310 and the receiver 3300 may be configured as a transceiver according to an embodiment. The transceiver 3300 and 3310 may transmit and receive signals to/from a UE. The signals may include control information and data. To that end, the transceiver 3300 and 3310 may include an RF transmitter for frequency-up converting and amplifying signals transmitted and an RF receiver for low-noise amplifying signals received and frequency-down converting the frequency of the received signals. Further, the transceiver 3300 and 3310 may receive signals via a radio channel, output the signals to the processor 3305, and transmit signals output from the processor 3305 via a radio channel. As an example, the transceiver 3300 and 3310 may have an implementation of one of FIGS. 28 to 31 described above.

The processor 3305 may control a series of operations of the base station according to at least one of the above-described embodiments of the disclosure. For example, the processor 3305 may perform at least one of reception of an uplink channel/signal, transmission of a downlink channel/signal, and measurement and reporting of adjacent channel leakage interference according to at least one or a combination of the embodiments of the disclosure.

Further, there may be included a memory capable of storing control information or data, such as uplink-downlink configuration information and guard band configuration information determined by the base station, or control information or data received from the UE. The memory may have an area for storing data required for control by the processor 3305 and data generated during control by the controller 3305.

The embodiments herein are provided merely for better understanding of the disclosure, and the present invention should not be limited thereto or thereby. In other words, it is apparent to one of ordinary skill in the art that various changes may be made thereto without departing from the scope of the disclosure. Further, the embodiments may be practiced in combination.

The invention claimed is:

1. A method by a user equipment (UE) configured to perform measurement and reporting of adjacent channel interference in a wireless communication system, the method comprising:
    transmitting, to a base station, a UE capability report related to measurement and reporting of subband-specific adjacent channel leakage (ACL) interference;
    receiving, from the base station, configuration information indicating frequency resources and time resources for measurement and reporting of the subband-specific ACL interference;
    measuring the subband-specific ACL interference based on the configuration information; and
    reporting the measured subband-specific ACL interference to the base station.

2. The method of claim 1,
    wherein the configuration information includes:
        measurement configuration information indicating time and frequency resources to measure uplink ACL interference, and
        report configuration information indicating to report a measurement result of the uplink ACL interference on at least one subband, and
    wherein the measurement configuration information includes time and frequency resource information including at least one of a sounding reference signal (SRS) resource, an uplink rate matching resource, an uplink orthogonal frequency division multiplexing (OFDM) symbol location, an uplink slot location, an uplink physical resource block (PRB) or a subband location, or an uplink bandwidth part (BWP).

3. The method of claim 2, wherein the measurement configuration information includes information of frequency resources located at two opposite ends of a measurement band for the UE.

4. The method of claim 1,
    wherein the configuration information includes:
        measurement configuration information indicating a time and frequency resource to measure downlink ACL interference, and
        report configuration information indicating to report a measurement result of the downlink ACL interference on at least one subband, and
    wherein the measurement configuration information includes time and frequency resource information including at least one of a channel state information (CSI) reference signal (RS) resource, a downlink rate matching resource, a downlink orthogonal frequency division multiplexing (OFDM) symbol location, a downlink physical resource block (PRB) or a subband location, or a downlink bandwidth part (BWP).

5. The method of claim 4, wherein the measurement configuration information includes information of frequency resources located at two opposite ends of a measurement band for the UE.

6. The method of claim 1, wherein the configuration information includes:
first transmit power information instructing the UE to use first transmit power on a first subband configured for ACL interference measurement and use second transmit power on a second subband configured for ACL interference measurement; and
second transmit power information instructing to apply transmit power values obtained by interpolating the first and second transmit power on subbands other than the first subband and the second subband of a measurement band configured for the UE.

7. The method of claim 1, wherein the measured subband-specific ACL interference includes at least one of:
sounding reference signal reference signal received power (SRS-RSRP);
cross-link interference received signal strength indicator (CLI-RSSI);
channel state information RSRP (CSI-RSRP);
CSI reference signal received quality (CSI-RSRQ);
CSI signal-to-noise and interference ratio (CSI-SINR); or
received signal strength indicator (RSSI).

8. The method of claim 1, wherein the configuration information includes at least one of information instructing to perform measurement and reporting of the adjacent channel leakage (ACL) interference and a measurement offset indicating a degree of timing mismatch between base stations of a sample level, a symbol level, or a slot level.

9. A method by a base station configured to control measurement and reporting of adjacent channel interference in a wireless communication system, the method comprising:
receiving, from a UE, a UE capability report related to measurement and reporting of subband-specific adjacent channel leakage (ACL) interference;
transmitting, to the UE, configuration information indicating frequency resources and time resources for measurement and reporting of the subband-specific ACL interference; and
receiving, from the UE, a measurement report of the subband-specific ACL interference based on the configuration information.

10. The method of claim 9,
wherein the configuration information includes:
measurement configuration information indicating time and frequency resources to measure uplink ACL interference, and
report configuration information indicating to report a measurement result of the uplink ACL interference on at least one subband, and
wherein the measurement configuration information includes time and frequency resource information including at least one of a sounding reference signal (SRS) resource, an uplink rate matching resource, an uplink orthogonal frequency division multiplexing (OFDM) symbol location, an uplink slot location, an uplink physical resource block (PRB) or a subband location, or an uplink bandwidth part (BWP).

11. The method of claim 10, wherein the measurement configuration information includes information of frequency resources located at two opposite ends of a measurement band for the UE.

12. The method of claim 9,
wherein the configuration information includes:
measurement configuration information indicating a time and frequency resource to measure downlink ACL interference, and
report configuration information indicating to report a measurement result of the downlink ACL interference on at least one subband, and
wherein the measurement configuration information includes time and frequency resource information including at least one of a channel state information (CSI) reference signal (RS) resource, a downlink rate matching resource, a downlink orthogonal frequency division multiplexing (OFDM) symbol location, a downlink physical resource block (PRB) or a subband location, or a downlink bandwidth part (BWP).

13. The method of claim 12, wherein the measurement configuration information includes information of frequency resources located at two opposite ends of a measurement band for the UE.

14. A device of a UE configured to perform measurement and reporting of adjacent channel interference in a wireless communication system, the device comprising:
a transceiver configured to transmit, to a base station, a UE capability report related to measurement and reporting of subband-specific adjacent channel leakage (ACL) interference and receive, from the base station, configuration information indicating frequency resources and time resources for measurement and reporting of the subband-specific ACL interference; and
a processor configured to measure the subband-specific ACL interference based on the configuration information and control the transceiver to report the measured subband-specific ACL interference to the base station.

15. A device of a base station configured to control measurement and reporting of adjacent channel interference in a wireless communication system, the device comprising:
a transceiver configured to:
receive, from a UE, a UE capability report related to measurement and reporting of subband-specific adjacent channel leakage (ACL) interference, transmit, to the UE, configuration information indicating frequency resources and time resources for measurement and reporting of the subband-specific ACL interference, and
receive, from the UE, a measurement report of the subband-specific ACL interference based on the configuration information; and
a processor configured to transmit inter-base station shared information generated based on the configuration information and/or the measurement report to another base station.

* * * * *